US012166987B2

(12) United States Patent
Rossato et al.

(10) Patent No.: US 12,166,987 B2
(45) Date of Patent: *Dec. 10, 2024

(54) DECOMPOSITION OF RESIDUAL DATA DURING SIGNAL ENCODING, DECODING AND RECONSTRUCTION IN A TIERED HIERARCHY

(71) Applicant: V-NOVA INTERNATIONAL LIMITED, London (GB)

(72) Inventors: Luca Rossato, Milan (IT); Guido Meardi, Milan (IT)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,195

(22) Filed: Apr. 3, 2023

(65) Prior Publication Data
US 2023/0379470 A1    Nov. 23, 2023

Related U.S. Application Data

(60) Continuation of application No. 17/684,096, filed on Mar. 1, 2022, now Pat. No. 11,622,112, which is a
(Continued)

(30) Foreign Application Priority Data

May 13, 2013    (WO) ................ PCT/EP2013/059847

(51) Int. Cl.
*H04N 19/126*    (2014.01)
*G06T 7/246*    (2017.01)
(Continued)

(52) U.S. Cl.
CPC .......... *H04N 19/126* (2014.11); *G06T 7/248* (2017.01); *G06T 9/00* (2013.01); *G06T 9/40* (2013.01);
(Continued)

(58) Field of Classification Search
CPC .... H04N 19/126; H04N 19/136; H04N 19/23; H04N 19/30; H04N 19/33; H04N 19/40;
(Continued)

(56) References Cited

U.S. PATENT DOCUMENTS 4,941,193 A    7/1990   Barnsley et al.
5,825,313 A  * 10/1998  Kondo ................... H04N 19/98
                                                    341/67
(Continued)

FOREIGN PATENT DOCUMENTS

CN    101268701 A    9/2008
CN    101931803 A    12/2010
(Continued)

OTHER PUBLICATIONS

Adami et al., "A fully scalable video coder with inter-scale wavelet prediction and morphological coding", Visual Communications and Image Processing, Proc. of SPIE, 5960:535-546 (Jul. 2005).
(Continued)

*Primary Examiner* — Behrooz M Senfi
(74) *Attorney, Agent, or Firm* — WORKMAN NYDEGGER

(57) ABSTRACT

Computer processor hardware receives a first set of adjustment values. The first set of adjustment values specify adjustments to be made to a predicted rendition of a signal generated at a first level of quality to reconstruct a rendition of the signal at the first level of quality. The computer processor hardware processes the first set of adjustment values and derives a second set of adjustment values based on the first set of adjustment values and a rendition of the signal at a second level of quality. The second level of quality is lower than the first level of quality.

18 Claims, 25 Drawing Sheets

Related U.S. Application Data continuation of application No. 16/992,931, filed on Aug. 13, 2020, now Pat. No. 11,272,181, which is a continuation of application No. 16/239,274, filed on Jan. 3, 2019, now Pat. No. 10,750,179, which is a continuation of application No. 15/296,643, filed on Oct. 18, 2016, now Pat. No. 10,178,387, which is a division of application No. 13/893,669, filed on May 14, 2013, now Pat. No. 9,509,990.

(60) Provisional application No. 61/647,426, filed on May 15, 2012, provisional application No. 61/646,797, filed on May 14, 2012.

(51) Int. Cl.

| | |
|---|---|
| *G06T 9/00* | (2006.01) |
| *G06T 9/40* | (2006.01) |
| *H04N 19/136* | (2014.01) |
| *H04N 19/23* | (2014.01) |
| *H04N 19/30* | (2014.01) |
| *H04N 19/33* | (2014.01) |
| *H04N 19/40* | (2014.01) |
| *H04N 19/50* | (2014.01) |
| *H04N 19/57* | (2014.01) |
| *H04N 19/573* | (2014.01) |
| *H04N 19/59* | (2014.01) |
| *H04N 19/62* | (2014.01) |
| *H04N 19/63* | (2014.01) |
| *H04N 19/87* | (2014.01) |
| *H04N 19/94* | (2014.01) |
| *H04N 5/14* | (2006.01) |
| *H04N 19/635* | (2014.01) |

(52) U.S. Cl.
CPC ........... *H04N 19/136* (2014.11); *H04N 19/23* (2014.11); *H04N 19/30* (2014.11); *H04N 19/33* (2014.11); *H04N 19/40* (2014.11); *H04N 19/50* (2014.11); *H04N 19/57* (2014.11); *H04N 19/573* (2014.11); *H04N 19/59* (2014.11); *H04N 19/62* (2014.11); *H04N 19/63* (2014.11); *H04N 19/87* (2014.11); *H04N 19/94* (2014.11); *H04N 5/145* (2013.01); *H04N 19/635* (2014.11)

(58) Field of Classification Search
CPC ...... H04N 19/50; H04N 19/57; H04N 19/573; H04N 19/59; H04N 19/62; H04N 19/63; H04N 19/635; H04N 19/87; H04N 19/94; H04N 5/145; G06T 7/248; G06T 9/00; G06T 9/40
USPC .................................................. 375/240.03
See application file for complete search history.

(56) References Cited

U.S. PATENT DOCUMENTS

| | | | |
|---|---|---|---|
| 5,936,671 A | 8/1999 | Van et al. | |
| 5,991,444 A | 11/1999 | Burt et al. | |
| 6,157,745 A | 12/2000 | Salembier | |
| 6,173,013 B1 | 1/2001 | Suzuki et al. | |
| 6,233,356 B1 | 5/2001 | Haskell et al. | |
| 6,275,532 B1 | 8/2001 | Hibi et al. | |
| 6,289,052 B1 | 9/2001 | Faryar et al. | |
| 6,414,991 B1 | 7/2002 | Yagasaki et al. | |
| 6,535,558 B1 | 3/2003 | Suzuki et al. | |
| 6,546,052 B1 | 4/2003 | Maeda et al. | |
| 6,614,429 B1 | 9/2003 | Zhang et al. | |
| 6,625,320 B1 | 9/2003 | Nilsson et al. | |
| 6,625,333 B1 | 9/2003 | Wang et al. | |
| 6,757,433 B1 | 6/2004 | Lee | |
| 6,782,132 B1 | 8/2004 | Fogg | |
| 6,993,201 B1 | 1/2006 | Haskell et al. | |
| 7,356,082 B1 | 4/2008 | Kuhn | |
| 7,424,163 B1 | 9/2008 | Ellis et al. | |
| 7,583,730 B2 | 9/2009 | Wu et al. | |
| 7,924,923 B2 | 4/2011 | Lee et al. | |
| 8,090,025 B2 | 1/2012 | Sakazume | |
| 8,208,739 B2 | 6/2012 | Agthe et al. | |
| 8,254,455 B2 | 8/2012 | Wu et al. | |
| 8,279,942 B2 | 10/2012 | Ito et al. | |
| 8,351,502 B2 | 1/2013 | Lee et al. | |
| RE44,012 E | 2/2013 | Ribas-Corbera et al. | |
| 8,442,108 B2 | 5/2013 | Song et al. | |
| 8,488,677 B2 | 7/2013 | Jeon et al. | |
| 8,488,680 B2 | 7/2013 | Alfonso | |
| 8,503,533 B1 | 8/2013 | Masterson et al. | |
| 8,503,542 B2 | 8/2013 | Pao | |
| 8,531,321 B1 * | 9/2013 | Rossato | H04N 19/436 341/51 |
| 8,559,519 B2 | 10/2013 | Shi et al. | |
| 8,594,196 B2 | 11/2013 | Lakus-Becker et al. | |
| 8,599,929 B2 | 12/2013 | Jeon et al. | |
| 8,731,054 B2 | 5/2014 | Walker et al. | |
| 8,761,261 B1 | 6/2014 | Wang | |
| 8,774,538 B2 | 7/2014 | Nassor et al. | |
| 8,873,622 B2 | 10/2014 | Schwarz et al. | |
| 8,953,679 B2 | 2/2015 | Kim et al. | |
| 8,977,065 B2 * | 3/2015 | Rossato | H04N 19/36 382/237 |
| 9,147,260 B2 | 9/2015 | Hampapur et al. | |
| 9,247,264 B2 | 1/2016 | Franche et al. | |
| 9,300,980 B2 | 3/2016 | Rossato et al. | |
| 9,313,495 B2 | 4/2016 | Rossato et al. | |
| 9,319,683 B2 | 4/2016 | Lim et al. | |
| 9,344,702 B2 | 5/2016 | Bruls | |
| 9,509,990 B2 * | 11/2016 | Rossato | G06T 9/00 |
| 9,516,351 B2 | 12/2016 | Mertens | |
| 9,595,297 B2 | 3/2017 | Mertens | |
| 9,609,320 B2 | 3/2017 | Naing et al. | |
| 9,609,342 B2 | 3/2017 | Bivolarsky et al. | |
| 9,621,887 B2 | 4/2017 | Rossato et al. | |
| 9,648,341 B2 | 5/2017 | Laroche et al. | |
| 9,674,546 B2 | 6/2017 | Lim et al. | |
| 9,706,206 B2 | 7/2017 | Rossato et al. | |
| 9,866,854 B2 | 1/2018 | Nishi | |
| 9,930,350 B2 | 3/2018 | Rossato et al. | |
| 9,961,345 B2 | 5/2018 | Rossato et al. | |
| 10,750,178 B2 | 8/2020 | Rossato et al. | |
| 10,750,179 B2 | 8/2020 | Rossato et al. | |
| 11,272,181 B2 * | 3/2022 | Rossato | G06T 9/40 |
| 11,622,112 B2 * | 4/2023 | Rossato | H04N 19/573 375/240.03 |
| 2002/0060679 A1 | 5/2002 | Malzbender et al. | |
| 2002/0154697 A1 | 10/2002 | Jeon | |
| 2003/0133500 A1 | 7/2003 | Auwera et al. | |
| 2004/0091049 A1 | 5/2004 | Yamaguchi et al. | |
| 2005/0053155 A1 | 3/2005 | Holcomb et al. | |
| 2005/0141616 A1 | 6/2005 | Lim | |
| 2005/0195900 A1 | 9/2005 | Han | |
| 2005/0249426 A1 | 11/2005 | Badawy | |
| 2006/0013309 A1 | 1/2006 | Ha et al. | |
| 2006/0088096 A1 | 4/2006 | Han et al. | |
| 2006/0088101 A1 | 4/2006 | Han et al. | |
| 2006/0126741 A1 | 6/2006 | Saito et al. | |
| 2006/0126952 A1 | 6/2006 | Suzuki et al. | |
| 2006/0126962 A1 | 6/2006 | Sun | |
| 2006/0204079 A1 | 9/2006 | Yamaguchi | |
| 2006/0215762 A1 | 9/2006 | Han et al. | |
| 2007/0064804 A1 | 3/2007 | Paniconi et al. | |
| 2007/0160153 A1 | 7/2007 | Sullivan | |
| 2007/0175333 A1 | 8/2007 | Shoemaker et al. | |
| 2007/0223582 A1 | 9/2007 | Borer | |
| 2007/0297513 A1 | 12/2007 | Biswas et al. | |
| 2008/0144716 A1 | 6/2008 | De Haan | |
| 2008/0165848 A1 | 7/2008 | Ye et al. | |
| 2008/0181298 A1 | 7/2008 | Shi et al. | |
| 2008/0247462 A1 | 10/2008 | Demos | |
| 2008/0253459 A1 | 10/2008 | Ugur et al. | |

(56) References Cited

U.S. PATENT DOCUMENTS

| | | |
|---|---|---|
| 2008/0294962 A1 | 11/2008 | Goel |
| 2009/0010337 A1 | 1/2009 | Wang |
| 2009/0023827 A1 | 1/2009 | Tu et al. |
| 2009/0074060 A1 | 3/2009 | Kim et al. |
| 2009/0097573 A1 | 4/2009 | Choi et al. |
| 2009/0141809 A1 | 6/2009 | Msharam et al. |
| 2009/0141810 A1 | 6/2009 | Tabatabai et al. |
| 2009/0148054 A1 | 6/2009 | Kim et al. |
| 2009/0232212 A1 | 9/2009 | Amon |
| 2009/0238279 A1 | 9/2009 | Tu et al. |
| 2010/0033617 A1 | 2/2010 | Forutanpour |
| 2010/0034296 A1 | 2/2010 | Cunha et al. |
| 2010/0079667 A1 | 4/2010 | Tueretken et al. |
| 2010/0111183 A1 | 5/2010 | Jeon et al. |
| 2010/0123792 A1 | 5/2010 | Nagumo et al. |
| 2010/0135398 A1 | 6/2010 | Wittmann et al. |
| 2010/0188535 A1 | 7/2010 | Mitsuya et al. |
| 2010/0232507 A1 | 9/2010 | Cho et al. |
| 2010/0246680 A1 | 9/2010 | Tian et al. |
| 2010/0312811 A1 | 12/2010 | Reznik |
| 2010/0329347 A1 | 12/2010 | Kim et al. |
| 2011/0103486 A1 | 5/2011 | Sato et al. |
| 2011/0122944 A1 | 5/2011 | Gupta |
| 2011/0142132 A1 | 6/2011 | Tourapis et al. |
| 2011/0170782 A1 | 7/2011 | Iwamoto et al. |
| 2011/0206116 A1 | 8/2011 | Henocq et al. |
| 2011/0249745 A1 | 10/2011 | Chen et al. |
| 2011/0254950 A1 | 10/2011 | Bibby et al. |
| 2012/0063512 A1 | 3/2012 | Han et al. |
| 2012/0075535 A1 | 3/2012 | Van Beek |
| 2012/0106645 A1 | 5/2012 | Lin et al. |
| 2012/0177121 A1 | 7/2012 | Tripathi et al. |
| 2012/0251015 A1 | 10/2012 | Lim et al. |
| 2012/0294362 A1 | 11/2012 | Sikora et al. |
| 2013/0034157 A1 | 2/2013 | Helle et al. |
| 2013/0188705 A1 | 7/2013 | Liu |
| 2013/0208792 A1 | 8/2013 | He et al. |
| 2013/0215957 A1 | 8/2013 | Bartczak |
| 2013/0223531 A1 | 8/2013 | Garbas et al. |
| 2013/0294514 A1 | 11/2013 | Rossato et al. |
| 2013/0294704 A1 | 11/2013 | Rossato et al. |
| 2013/0300740 A1 | 11/2013 | Snyder et al. |
| 2013/0301946 A1 | 11/2013 | Rossato et al. |
| 2013/0321423 A1 | 12/2013 | Rossato et al. |
| 2013/0322537 A1 | 12/2013 | Rossato et al. |
| 2014/0010294 A1 | 1/2014 | Ye et al. |
| 2014/0092971 A1 | 4/2014 | Misra et al. |
| 2014/0111113 A1 | 4/2014 | Del Carmen, Jr. |
| 2014/0153635 A1 | 6/2014 | Zhang et al. |
| 2014/0177713 A1 | 6/2014 | Yuan |
| 2014/0185686 A1 | 7/2014 | Wu et al. |
| 2014/0286409 A1 | 9/2014 | Zhang et al. |
| 2015/0296222 A1 | 10/2015 | Liin et al. |
| 2018/0350110 A1 | 12/2018 | Cho et al. |

FOREIGN PATENT DOCUMENTS

| | | |
|---|---|---|
| CN | 102177714 | 9/2011 |
| EP | 1720358 | 11/2006 |
| FR | 2944937 A1 | 10/2010 |
| JP | 2944937 B2 | 9/1999 |
| WO | 03/26310 A2 | 3/2003 |
| WO | 2009-088651 | 7/2009 |
| WO | 2010-042875 | 4/2010 |
| WO | 2011/064673 A1 | 6/2011 |

OTHER PUBLICATIONS

Andreopoulos "Comments on phase-shifting for nonseparable 2-D haar wavelets" IEEE Transaction on Image processing, 18(8):1897-1898 (Aug. 2009).

Choi et al. "Scalable structures and inter-layer predictions for HEVC scalable extension" Joint Collaborative Team on Video Coding (JCT-VC) of ITU-T SG16 WPS and ISO/IEC JTC1/SC29/WG11, 6th meeting, Torino Italy, Jul. 14-22, 2011, 11 pages.

Girod et al. "Subban Image Coding" Design and Applications of Subbands and Wavelets, Chapter 7, Kluwer Academics Publishers, USA, 42 pages (Oct. 1995).

Goyal "Transform Coding with Integer-to-integer Transforms" IEEE Transactions on Information Theory, 46(2): 465-473 (Mar. 2000).

Hsiang "Intra-Frame Dyadic Spatial Scalable Coding Based on a Subband/Wavelet Framework for MPEG-4 AVC/H.264 Scalable Video Coding", IEEE International Conference on Image Processing, IEEE, New York, pp. 73-76 (Sep. 2007).

Hsiang "CE3: Intra-Frame Dyadic Spatial Scalable Coding Based on a Subband/Wavelet Filter Banks Framework" Joint Video Team 23rd Meeting, Motorola, Inc., San Jose, California USA, Apr. 21-27, 2007, pp. 1-12.

Monet et al. "Block Adaptive Quantization of Images" IEEE Transactions on Communications 41(2): 303-306 (Feb. 1993).

Negusse "Improving Intra Pixel Prediction for H.264 Video Coding" Blekinge Institute of Technology, Master of Science Electrical Engineering Thesis presentation, 59 pages (May 2008).

Ramchandran, et al. "Bit Allocation for Dependent Quantization with Applications to Multiresolution and MPEG Video Coders" IEEE Transactions on Image Processing, 3(5): 533-545 (Sep. 1994).

Search Report and Written Opinion for Singapore Application No. 11201407419R, 4 pages, date of completion Oct. 9, 2015.

International Search Report and Written Opinion in Application No. PCT/EP2013/059847, 23 pages, dated Nov. 4, 2013.

Notice of Allowance received for U.S. Appl. No. 17/011,735, mailed on Oct. 26, 2022, 2 pages.

Notice of Allowance received for U.S. Appl. No. 17/684,096, mailed on Nov. 30, 2022, 9 pages.

NPL—Google Search; 2019.

NPL Internet Search log; 2019; (Year: 2019).

NPL—Internet Search; 2019 (Year: 2019).

Office Action received for U.S. Appl. No. 15/643,392, mailed on Aug. 8, 2018.

Office Action received for U.S. Appl. No. 15/643,392, mailed on Sep. 12, 2019.

Office Action received for U.S. Appl. No. 15/927,340, mailed on Nov. 11, 2019.

Office Action received for U.S. Appl. No. 16/239,274, mailed on Dec. 26, 2019.

Office Action Appendix received for U.S. Appl. No. 15/459,893, mailed on Jun. 7, 2021, 3 pages.

Office Action Appendix received for U.S. Appl. No. 15/459,893, mailed on Jun. 7, 2021, 4 pages.

Office Action, Application No. 201380037629.7, 2017-05-26, p. 16.

Panusopone, Krit et al., "An Efficient Implementation of Unrestricted Motion Compensation in Video Encoder", IEEE International Conference on Acoustics, Speech, and Signal Processing, Apr. 2007, Total pp. 4 (pp. 1005-1008), IEEE, New York.

Pieters, B., et al., "Motion Compensation and Reconstruction of H.264/AVC Video Bitstreams Using the GPU", 8th International Workshop on Image Analysis for Multimedia Interactive Services, 4 pages (2007).

Reduced-complexity entropy coding of transform coefficient levels using truncated Golombrice codes in video compression; Nguyen; 2011.

Ribas-Corbera et al., "Optimizing Block Size in Motion Compensated Video Coding", Journal of Electronic Imaging, Jan. 1998, pp. 155-165, vol. 7, No. 1, SPIE and IS&T, USA.

Santa-Cruz, Diego et al. "Opening the Laplacian Pyramid for Video Coding" IEEE International Conference on Image Processing, Sep. 2005, Total pp. 4 (pp. 672-675), IEEE, New York.

Search Report for Singapore Patent Application No. 112014074725; date of mailing Feb. 14, 2014; 2 pages.

Search Report, Application No. 11201407472S, Nov. 2, 2015, pp. 2.

Servais, Marc et al., "Progressive Polygon Encoding of Segmentation Maps", International Conference on Image Processing, Oct. 2004, Total Pages 4 (pp. 1121-1124), IEEE, New York.qwaass Steinbach et al., "Using multiple global motion models for improved block-based video coding", IEEE, 1999.

(56) References Cited

OTHER PUBLICATIONS

Using multiple global motion models for improved block-based video coding; Steinback; 1999 (Year: 1999).

Wang, et al., Fast Algorithm or Arbitrary Fractional-pixel accuracy motion estimation; 2002, pp. 1-8.

Watanabe, Hiroshi et al., "Sprite Coding in Object-Based Video Coding Standard: MPEG-4", Multiconference on Systemics, Cybernetics and Informatics, Jul. 2001, Total pp. 6 (pp. 420-425), Japan.

Wiegand et al., "Affine multipicture motion-compensated prediction", IEEE Transactions on Circuits and Systems for Video Technology, vol. 15, No. 2, Feb. 2005.

Written Opinion for Singapore Application No. 11201407419R, 6 pages, dated Nov. 9, 2016.

Written Opinion, Intellectual Property Office of Singapore; 11201407508R, dated Dec. 6, 2016, pp. 1-5.

Wu, Feng et al., "Efficient Background Video Coding With Static Sprite Generation and Arbitrary-Shape Spatial Prediction Techniques", IEEE Transactions on Circuits and Systems for Video Technology, May 2003, Total pp. 12 (pp. 394-405), vol. 13 No. 5, IEEE, New York.

Youn et al., "Motion vector refinement for high performance transcoding", IEEE Transactions on Multimedia, vol. 1, No. 1, Mar. 1999.

Zavacky, J., et al., "Resampling of an Image by Block-Based Interpolation or Decimation with Compensation", Radioengineering, 9(2): 18-24 (2000).

Zavacky, Jozef et al., "Resampling of an Image by Block-Based Interpolation or Decimation With Compensation", Jun. 2000, Total Pages 7 (pp. 18-24), vol. 9 No. 2, Radioengineering, Slovak Republic.

Zhang, HongJiang et al., "Automatic Partitioning of Full-Motion Video", Multimedia Systems, Jan. 1993, Total pp. 20 (pp. 10-28), vol. 1 No. 1, Springer-Verlag, Germany.

Bit depth scalable video coding; Winken; 2007. (Year: 2007).

Tone mapping functions and multiple exposure techniques; Cvekovic; 2008. (Year: 2008).

Affine multipicture motion compensated prediction; Wiegand; 2005 (Year: 2005).

Aizawa et al., "Model-based image coding advanced video coding techniques for very low bit-rate Applications", Proceedings of the IEEE, vol. 83, No. 2, Feb. 1995.

Athanasios Leontaris, et al., "Multiple reference motion compensation: a tutorial introduction and survey. Foundations and Trends in Signal Processing", Aug. 31, 2009, vol. 2, No. 4, pp. 247-364.

Beong-Jo, Kim, et al., "Low Bit-Rate Scalable Video Coding with 3-D Set Partitioning in Hierarchical Trees (3-D SPHIT)", IEEE Transactions on Circuits and Systems for Video Technology, Dec. 1, 2000, vol. 10, No. 8, Entire document.

Boyce, "Weighted Prediction in the H.264 / MPEG AVC Video Coding Standard", IEEE International Symposium on Circuits and Systems, May 2004, pp. 789-792, IEEE, New York.

Dasu, Aravind et al., "A Wavelet-Based Sprite Codec", IEEE Transactions on Circuits and Systems for Video Technology, Feb. 2004, Total pp. 12 (pp. 244-255), vol. 14 No. 2, IEEE, New York.

Ebrahimi, Touradj et al., "MPEG-4 Natural Video Coding—An Overview", Signal Processing: Image Communication, Jan. 2000, Total Pages 21 (pp. 365-385), vol. 15, Elsevier Science, USA.

Examination Report, Austrialia No. 2013261845, dated Nov. 28, 2016, pp. 1-5.

Final Office Action received for U.S. Appl. No. 15/459,893, mailed on Feb. 4, 2021, 50 pages.

Final Office Action received for U.S. Appl. No. 15/643,392, mailed on Apr. 10, 2019.

Final Office Action received for U.S. Appl. No. 16/992,925, mailed on Jul. 6, 2022, 10 pages.

Final Office Action received for U.S. Appl. No. 17/500,534, mailed on Jan. 26, 2023, 12 pages.

Hartung, Frank, et al., "Digital Rights Management and Watermarking of Multimedia Content for M-Commerce Applications", Nov. 1, 2000, vol. 38, No. 11, Total pp. 7 (pp. 78-84), IEEE Communications Magazine.

Hsiang, S., "CE3: Intra-frame dyadic spatial scalable coding based on subband/wavelet filter banks framework". 23 UVT Meeting; San Jose CR, US; (Joint Video Team of ISO/IEC JTC1/SC29/WG11 and ITU-T SG.16), No. JVT-W097, Apr. 25, 2007, Fig. 1, pp. 1-5.

Hsu, Chiou-Ting et al., "Mosaics of Video Sequences with Moving Objects", Signal Processing: Image Communication, Jan. 2004, Total pp. 18 (pp. 81-98), vol. 19 No. 1, Elsevier, USA.

Hsu, Wei-Lien et al., "3D Adaptive Wavelet Packet for Video Compression", International Conference on Image Processing, Oct. 1995, Total pp. 4 (pp. 602-605), IEEE, New York.

Intellectual Property Office of Singapore Search Report for corresponding application No. 11201407419R, Oct. 9, 2015, p. 4.

International Preliminary Report on Patentability received for PCT Patent Application No. PCT/EP2013/059885, mailed on Nov. 27, 2014, 14 pages.

International Search Report and the Written Opinion of the International Searching Authority for International Patent Application No. PCT/EP2013/0589847, 23 pages, dated Nov. 4, 2013.

International Search Report and Written Opinion received for PCT Patent Application No. PCT/EP13/059885, mailed on Oct. 24, 2013, 20 pages.

International Search Report from corresponding PCT application No. PCT/EP20123/059886, mailed Oct. 24, 2013, total p. 10.

International Search Report from corresponding PCT application No. PCT/EP2013/059833, mailed Oct. 24, 2013, total p. 9.

International Search Report from corresponding PCT application No. PCT/EP2013/059847, mailed Nov. 4, 2013, total p. 10.

International Search Report from corresponding PCT application No. PCT/EP2013/059885, dated Oct. 24, 2013, total p. 9.

International Search Report from corresponding PCT application No. PCT/EP2013/059885, mailed Oct. 24, 2013, total p. 9.

Irani, Michal et al., "Efficient Representations of Video Sequences and Their Applications", Signal Processing: Image Communication, May 1996, Total pp. 26 (pp. 327-351), vol. 8 No. 4, Elsevier, USA.

Irani, Michal et al., "Video Compression Using Mosaic Representations", Signal Processing: Image Communication, Nov. 1995, Total pp. 24 (pp. 529-552), vol. 7, Elsevier Science, USA.

Jahne, Bernd. Digital Image Processing. Springer Sceince & Business Media, 2005, selected pp. 277 and 278.

Lakshman, Haricharan et al., "Generalized Interpolation for Motion Compensated Prediction", IEEE International Conference on Image Processing, Sep. 2011, Total pp. 4 (pp. 1213-1216), IEEE, New York.

Lee, M.-C., et al., "A Layered Video Object Coding System Using Sprite and Affine Motion Model", IEEE Transactions on Circuits and Systems for Video Technology, 7(1): 130-145 (1997).

Lou, Ming et al., "A Spatial Constrained K-Means Approach to Image Segmentation", International Conference on Information, Communications and Signal Processing, Dec. 15-18, 2003, Total Pages 5 (pp. 738-742), IEEE, New York.

Model-based image coding advanced video coding techniques for very low bit-rate; Han; 1998 (Year: 1998).

Motion vector refinement for high performance transcoding; Jeon; 1999 (Year: 1999).

Negusse, S. A., "Improving intra pixal prediction for H.264 video coding. Blekinge Institute of Technology, School of Engineering, Department of Signal Processing". Independent thesis Advanced level. Student thesis, May 31, 2008, Fig. 2.3; Sections 2, 4.

Nguyen, et al., "Reduced-complexity entropy coding of transform coefficient levels using truncated Golombrice codes in video compression", 2011, pp. 753-756.

Nicolas et al., "Motion and Illumination Variation Estimation Using a Hierarchy of Models: Application to Image Sequence Coding", Journal of Visual Communication and Image Representation, Dec. 1995, pp. 303-316, Academic Press, Inc., USA.

Non-Final Office Action received for U.S. Appl. No. 17/011,735, mailed on Apr. 13, 2022, 10 pages.

Non-Final Office Action received for U.S. Appl. No. 15/459,893, mailed on Aug. 14, 2020, 42 pages.

(56) References Cited

OTHER PUBLICATIONS

Non-Final Office Action received for U.S. Appl. No. 16/992,925, mailed on Dec. 29, 2021, 9 pages.
Non-Final Office Action received for U.S. Appl. No. 16/992,931, mailed on May 20, 2021, 8 pages.
Notice of Allowance received for U.S. Appl. No. 15/643,392, mailed on Apr. 16, 2020.
Notice of Allowance received for U.S. Appl. No. 15/459,893, mailed on Jun. 16, 2021, 14 pages.
Notice of Allowance received for U.S. Appl. No. 15/927,340, mailed on May 5, 2020.
Notice of Allowance received for U.S. Appl. No. 16/239,274, mailed on May 26, 2020.
Notice of Allowance received for U.S. Appl. No. 16/992,925, mailed on Oct. 20, 2022, 8 pages.
Notice of Allowance received for U.S. Appl. No. 16/992,931, mailed on Oct. 28, 2021, 7 pages.
Notice of Allowance received for U.S. Appl. No. 17/011,735, mailed on Feb. 13, 2023, 9 pages.
Notice of Allowance received for U.S. Appl. No. 17/011,735, mailed on Oct. 3, 2022, 8 pages.
Notice of Allowance received for U.S. Appl. No. 17/500,534, mailed on Jul. 18, 2024, 7 pages.

\* cited by examiner

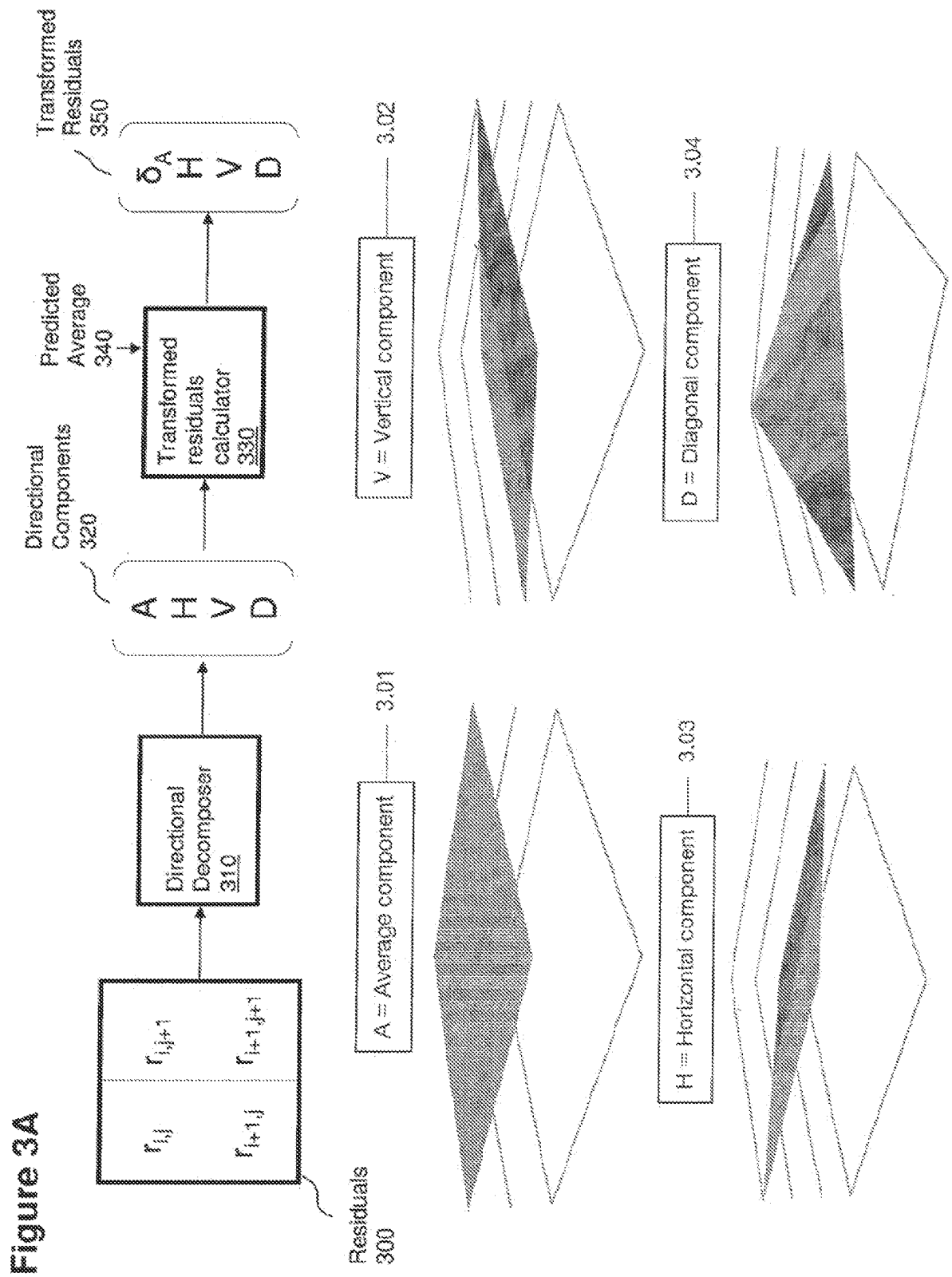

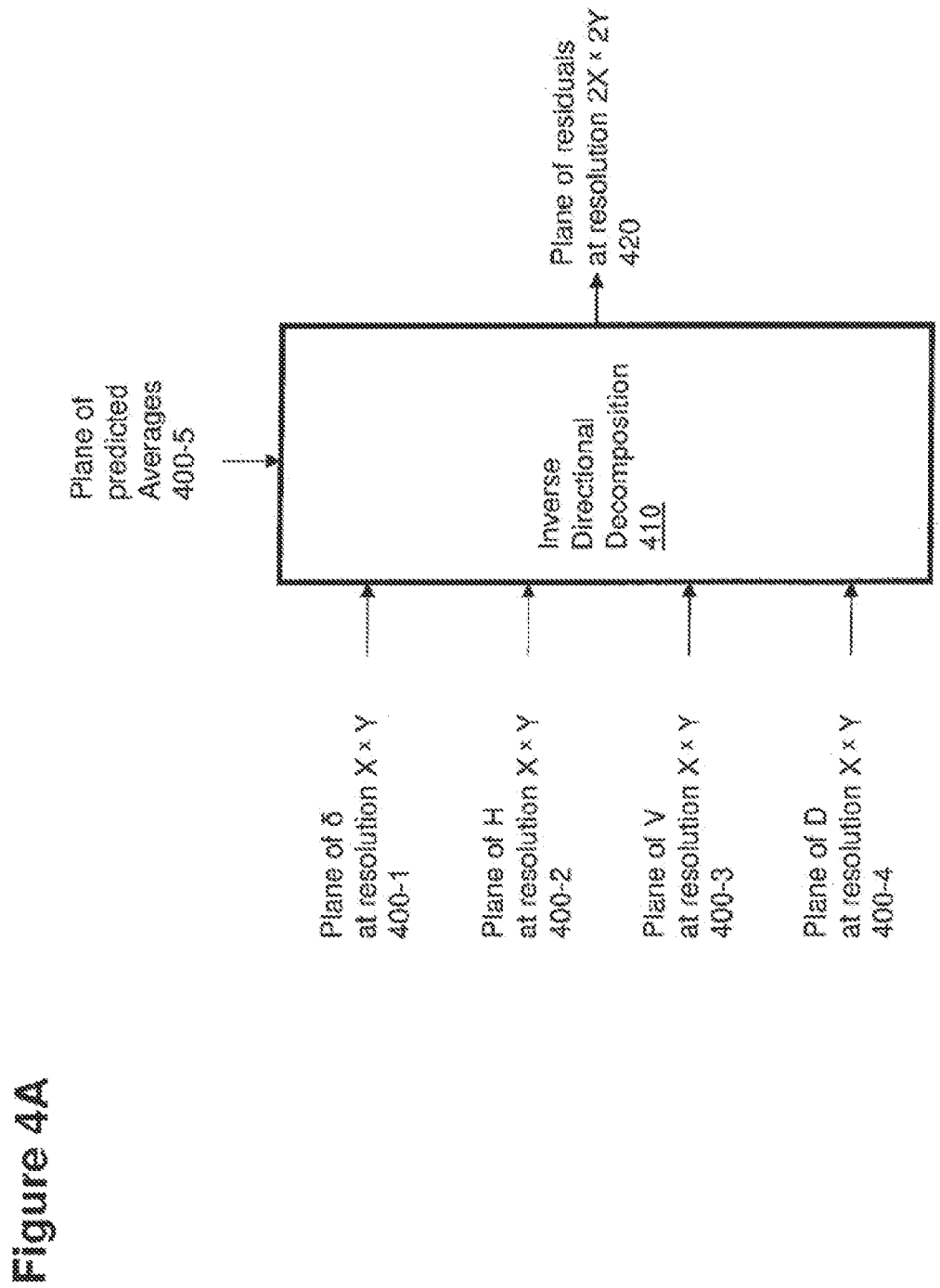

Figure 6 – Encoder directional decomposition

Figure 7 – Decoder directional decomposition

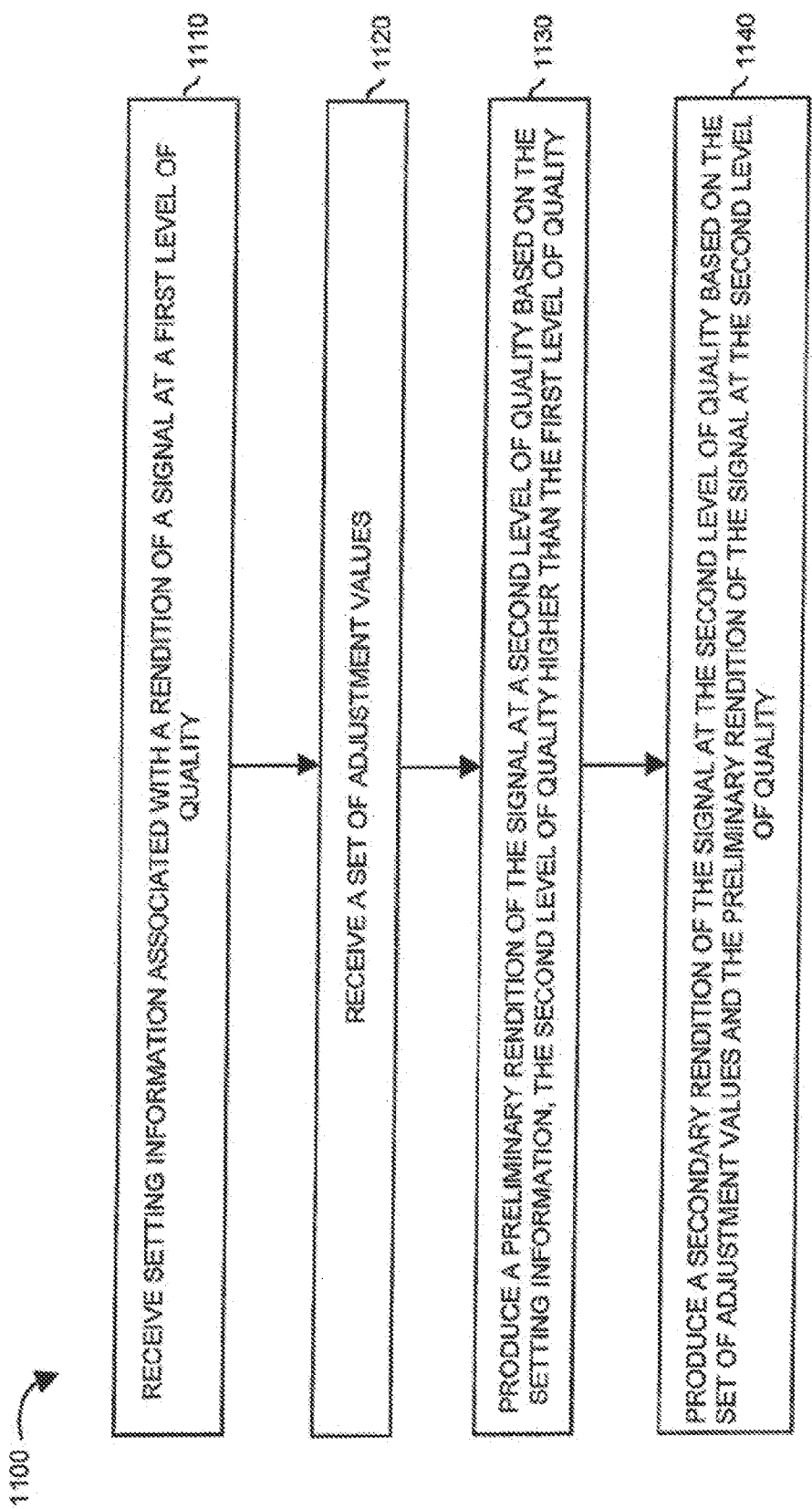

DECOMPOSITION OF RESIDUAL DATA DURING SIGNAL ENCODING, DECODING AND RECONSTRUCTION IN A TIERED HIERARCHY

CROSS-REFERENCE TO RELATED APPLICATIONS

The present application is a continuation of U.S. patent application Ser. No. 17/684,096, filed Mar. 1, 2022, which is a continuation of U.S. patent application Ser. No. 16/992,931, filed Aug. 13, 2020, and now U.S. Pat. No. 11,272,181, which is a continuation of U.S. patent application Ser. No. 16/239,274, filed Jan. 3, 2019 and now U.S. Pat. No. 10,750,179, which is a continuation of U.S. patent application Ser. No. 15/296,643, filed Oct. 18, 2016 and now U.S. Pat. No. 10,178,387, which is a divisional of U.S. patent application Ser. No. 13/893,669, filed on May 14, 2013 and now U.S. Pat. No. 9,509,990, the entire teachings of which are incorporated herein by this reference.

U.S. patent application Ser. No. 13/893,669 is related to and claims the benefit of U.S. Provisional Patent Application No. 61/646,797, filed May 14, 2012, the entire teachings of which are incorporated herein by this reference.

U.S. patent application Ser. No. 13/893,669 is related to and claims the benefit of U.S. Provisional Patent Application No. 61/647,426, filed May 15, 2012, the entire teachings of which are incorporated herein by this reference.

U.S. patent application Ser. No. 13/893,669 is related to and claims the benefit of EP Patent Application No. PCT/EP2013/059847, filed May 13, 2013, the entire teachings of which are incorporated herein by this reference.

U.S. patent application Ser. No. 13/893,669 is also related to U.S. patent application Ser. No. 13/188,188, filed Jul. 21, 2011, the entire teachings of which are incorporated herein by this reference.

U.S. patent application Ser. No. 13/893,669 is related to U.S. patent application Ser. No. 13/188,201, filed Jul. 21, 2011, the entire teachings of which are incorporated herein by this reference.

U.S. patent application Ser. No. 13/893,669 is related to U.S. patent application Ser. No. 13/188,207, filed Jul. 21, 2011, the entire teachings of which are incorporated herein by this reference.

U.S. patent application Ser. No. 13/893,669 is related to U.S. patent application Ser. No. 13/188,220, filed Jul. 21, 2011, the entire teachings of which are incorporated herein by this reference.

U.S. patent application Ser. No. 13/893,669 is related to U.S. patent application Ser. No. 13/188,226, filed Jul. 21, 2011, the entire teachings of which are incorporated herein by this reference.

U.S. patent application Ser. No. 13/893,669 is related to U.S. patent application Ser. No. 13/352,944, filed Jan. 18, 2012, the entire teachings of which are incorporated herein by this reference.

U.S. patent application Ser. No. 13/893,669 is related to U.S. Provisional Patent Application No. 61/563,169, filed Nov. 23, 2011, the entire teachings of which are incorporated herein by this reference.

U.S. patent application Ser. No. 13/893,669 is related to U.S. patent application Ser. No. 13/188,237, filed Jul. 21, 2011, the entire teachings of which are incorporated herein by this reference.

U.S. patent application Ser. No. 13/893,669 is related to U.S. Provisional Patent Application No. 61/558,302, filed Nov. 10, 2011, the entire teachings of which are incorporated herein by this reference.

U.S. patent application Ser. No. 13/893,669 is related to U.S. patent application Ser. No. 13/303,554, filed Nov. 23, 2011, the entire teachings of which are incorporated herein by this reference.

U.S. patent application Ser. No. 13/893,669 is related to U.S. Provisional Patent Application No. 61/587,989, filed Jan. 18, 2012, the entire teachings of which are incorporated herein by this reference.

U.S. patent application Ser. No. 13/893,669 is related to U.S. Provisional Patent Application No. 61/646,797, filed May 14, 2012, the entire teachings of which are incorporated herein by this reference.

U.S. patent application Ser. No. 13/893,669 is related to U.S. Provisional Patent Application No. 61/647,426, filed May 15, 2012, the entire teachings of which are incorporated herein by this reference.

U.S. patent application Ser. No. 13/893,669 is related to U.S. patent application Ser. No. 13/744,808, filed Jan. 18, 2013, the entire teachings of which are incorporated herein by this reference.

BACKGROUND

Many techniques are known in the art to deal with compression and decompression of multidimensional signals or of signals evolving along time. This is the case of audio signals, video signals and other multidimensional signals like volumetric signals used in scientific and medical areas.

In order to achieve high compression ratios, those techniques exploit the spatial and time correlation inside the signal. For example, conventional methods identify a reference and try to determine the difference of the signal between a current location and the given reference. This is done both in the spatial domain, where the reference is a portion (e.g., a block, or "macro-block") of already received and decoded spatial plane, and in the time domain, where a single instance in time of the signal (e.g., a video frame in a sequence of frames) is taken as a reference for a certain duration. This is the case, for example, of MPEG(Moving Pictures Expert Group)—family compression algorithms, where previously-decoded macro blocks are taken as reference in the spatial domain and I-frames and P-frames are used as reference for subsequent P-frames in the time domain.

Known techniques exploit spatial correlation and time correlation in many ways, adopting several different techniques in order to identify, simplify, encode and transmit differences. In accordance with conventional methods, in order to leverage on spatial correlation of residuals within a respective block of picture elements a domain transformation is performed (for example into a frequency domain) and then lossy deletion and quantization of transformed information is performed, typically introducing some degree of block artifacts. In the time domain, instead, conventional methods transmit the quantized difference between the current sample and a motion-compensated reference sample. In order to maximize the similarity between samples, encoders try to estimate the modifications along time occurred vs. the reference signal. In conventional encoding methods (e.g., MPEG family technologies, VP8, etc.), this is called motion estimation and compensation.

Today's CPUs (Central Processing Units) and GPUs (Graphics Processing Units) are typically very powerful; a single GPU can include several hundreds of computing cores to perform parallel processing of information. When using current technology hardware, very large portions of an image can be stored in a processor cache for processing. The need to fragment images into a multitude of small blocks, which was a driving factor when JPEG and MPEG were created, as processors from that era could only deal with very small chunks of video data at a time—and back then only sequentially no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (e.g., fullHD, UltraHD), high-quality videos (e.g., relatively invisible artifacts with respect to the original signal), there is a much larger difference between areas with low detail (potentially even out of focus) and areas with very fine detail. This makes the use of frequency-domain transforms such as those used in JPEG-based and MPEG-based methods even more unsuitable for image processing and playback, since the range of relevant frequencies is getting much broader.

In addition, higher resolution images include a higher amount of camera noise and/or film grain, i.e., very detailed high-frequency pixel transitions that require many bits to encode, but that can be quite irrelevant for viewing vs. similar high-frequency pixel transitions of borders of objects.

Another aspect neglected in the known art, aside from few attempts, is the quality scalability requirement. A scalable encoding method would encode a single version of the compressed signal and enable the delivery to different levels of quality, bandwidth availabilities, and decoder complexity. Scalability has been taken into consideration in known methods like MPEG-SVC and JPEG2000, with relatively poor adoption so far due to computational complexity and, generally speaking, compression inefficiency relatively to non-scalable techniques.

In the past, as a scalable alternative to JPEG/MPEG standards for encoding/decoding, so-called image Laplacian pyramids had been used for encoding/decoding purposes. For example, conventional Laplacian pyramids systems created lower resolution images using Gaussian filters and then built the pyramid of the differences between the images obtained by upsampling with a rigidly programmed decoder back from the lower resolution levels to the original level. Use of conventional Laplacian pyramid encoding has been abandoned, due to their compression inefficiency.

The domain transformations of residuals leveraged so far by state of the art encoding methods (e.g., Fourier transforms, Discrete Cosine Transforms, Hadamard transforms, Wavelet transforms, etc.) suffer from a number of problems.

First of all, the very choice of transforming into a frequency domain makes them unsuitable to properly exploit the correlation across large portions of a signal (i.e., portions with a high number of samples for each of the dimensions), since real-world signals typically show limited amounts of periodicity. As a consequence, frequency domain transforms are performed on blocks that are at the same time too big and too small: too big to be computationally simple, too small to sufficiently exploit the correlation of a high-resolution signal. For instance, in order to exploit the correlation of a large enough set of samples while at the same time managing computational complexities, conventional image and video encoding techniques operate on blocks of 8×8, 16×16 or 32×32 elements: clearly too small to fully capture the correlation of image patterns in a high definition image (e.g., with 8 million pixels), but large enough to absorb significant computational power.

Secondly, known methods leveraging frequency domain transforms implicitly assume that humans are sensitive to harmonics (e.g., frequencies of color transitions) in a way that does not depend on the direction of the transition, while several studies have shown that humans recognize the sharpness of a transition much better than the precise direction/angle of the transition, especially when watching complex shapes.

Third, known lossy encoding techniques operate by quantizing the results of the transform, inevitably generating two problems: (1) block-based artifacts between one block and the neighboring ones, to be corrected with relatively complex de-blocking image processing methods; (2) impossibility to easily control the maximum error in an encoded image, since actual pixel values are the result of an inverse transform of de-quantized parameters, so that quantization errors in the quantized parameters of a block combine with one another in manners that are difficult to manage without multiple re-encodings and/or extremely complex quantization schemes. Avoiding block artifacts and guaranteeing maximum error control are particularly important features, especially in applications such as medical imaging or professional image/video production.

BRIEF DESCRIPTION

Embodiments herein deviate with respect to conventional systems and methods, providing novel methods to quantize and/or transform element information (such as residual data) to reconstruct a rendition of an image, enabling encoding methods characterized by efficient entropy coding, low computational complexity, parallelism, scalability, error control, etc. Methods and embodiments herein represent an innovative approach to achieve efficient entropy coding results with low computational complexity, parallelism, scalability, and error control.

According to its broadest aspect, embodiments herein include a method for transforming sets of signal elements (i.e., suitable sequences of values) into sets of transformed signal elements, so as to efficiently entropy encode them. Embodiments illustrated herein are especially focused on the non-limiting use case wherein said signal elements correspond to residual data to be added to a predicted (i.e., preliminary) rendition of an image in order to obtain a target rendition of the same image, said predicted rendition being obtained at least in part by upsampling and/or processing a rendition of the same image at a lower level of quality (e.g., with a lower level of fidelity vs. an original signal rendition). Embodiments illustrated herein are especially focused on non-limiting cases wherein a lower level of quality is a lower resolution (i.e., a coarser sampling grid) across one or more of the dimensions of the signal, although people skilled in the art can easily adapt the same methods to cases wherein a signal at a lower level of quality is a signal with the same resolution and a lower level of detail (e.g., without limitation, a coarser quantization of element values).

Embodiments herein are useful in conjunction with traditional encoding methods, and are useful in conjunction with tier-based encoding methods, a set of other novel methods that are described in other patent applications of the same authors.

For simplicity, non-limiting embodiments illustrated herein refer to a signal as a sequence of multi-dimensional samples (i.e., sets of one or more elements organized as arrays with one or more dimensions, e.g., by way of non-limiting example sets of picture elements organized as two-dimensional images). In the description the terms "image" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y, in case of two dimensions), and comprises a set of plane elements (or "element", or "pel", for two-dimensional images often called "pixel", for volumetric images often called "voxel", etc.) characterized by one or more "values" or "settings" (e.g., by ways of non-limiting examples, color settings in a suitable color space, settings indicating density level, settings indicating temperature levels, settings indicating audio pitch, settings indicating amplitude, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time).

As non-limiting examples, a signal can be an image, an audio signal, a multi-channel audio signal, a video signal, a multi-view video signal (e.g., 3D video), a plenoptic signal, a multi-spectral signal, a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable color space), such as for instance an image or a video signal (i.e., a sequence of 2D images evolving over time). However, people skilled in the art can easily apply the same concepts and methods to any other types of multidimensional signal (e.g., volumetric signals, video signals, 3D video signals, plenoptic signals, etc.).

Non-limiting embodiments illustrated herein also often illustrate cases of signals encoded in a tiered hierarchy of levels of quality ("LOQ"), wherein higher levels of quality in the tiered hierarchy have a progressively higher resolution (i.e., a higher number of samples for one or more of the dimensions of the signal). For simplicity, non-limiting embodiments illustrated herein often refer to the simple case of resolutions increasing with a scale factor of two for each of the dimension of the signal, but people skilled in the art can easily apply the same methods also to cases with different (and potentially anisotropic) scale factors. When working with signals encoded in a tiered hierarchy of levels of quality, residuals allowing to reconstruct the settings of elements of a given LOQ "controlled" by (e.g., co-located with) a same element of the lower LOQ exhibit important correlations that are effectively exploited by non-limiting embodiments illustrated herein. For simplicity, we will call "controlling plane element" (or "controlling pel") of a given set of plane elements at a higher LOQ ("controlled pels") the parent element at a lower LOQ that is co-located with the given set of plane elements at the higher LOQ.

Further non-limiting embodiments illustrated herein transform residual data (i.e., information on adjustments to apply to elements of a signal so as to obtain a suitable rendition of the signal at a given level of quality) so as to leverage both the correlation among residuals themselves and the correlation that exists between residuals and the rendition of the signal at a lower level of quality. In particular, in order to efficiently encode residual data into a digital bit stream, two operations are necessary: quantization (i.e., assigning to every value a symbol belonging to a given finite alphabet of symbols) and entropy encoding. Transforming the symbols before entropy encoding allows to reduce the variability of the symbols to be encoded, hence increasing the efficiency of the entropy encoder. Leveraging a rendition of the signal at a lower level of quality allows to predict part of the residual information based on information already available at the decoder, further increasing encoding efficiency. Transforming a block of residuals while at the same time leveraging a rendition of the signal at a lower level of quality—i.e., effectively implementing a multiscale transform—also allows to exploit the correlation of the signal across a portion of the signal that is wider than the block itself: in this way, we can keep the block size extremely small (e.g., even 2×2) while at the same time leveraging correlation across a much wider area, achieving at the same time both computational complexity benefits and encoding efficiency benefits.

Methods illustrated herein essentially allow to transform residuals so that the number of distinct symbols in a plurality of sets of transformed quantized residual data is minimized, hence reducing the size of the bitstream that is necessary to encode and transmit said plurality of sets. In some non-limiting embodiments described herein, the quantization step is performed after the transform step at the encoding side (and consequently before the inverse-transform step at the decoding side), similarly to what has been done so far with conventional encoding methods. In other novel non-limiting embodiments described herein, the quantization step is performed before the transform step at the encoding side (and consequently after the inverse-transform step at the decoding side), effectively implementing a lossless transform method. Performing the quantization step before the transform step allows to control (and if necessary limit) the errors introduced with lossy encoding before even starting the more computationally intensive parts of encoding. Non-limiting embodiment described herein also effectively deal with the known correlations across symbols that are obtained by means of a lossless transform.

Non-limiting embodiment illustrated herein often illustrate decomposition transforms applied on 2×2 sets of residuals. This should be intended as non-limiting, and people skilled in the art can easily apply the same methods on sets of residuals with different size, including different sizes per each dimension (e.g., 2×1 sets of residuals) or more than two dimensions (e.g., L×N×M sets of residuals in a volumetric image, or in a video signal where the third dimension represents time).

In a non-limiting embodiment described herein, a first signal processor ("encoder") is configured to encode a signal in a hierarchy of levels of quality, while a second signal processor ("decoder") is configured to decode a rendition of said signal in a hierarchy of levels of quality.

The encoder receives a signal at a first level of quality and produces a rendition of the signal at a second level of quality, the second level of quality lower than the first level of quality. The encoder then processes the rendition of the signal at the second level of quality, producing a predicted rendition of the signal at the first level of quality. The encoder then generates residual data, said residual data corresponding to a difference between the signal at a first level of quality and the predicted rendition of the signal at the first level of quality. The encoder then transforms residual data by applying a decomposition transform, producing parameters ("components", or "residual components"). Decomposing the residuals to obtain residual components allows the encoder to better leverage on the correlation among the residuals; in addition, some of the components are more correlated than residuals with the rendition of the signal at the second level of quality, making them easier to transmit than non-transformed residuals. The encoder then processes said components, said predicted rendition of the signal at the first level of quality and said rendition of the signal at the second level of quality, producing transformed residuals. The encoder then encodes said rendition of the signal at the second level of quality and said transformed residuals into corresponding encoded data.

The decoder receives said encoded data and reconstructs, based at least in part on said encoded data, a rendition of the signal at the second level of quality and reconstructed transformed residuals. The decoder processes the rendition of the signal at the second level of quality, producing a predicted rendition of the signal at the first level of quality, the first level of quality higher than the second level of quality. The decoder processes said predicted rendition of the signal at the first level of quality, said rendition of the signal at the second level of quality and said reconstructed transformed residuals, producing reconstructed components. The decoder applies a reverse decomposition transform to the reconstructed components, producing reconstructed residuals. The decoder combines the predicted rendition of the signal at the first level of quality with the reconstructed residuals, producing a rendition of the signal at the first level of quality.

In a non-limiting embodiment described herein, residual components are obtained by calculations comprising additions and/or differences between the residuals, and residuals are obtained by calculations comprising additions and/or differences between residual components. In a non-limiting embodiment, operations performed to encode transformed residuals include selecting a subset of transformed residuals corresponding to a subset of contiguous residuals in the plane of residuals at a first level of quality, generating a value based at least in part on the rendition of the signal at a second (lower) level of quality, and combining said value with at least one of the residual components, producing a subset of transformed residuals corresponding to said subset of residuals.

In other non-limiting embodiments described herein, a decoder processes encoded data, generating a set of residuals corresponding to adjustments to perform to elements of a predicted rendition of a signal at a first level of quality in order to produce a rendition of the signal at the first level of quality, said predicted rendition of the signal at the first level of quality produced by the decoder based at least in part on a rendition of the signal at a second level of quality, the second level of quality lower than the first level of quality. The decoder receives encoded data corresponding to transformed residuals and produces, based at least in part on said encoded data, reconstructed residual components. The decoder then generates a set of reconstructed residuals by applying a reverse decomposition to the reconstructed residual components.

In a non-limiting embodiment, the decoder produces said reconstructed residual components also based at least in part on a rendition of the signal at the second (lower) level of quality. In a non-limiting embodiment, for each subset of elements of the signal at the first level of quality, the decoder produces a set of parameters ("reconstructed transformed residuals"). The decoder produces a value corresponding to said set of parameters, said value being based at least in part on a rendition of the signal at the second (lower) level of quality. The decoder then combines one or more parameters with said value, producing the set of reconstructed residual components corresponding to said subset of elements of the signal at the first level of quality. The decoder then processes reconstructed residual components by applying a reverse decomposition, producing a set of reconstructed residuals. In a non-limiting embodiment, each reconstructed residual in the set is obtained by additions and/or differences between the reconstructed residual components.

In some non-limited embodiments described herein, reconstructed transformed residuals are dequantized before being processed so as to produce reconstructed residual components, i.e., dequantization is performed before applying a reverse decomposition. In a non-limiting embodiment, the dequantization operations applied to each reconstructed transformed residual (or to each reconstructed residual component) vary based on the relative position of the corresponding transformed residual in the set of transformed residuals.

In other non-limiting embodiments described herein, dequantization operations are applied after the reverse decomposition, dequantizing reconstructed residuals.

In some non-limiting embodiments described herein, said value combined with a set of reconstructed transformed residuals in order to produce the corresponding set of residual components corresponds to an average of the residuals in the set ("predicted average"). In a non-limiting embodiment, the predicted average of a set of residuals is produced by averaging a set of elements of a predicted rendition of the signal at the first (higher) level of quality and subtracting a corresponding element of a rendition of the signal at the second (lower) level of quality.

In some non-limiting embodiments described herein, decomposition of residuals at a first (higher) LOQ takes advantage of the fact that the subset of residuals corresponding to a given subset of plane elements ("controlled pels") is correlated with the value of the controlling pel at the lower LOQ, since the sum of the average of the predicted elements (known to the decoder) and of the average of residuals (to be reconstructed by the decoder) corresponds to the value of the controlling pel (known to the decoder as well). In fact, in absence of quantization operations the average of residuals (or, equivalently, the sum of residuals) could be precisely determined by information already known at the decoder side before even starting to provide residual data.

There are several ways to leverage the possibility of calculating a predicted average of residuals so as to improve the efficiency of residual encoding and decoding. In a non-limiting embodiment, a plane of residuals at a first LOQ is divided in 2×2 blocks. For each 2×2 block, one of the residuals is not encoded (i.e., it is not transmitted to the decoder), since the decoder reconstructs it from the other three and from the predicted average of residuals (i.e., the decoder has the information that is necessary to produce the missing residuals based on the other three residuals of each 2×2 block). When residual data is quantized, this embodiment concentrates all of the cumulated quantization errors on one of the four residuals of each 2×2 block. Other non-limiting embodiments avoid this problem (while still maintaining the efficiency advantage of leveraging the predicted average information) by applying a decomposition transform to each block of residuals.

In some non-limiting embodiments described herein, the encoder applies a "directional decomposition" transform to each 2×2 block of residuals of a two-dimensional plane of residuals corresponding to a rendition of the signal at the first level of quality. In such embodiments, the four residual components correspond to four "directions" of variability for the 2×2 residual block: average ("A", corresponding to the "intensity tilt", conceptually orthogonal to the plane of the 2×2 block, sum of the residuals divided by four), horizontal tilt ("H", corresponding to the horizontal difference of the residuals, sum of the residuals on the left minus the sum of the residuals on the right), vertical tilt ("V", corresponding to the vertical difference of the residuals, sum of the residuals on top minus sum of the residuals on the bottom) and "diagonal" tilt ("D", corresponding to the remaining differences, not explained by a simple directional transition in the 2×2 blocks of residuals).

The difference between average component A and a predicted average (e.g., without limitation, calculated as the sum of the average of the predicted elements minus the controlling element at the lower LOQ) is called "delta average" or "δa". δa is often equal to zero for real-world signals, and as a consequence it is often preferable to calculate δa and entropy encode δa rather than component A. The horizontal and vertical tilts of a 2×2 block of residuals represent the intensity and the direction of a transition: for conventional signals, they are likely to be locally correlated, again increasing the efficiency of entropy encoding.

Other non-limiting embodiments apply other methods of directional decomposition, wherein at least one of the transformed residuals in a given set of transformed residuals corresponds to a directional tilt of the values of the set of the residuals that corresponds to said given set of transformed residual. A non-limiting embodiment calculates transformed residuals by performing calculations that include image processing operations (e.g., directional transforms, spline calculations, Sobel filter, gradient calculations, etc.).

In a non-limiting embodiment described herein, for each N×M block of residuals (e.g., without limitation, for each 2×2 block of residuals) in a plane of residuals the encoder produces a set of parameters corresponding to transformed residuals. The encoder then divides parameters into subsets—each of said subsets corresponding to a same class of transformed residuals, wherein each element of a subset corresponds to a block of residuals—and individually encodes each of the subsets (i.e., subsets are encoded separately, and parameters used to entropy encode each of the subsets are independent of entropy encoding of the other subsets).

In some non-limiting embodiments described herein, the encoder performs a directional decomposition on 2×2 blocks of residuals, and individually (i.e., separately) encodes the four subsets of δa, H, V and D parameters.

In other non-limiting embodiments, at least one encoded parameter corresponds to a plurality of transformed residuals of a same block of residuals. In a non-limiting embodiment, the encoder performs a directional decomposition on 2×2 blocks of residuals, and for each 2×2 block of residuals produces a single parameter (i.e., a single symbol) corresponding to the four parameters δa, H, V, D, wherein said parameter becomes the only encoded parameter corresponding to said block of residuals. In other non-limiting embodiments, subsets of δa parameters and D parameters are individually encoded, whereas H and V parameters are processed so as to produce a single subset of parameters, wherein each parameter corresponds to the H parameter and the V parameter of a given 2×2 block of residuals.

In other non-limiting embodiments described herein, a decoder receives data corresponding to transformed residuals for controlled pels (i.e., for elements of a rendition at a given LOQ of a signal decoded in a tiered hierarchy of LOQs). In order to reconstruct residuals based on transformed residuals, the decoder combines transformed residuals with parameters based at least in part on a rendition of the signal at an LOQ lower than said given LOQ. In a non-limiting embodiment, the decoder combines one of the transformed residuals with a difference between the setting of the controlling pel at the lower LOQ and the average of the predicted settings (i.e., the settings before adding residuals) of the controlled pels at the given LOQ. In a non-limiting embodiment, each transformed residual corresponds to a block of residuals and influences the values of all of the residuals that belong to its corresponding block.

In other non-limiting embodiments described herein, an encoder selects a block of residuals in a plane of residuals at a first (higher) LOQ, and produces a set of parameters based at least in part on the residuals in said block and on a rendition of the signal at a second (lower) LOQ.

In other non-limiting embodiments described herein, a decoder receives a set of parameters corresponding to a block of residuals in a plane of residuals at a first (higher) LOQ, and produces a set of residuals based at least in part on said set of parameters and on a reconstructed rendition of the signal at a second (lower) LOQ.

In accordance with further non-limiting embodiments, the input signal is encoded and decoded by means of a tier-based hierarchical encoding method, and planes of residuals for neighboring samples across the time dimension are produced based at least in part on a same set of elements ("support plane"), by motion compensating said support plane and by combining it with relative residuals, according to methods described in other patent applications of the same authors. In a non-limiting embodiment, transformed relative residuals are based at least in part on said support plane. In a non-limiting embodiment, both the support plane and the planes of relative residuals are encoded and decoded according to methods described herein.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 3A, 3B, 3C, 3D, 3E and 3F illustrate decomposition and inverse decomposition of residuals according to non-limiting embodiments illustrated herein.

FIGS. 4A, 4B, 4C, 4D and 4E are example diagrams describing inverse decomposition according to non-limiting embodiments illustrated herein.

FIGS. 10 and 11 are example flowcharts illustrating example methods according to embodiments herein.

DETAILED DESCRIPTION AND FURTHER SUMMARY OF EMBODIMENTS

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc.

For simplicity, along the description the illustrated embodiments usually adopt the use case of 2D images (e.g., either isolated pictures or frames/fields of a video signal), with each element (in such non-limiting example case typically referred to as a "pixel", more in general referred to as "pel") being characterized by a set of color or other parameter settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of the human eye to chrominance information).

Methods and embodiments illustrated herein can be used in conjunction with one another and/or with other methods. Many of the preferred embodiments illustrated herein describe techniques and algorithms with the goal of achieving compression, i.e., encoding a suitable rendition of the signal with a minimum quantity of bits. This also is a non-limiting example: other non-limiting embodiments achieve different purposes, such as multiscale encoding and decoding, adaptive streaming, robust and efficient filtering, signal denoising (e.g., image denoising, video denoising, etc.), signal enhancements (e.g., signal supersampling, de-interlacing, etc.), generation of signal quality metrics, content identification, machine vision, signal encryption (e.g., secure communication), etc.

Figure 1A:
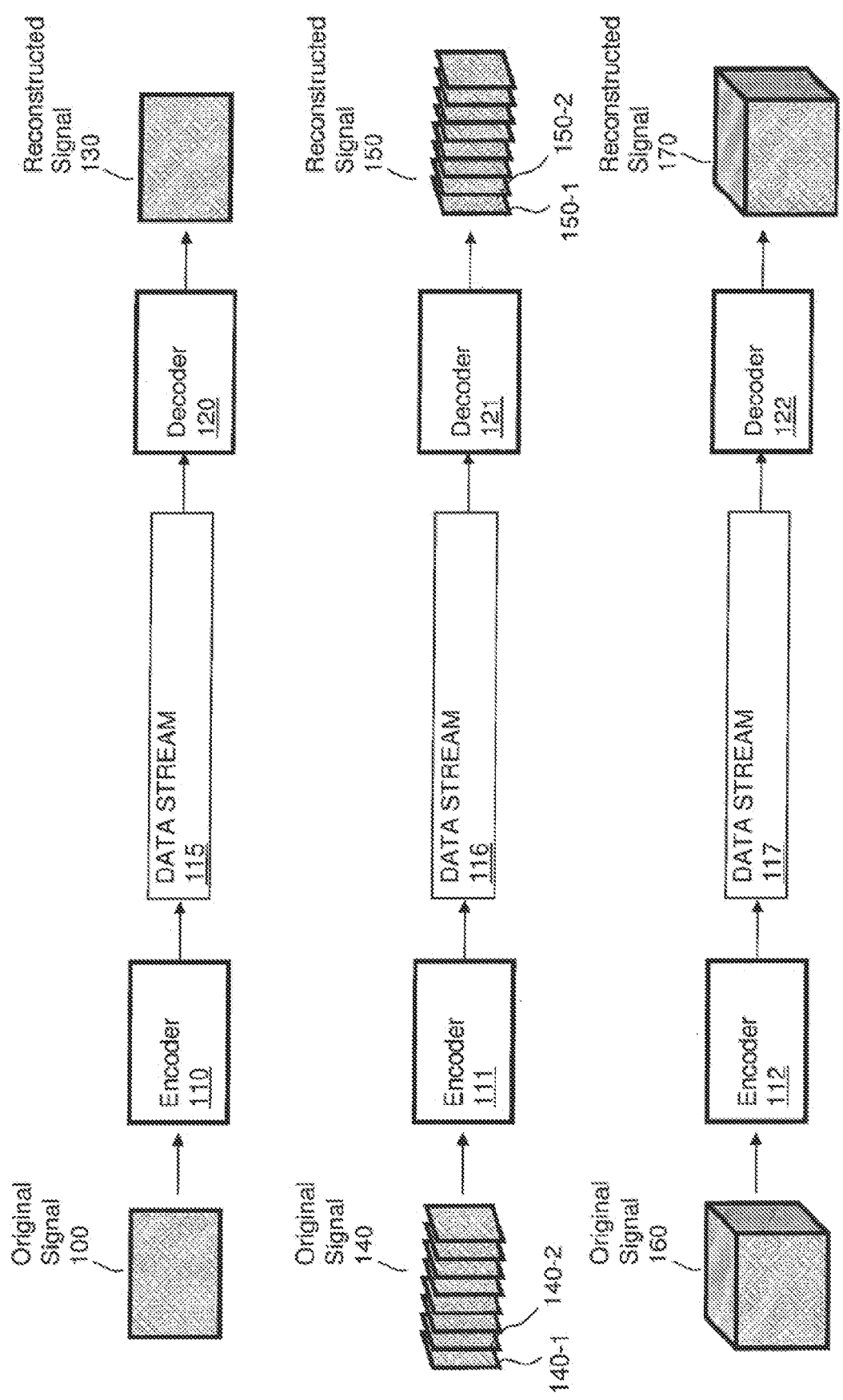
FIGS. 1A, 1B, 1C, 1D and 1E are example diagrams describing encoding and decoding systems according to non-limiting embodiments illustrated herein.

FIG. 1A is an example diagram describing non-limiting embodiments of encoding and decoding systems leveraging methods illustrated herein.

Encoder 110 receives signal 100 (such as a two dimensional image) and encodes it into data stream 115. Decoder 120 receives data stream 115 and produces reconstructed signal 130. Reconstructed signal 130 may be identical or merely substantially similar to the original signal 100 depending on whether the encoding/decoding is lossy or lossless.

In one embodiment, encoder 111 receives original signal 140 (a video signal, i.e., a sequence of multiple frames of two-dimensional images) and encodes it into data stream 116 transmitted over a respective communication link to a target recipient. Decoder 121 at the recipient receives data stream 116 and produces reconstructed signal 150, wherein reconstructed images 150-1, 150-2, . . . , 150-$n$ are reconstructed renditions corresponding to original images 140-1, 140-2, . . . , 140-$n$. Reconstructed images 150-1 can be identical or substantially similar to original images 140-1 depending on whether respective encoding and/or decoding is lossy or lossless; reconstructed images 150-2 can be identical or substantially similar to original images 140-2 depending on whether respective encoding and/or decoding is lossy or lossless; reconstructed images 150-3 can be identical or substantially similar to original images 140-3 depending on whether respective encoding and/or decoding is lossy or lossless; and so on.

In accordance with further embodiments, encoder 112 receives original signal 160 (a volumetric signal including multiple elements) and encodes it into data stream 117. Decoder 122 receives data stream 117 and produces reconstructed signal 170 (e.g., a rendition of the original signal).

Figure 1B:
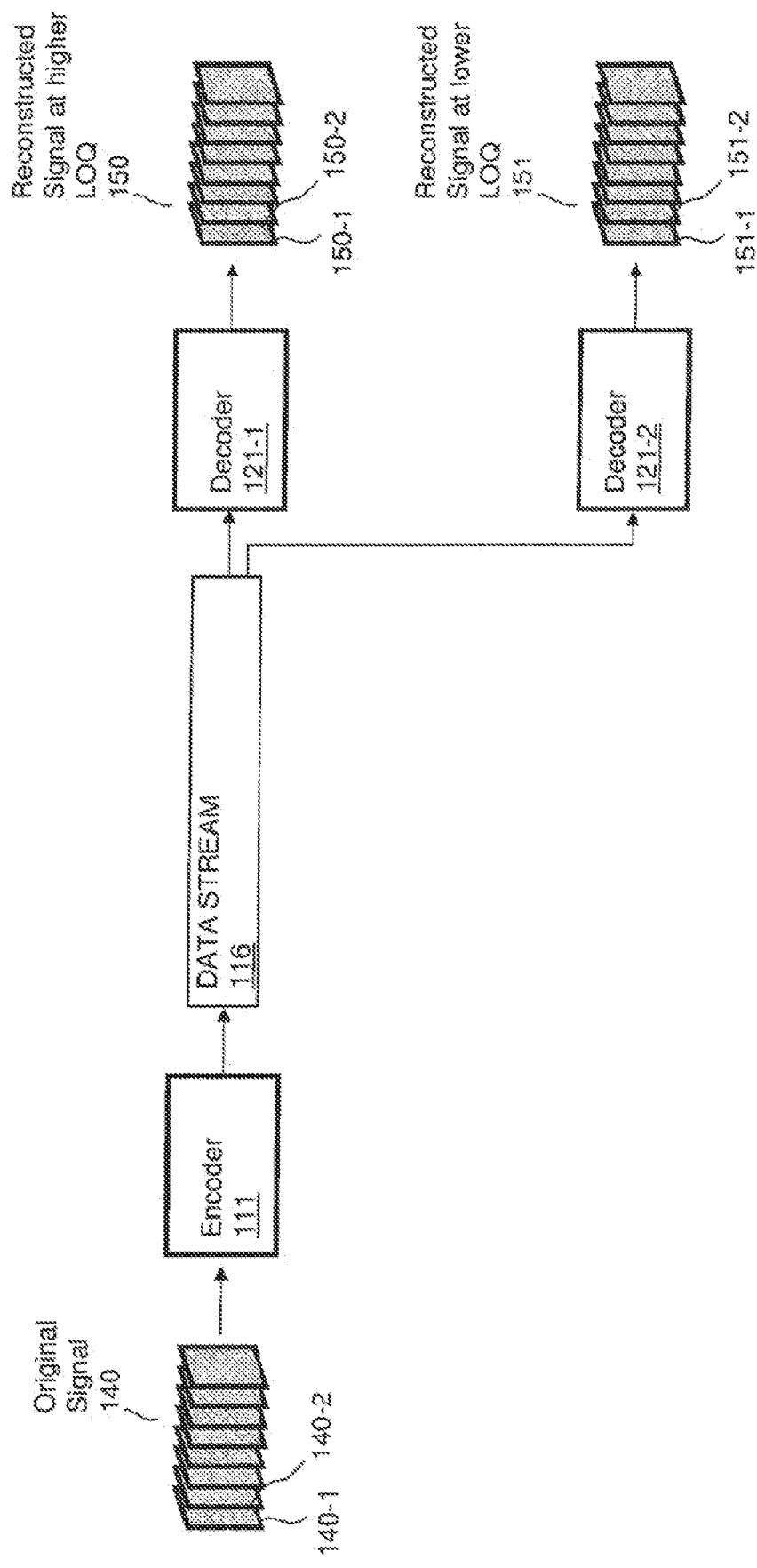

FIG. 1B is a non-limiting example diagram illustrating a multiscale encoding and decoding system according to embodiments herein.

In one embodiment, encoder 111 receives original signal 140 and encodes it into a multiscale data stream 116. In this example embodiment, decoder 121-2 receives data stream 116 and produces reconstructed signal at Lower LOQ 151 (e.g., including frames 151-1, 151-2, and so on) of at a first (lower) level of quality than original signal and/or signal 150.

Further in this example embodiment, decoder 121-1 receives data stream 116 and produces reconstructed signal at higher LOQ 150 (e.g., at a second level of quality). In this example embodiment, the second level of quality is higher than the first.

In a non-limiting embodiment, the second level of quality has a higher resolution (spatial and/or temporal) than the first level of quality. In another non-limiting embodiment, decoder 121-2 leverages MPEG-based decoding techniques (e.g., MPEG2, MPEG4, h.264, etc.) in order to decode data stream 116. In yet another non-limiting embodiment, decoder 121-1 produces reconstructed signal at lower LOQ 151 and then reconstructs or derives the reconstructed signal at the higher LOQ 150 based at least in part on first reproducing the reconstructed signal at lower LOQ 151. In other words, the decoder 121-1 uses a first portion of encoded in data stream 116 to reproduce renditions of signal 151 (e.g., 151-1, 151-2, and so on). Thereafter, the decoder 121-1 uses a second portion of data in the data stream 116 to upsample and modify renditions of signal 151 into renditions of signal 150.

In a non-limiting embodiment, the second level of quality has a resolution obtained by upsampling with a scale factor of two every spatial dimension of the first level of quality. For example, the data stream 116 can be configured to include a first portion of reconstruction data indicating how to reproduce an original element of the rendition of the signal at a first level of quality. Additional reconstruction data in the data stream 116 can indicate how to convert the element at the first level of quality into multiple elements at a second level of quality. By way of a non-limiting example, the multiple elements at the second level of quality provide a higher resolution of the original element at the first level of quality. Repeating these steps, a low resolution of an image can be converted into a higher resolution of the image. The higher image resolution provides more image details (because it includes many more image elements) and thus is likely to be more appealing to the viewer.

In other non-limiting embodiments, the second level of quality has a resolution obtained by upsampling with a specific scale factor (including non-integer scale factors and/or scale factors equal to 1) each of the dimensions of the signal. As an example, In a non-limiting example embodiment, a decoding signal processor of a TV decoder (e.g., without limitation, a set top box) is programmed so as to implement a method as illustrated in FIG. 1B, wherein Data Stream 116 corresponds to the received broadcast signal. In this way, legacy decoders receive the same Data Stream 116, but just ignore the additional data that allows to reconstruct a rendition of the signal at the higher level of quality. As mentioned, the higher level of quality can be a rendition of the signal at a higher resolution.

In other non-limiting embodiments, a streaming server processes encoded data stream 116 and, in response to characteristics of the decoder and/or to bandwidth congestion, generates a version of the data stream that only includes the encoded data necessary to decode the signal up to a given level of quality (as opposed to the maximum possible level of quality). In such an instance, bandwidth is not wasted on transmission of data that will not be used to reconstruct a rendition of the original signal.

Figure 1C:
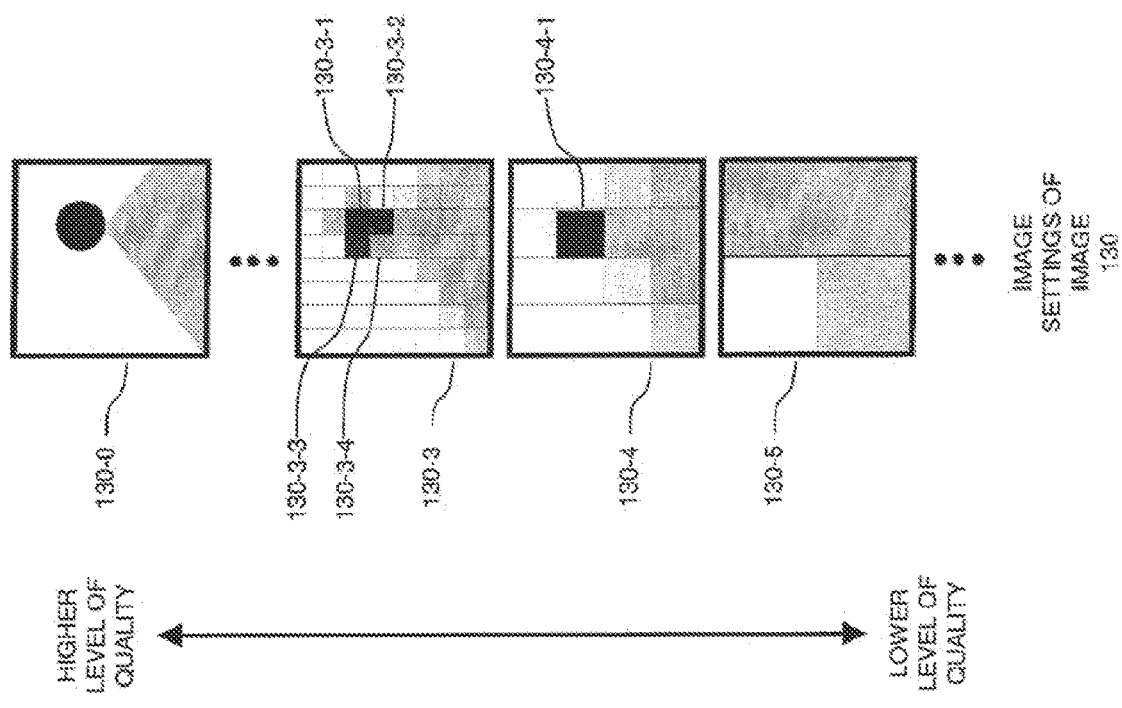

FIG. 1C illustrates a non-limiting example embodiment of tiered-based hierarchical encoding and decoding of a two dimensional image, with scale factors of two in both dimensions between any subsequent levels of quality according to embodiments herein.

In this example embodiment, image 130-3 is a rendition of the image at a given level of quality, and in particular has a resolution of 8×8 elements. Image 130-4 is a rendition of the same image at the immediately lower level of quality, and has a resolution of 4×4 elements.

Element 130-4-1 of the lower LOQ is co-located with elements 130-3-1, 130-3-2, 130-3-3 and 130-3-4 of the higher LOQ. In this example embodiment, element 130-4-1 is thus the "controlling element" (or "controlling pel", or "parent element") of elements 130-3-1, 130-3-2, 130-3-3 and 130-3-4 ("controlled elements", or "sub-elements").

Other non-limiting embodiments apply the same methods on images with more than two dimensions, producing tiered hierarchies with suitable scale factors for each tier, including non-integer scale factors and/or different scale factors for different dimensions and/or different scale factors along the hierarchy.

Figure 1D:
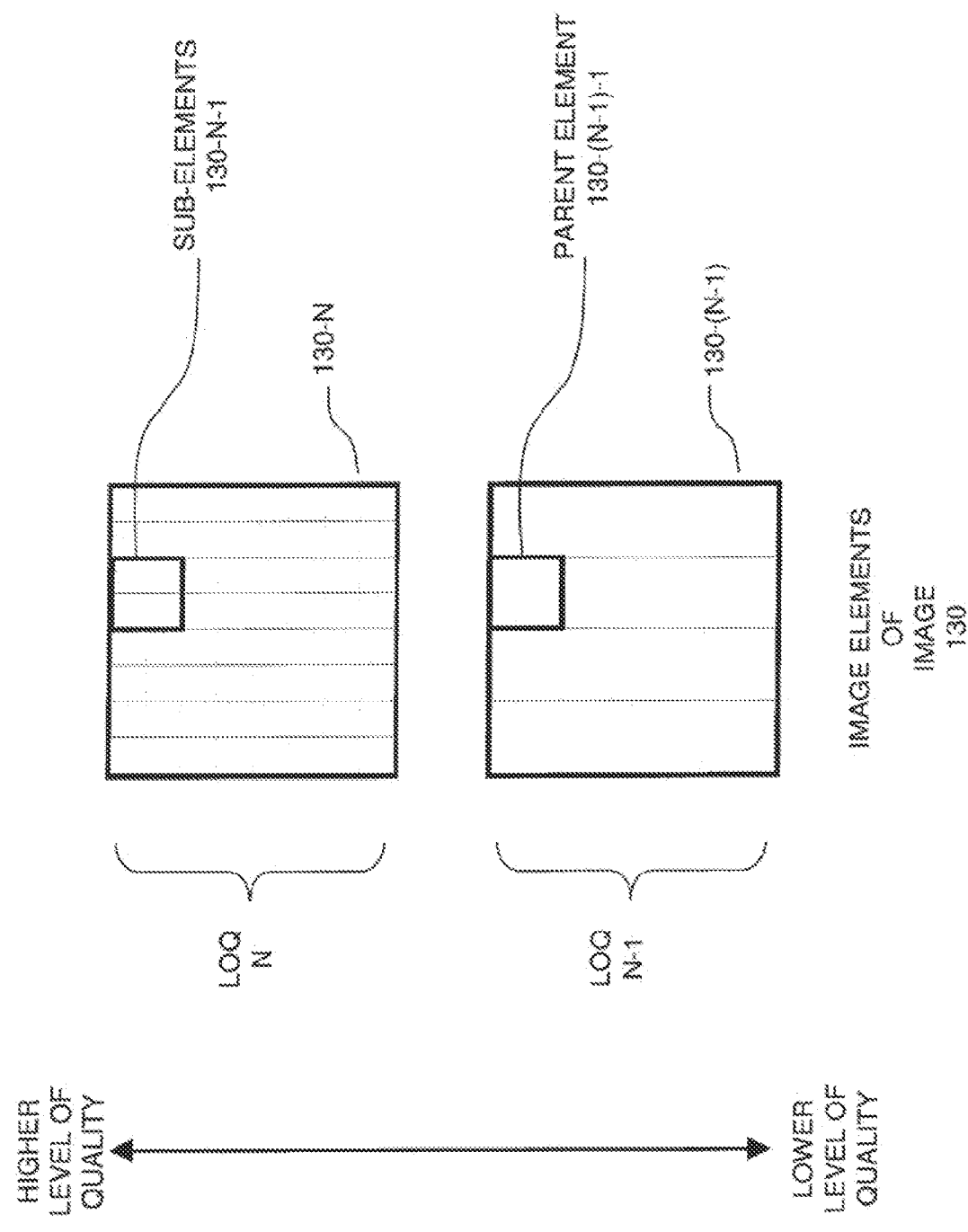

FIG. 1D illustrates another non-limiting example embodiment of tiered-based hierarchical encoding and decoding of a two dimensional image, with scale factors of two in both dimensions between LOQ N−1 and LOQ N according to embodiments herein.

Parent Element 130-(N−1)-1 of LOQ N−1 ("controlling element") is co-located with corresponding four sub-elements 130-N-1 of LOQ N ("controlled elements"). In general, the parent element 130-(N−1)-1 is used as a baseline in which to reproduce (e.g., via upsampling followed by adjustments using residual data) the corresponding four sub-elements 130-N−1.

Figure 1E:
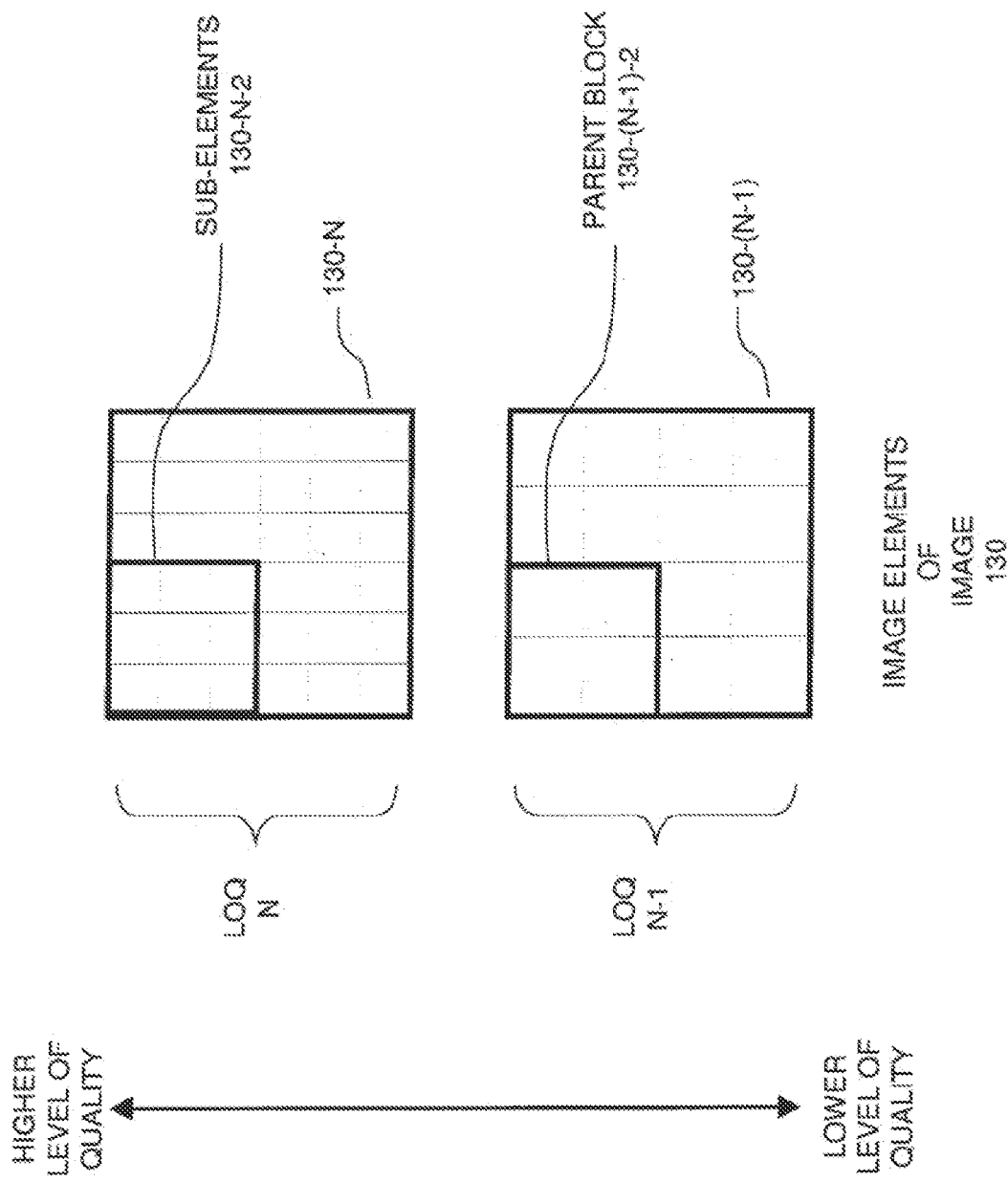

FIG. 1E illustrates another non-limiting example embodiment of tiered-based hierarchical encoding and decoding of a two dimensional image, with non-integer scale factors of 3/2 in both dimensions between LOQ N−1 and LOQ N according to embodiments herein.

Parent block 130-(N−1)-2 of LOQ N−1 (a group of controlling elements, since in this case no single element of LOQ N−1 is precisely co-located with a set of elements of LOQ N) is co-located with sub-elements 130-N-2 of LOQ N (set of controlled elements). In this non-limiting example, calculating a predicted average for residuals corresponding to sub-elements 130-N-2 may require processing both a predicted rendition of sub-elements 130-N-2 and parent block 130-(N−1)-2 (as opposed to a single parent element).

For simplicity and for the sake of further illustration, following portions of the disclosure include examples using scale factors of two from one level of quality to the next. However, those skilled in the art can easily adapt all of the methods described herein for tiered hierarchies with any of multiple different types of scale factors, including anisotropic and/or non-integer scale factors.

Figure 2A:
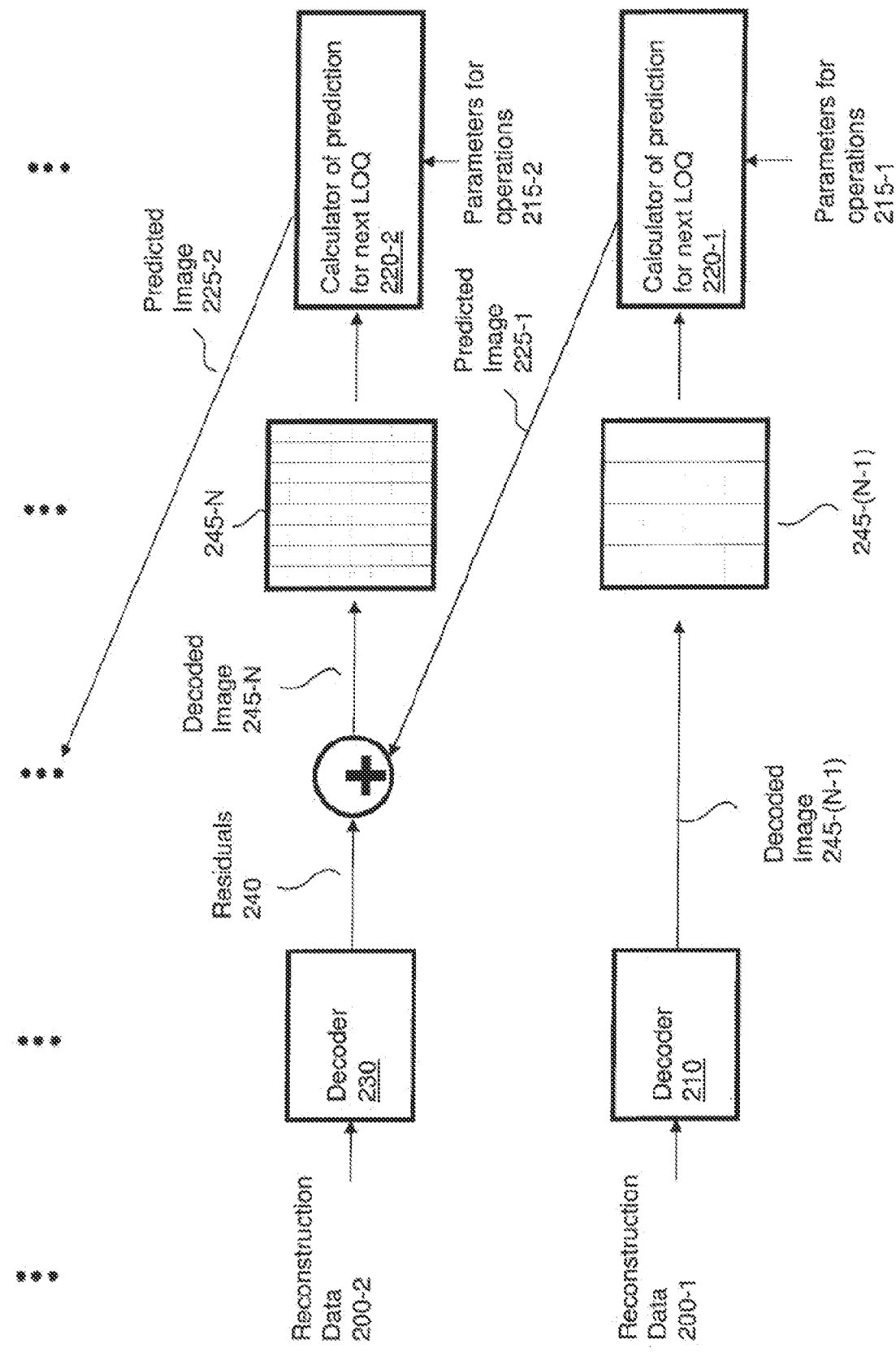
FIGS. 2A and 2B are example diagrams describing tiered-based hierarchical decoding and encoding according to non-limiting embodiments illustrated herein.

FIG. 2A is an example diagram describing decoding of a signal in a tiered hierarchy of levels of quality according to embodiments herein.

In this example embodiment, decoder 210 receives reconstruction data 200-1 and produces decoded image 245-(N−1) at LOQ N−1 (in this example the bottom level of quality or lower level of quality).

Calculator of prediction for next LOQ 220-1 processes image 245-(N−1) with operations as specified by corresponding parameters for operations 215-1, producing predicted image 225-1. Assuming a 2×2 upscale factor, calculator 220-1 produces predicted image 225-1 specifying settings for an 8×8 block of elements.

Decoder 230 receives reconstruction data 200-2 and produces residuals 240 (i.e., reconstruction data or residual data). In this example embodiment, residuals 240 can be an 8×8 matrix of element settings information matching the number of elements in image 245-N.

Predicted image 225-1 also produced by calculator 220 also can be an 8×8 matrix of element settings information matching the number of elements in image 245-N.

In one embodiment, the upsampling of the image 245-(N−1) into predicted image 225-1 is merely a baseline images including 8×8 elements. Predicted image 225-1 and residuals 240 are combined, on an element-by-element basis, producing decoded image 245-N, which is a rendition of the signal at LOQ N (e.g., 8×8 elements). In one embodiment, the residuals 240 include a set of 8×8 elements that are added or combined with elements in the predicted image 225-1 to produce image 245-N. Application of residuals 240 to predicted image 225-1 produces a more accurate rendition of the signal at the corresponding level of quality. In other words, the rendition of the signal 245-N is a more accurate rendition of the original signal than is the predicted image 225-1.

Additional details of decoding such as upsampling and applying residual data (such as adjustment values) is discussed in related and earlier files U.S. Provisional patent application Ser. No. 13/188,201 entitled "Tiered Signal Decoding and Signal Reconstruction," filed on Jul. 21, 2011, the entire teachings of which are incorporated herein by this reference.

Renditions of the signal at each subsequently higher LOQs can be produced according to the same method: producing, based on the rendition at the current LOQ, a predicted rendition at the next higher LOQ; decoding residuals; combining predicted rendition at the higher LOQ with decoded residuals, producing a rendition of the signal at the higher LOQ. Combining can include, for each element in the array, selecting a location of an element within the predicted image 225-1 and the residuals 240 and summing the values to produce a value for the corresponding element in image 245-N.

In a non-limiting embodiment, decoder 210 utilizes—in order to decode reconstruction rata 200-1—a decoding method that is different from the decoding method utilized by decoder 230. In one non-limiting example embodiment, decoder 210 implements an H.264 decoding method.

In other non-limiting embodiments, decoder 230 produces residuals 240 based on a set of encoded data ("support plane" encoded data) that is leveraged also to produce residuals for a neighboring image in a sequence of images.

Thus, any suitable upsampling algorithm can be used to convert a baseline signal or image at a first level of quality to a higher resolution predicted image at a next higher level of quality.

Figure 2B:
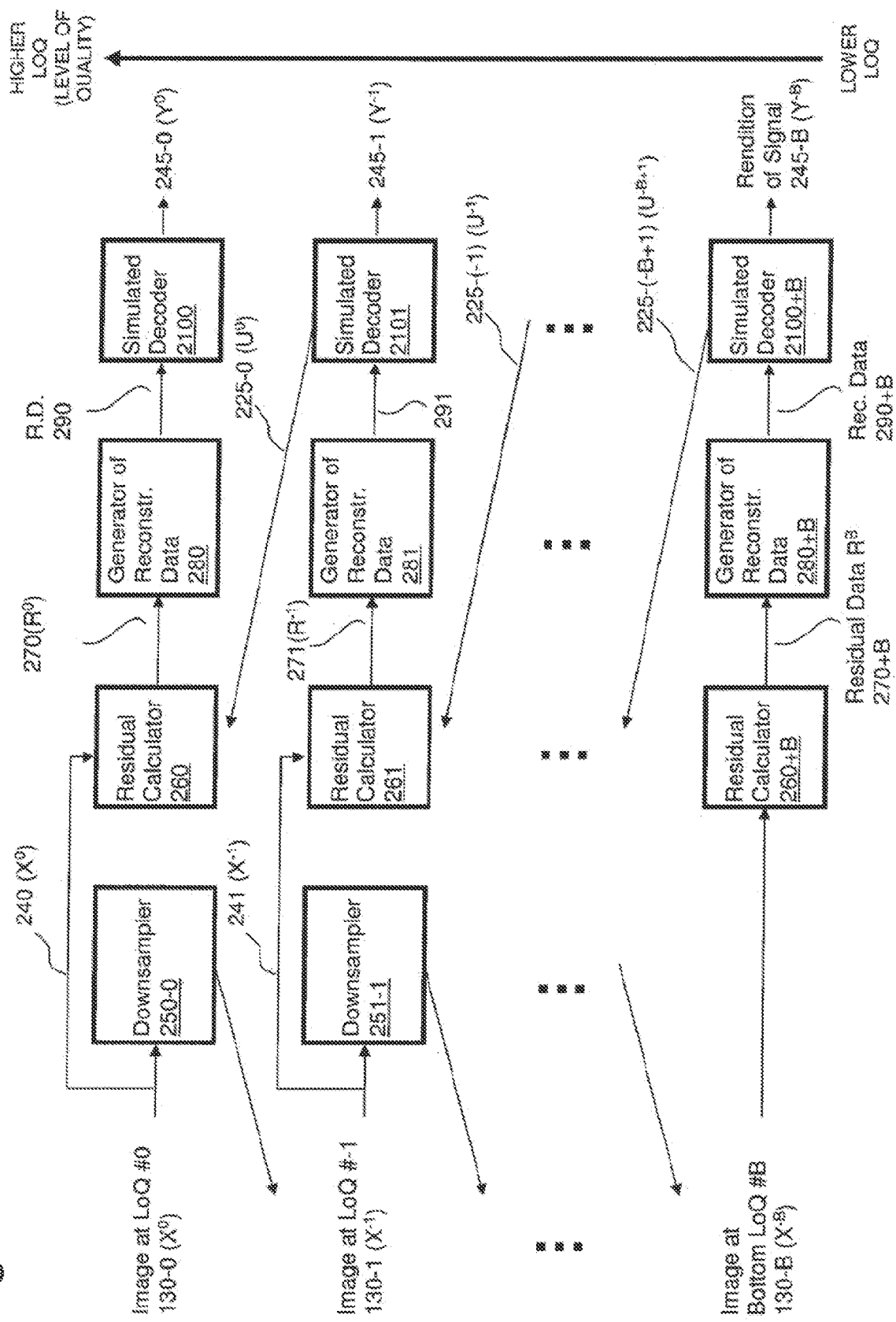

FIG. 2B is an example diagram describing of an encoder encoding of a signal in a tiered hierarchy of levels of quality according to embodiments herein.

A signal processor configured as an encoder receives as input image 130-0 at LOQ #0 such as an image at a higher resolution. Image 130-0 is processed by downsampler 250-0, producing image 130-1 at LOQ #-1. Image 130-1 is processed by downsampler 251-1, producing image 130-2 at a next lower LOQ #-2. This downsampling process is repeated until image 130-B at bottom LOQ #B (a yet lower level of quality) is produced.

Once image 130-B is produced at a lowest level of quality, the encoder starts to produce the reconstruction data (residual data or adjustment values) that will be necessary at the decoding side (i.e., decoder) in order to reconstruct a rendition of the original signal at different levels of quality (or, more precisely, a tiered hierarchy of renditions of the signal).

In this example embodiment, in order to do this, the encoder produces the reconstruction data for the bottom LOQ (starting LOQ for the reconstruction of the signal), and then simulates all of the operations that will be performed by the decoder in order to progressively reconstruct, based on a lower LOQ, to each next higher LOQ. Creating adjustment values for each element when traversing upwards in the hierarchy, enables a respective decoder to reproduce a rendition of the original signal at each of multiple levels of quality.

In one embodiment, the lowest level of quality is the lowest resolution. The successively higher levels of quality represent higher resolution renditions of the signal.

In this example embodiment, image 130-B is processed by residual calculator 260+B, producing residual data RB 270+B. Residual data 270+B is processed by generator of reconstruction data 280+B, producing reconstruction data 290+B.

Reconstruction data 290+B is processed by simulated decoder 2100+B, producing rendition of signal 245-B at the bottom LOQ #B and predicted rendition 225-(B+1) at LOQ #(-B+1). Predicted renditions at any given LOQ #N are processed by the encoder together with the corresponding image 130-N in order to produce residual data.

Residual calculator 261 receives image 130-1 at LOQ #-1 and predicted rendition 225-(−1) at LOQ #-1, producing residual data 271. In one embodiment, residual data 271 (or reconstruction data) includes adjustment values to be applied to the received predicted rendition 225-(−1) in order to reproduce the rendition of the signal at the corresponding level of quality #-1. Residual data 271 is processed by generator of reconstruction data 281, producing reconstruction data 291.

Reconstruction data 291 is processed by simulated decoder 2101, producing rendition of signal 245-1 at LOQ #-1 and predicted rendition 225-0 at LOQ #0.

Residual calculator 260 receives original image 130-0 at LOQ #0 and predicted rendition 225-0 at LOQ #0, producing residual data 270. In one embodiment, residual data 270 (or reconstruction data) includes adjustment values to be applied to the received predicted rendition 225-0 in order to reproduce the rendition of the signal at the corresponding level of quality #0. Residual data 270 is processed by generator of reconstruction data 280, producing reconstruction data 290.

Reconstruction data 290 is processed by simulated decoder 2100, producing rendition of signal 245-0, which is the rendition of signal at the highest LOQ in the hierarchy of renditions that will be generated at the decoding side.

In a non-limiting embodiment, the encoder verifies that rendition 245-0 is suitably similar to original image 130-0, according to a quality metric. If the quality metric score falls below a threshold, the encoder re-processes reconstruction data for one or more LOQs (e.g., by adjusting suitable encoding parameters), up until a quality metric for the similarity between 245-0 and 130-0 is above a threshold.

In another non-limiting embodiment, the encoder verifies that the amount of bitstream necessary to encode reconstruction data 290, 291, . . . , 290+B is below a maximum threshold. If the necessary amount of bitstream is above a threshold, the encoder re-processes reconstruction data for one or more LOQs (e.g., by adjusting suitable encoding parameters), up until the necessary amount of data to be transmitted in the bitstream is below the threshold.

Additional details of encoding such as downsampling and producing residual data (such as adjustment values) is discussed in related and earlier files U.S. Provisional patent application Ser. No. 13/188,207 entitled "Signal Processing and Tiered Signal Encoding," filed on Jul. 21, 2011, the entire teachings of which are incorporated herein by this reference.

Figure 3B:
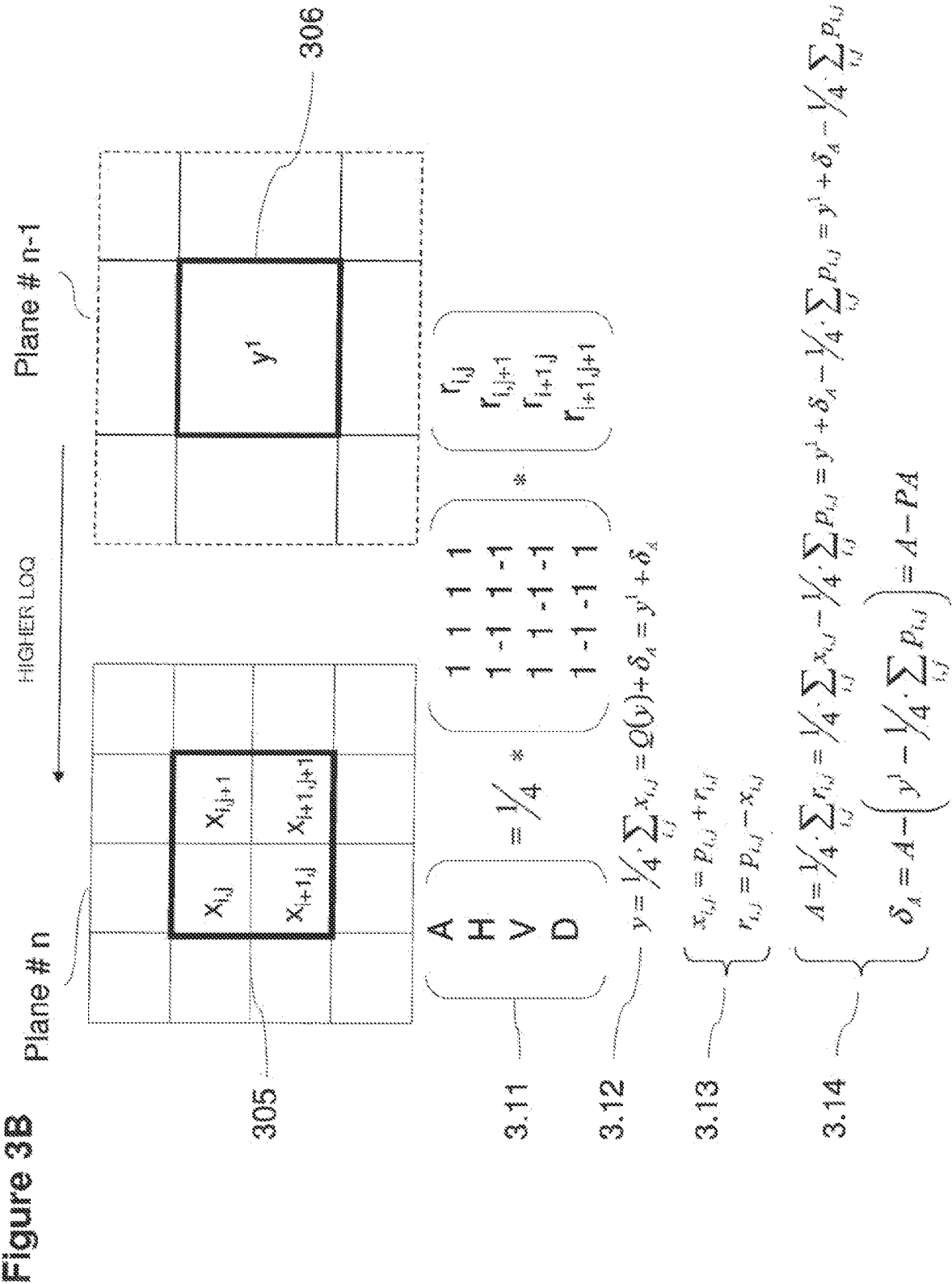

FIGS. 3A and 3B illustrate an example of directional decomposition according to embodiments herein. The directional decomposition is applied to groupings of 2×2 blocks of residuals, in the case of 2D upsampling with scale factor of two along both dimensions (i.e., for every parent element at LOQ #(N−1) there are four controlled pels (i.e., picture elements) at the next higher LOQ #N, and consequently four residuals must be decoded in order to suitably reconstruct said controlled pels.

Directional decomposition represents a way of encoding reconstruction data (such as residual data) in a useful manner.

In this example, assume that block of residuals 300 is a portion of a plane of residual data at a given LOQ #N that is processed by a decoder and combined with a predicted rendition of a signal at the given LOQ #N in order to produce a rendition of the signal at said given LOQ #N. In particular, block of residuals 300 is made of the four residuals $r_{i,j}$, $r_{i,j+1}$, $r_{i+1,j}$ and $r_{i+1,j+1}$. Residual $r_{i,j}$ is an adjustment value indicating how to modify a corresponding element $p_{i,j}$ in the predicted image to reproduce a rendition of element $x_{i,j}$; reconstruction data $r_{i,j+1}$ is an adjustment value indicating how to modify a corresponding element $p_{i,j+1}$ in the predicted image to reproduce a rendition of element $x_{i,j+1}$; reconstruction data $r_{i+1,j}$ is an adjustment value indicating how to modify a corresponding element $p_{i+1,j}$ in the predicted image to reproduce a rendition of element $x_{i+1,j}$; reconstruction data $r_{i+1,j+1}$ is an adjustment value indicating how to modify a corresponding element $p_{i+1,j+1}$ in the predicted image to reproduce a rendition of element $x_{i+1,j+1}$.

In particular, block of residuals 300 corresponds to a block 305 of image elements $x_{i,j}$, $x_{i,j+1}$, $x_{i+1,j}$, $x_{i+1,j+1}$ at LOQ #N controlled by a parent element y1 306 at the lower LOQ #(N−1) that was generated by the encoder based on the image elements at LOQ #N.

In this non-limiting embodiment the settings y1 of the parent element were generated by quantizing a weighted average of the settings of the elements corresponding to block 300, with one of multiple downsampling algorithms such as a bilinear filtering kernel and with the parent element sampling position located at the center of the block (i.e., in the non-limiting case of bilinear filtering, the parent element corresponds to a simple average of the controlled pels). As a consequence, the sum of the residuals of controlled pels (i.e., the sum of $r_{i,j}$, $r_{i,j+1}$, $r_{i+1,j}$ and $r_{i+1,j+1}$) depends at least in part on the setting of parent element y1; in fact, in the absence of quantization operations, it would be precisely determined by the parent element, which is already known to a decoder by the time that it starts reconstructing block 300.

In order to suitably leverage such information, the encoder as discussed herein performs a decomposition transform that jointly takes advantage of two types of correlation: (1) the self-correlation among residuals of block 300, and (2) the correlation between residuals of block 300, predicted elements corresponding to block 300 and the parent element. As mentioned, decomposition is a way of encoding the residuals 300 into different formats (e.g., directional components 320 and then transformed residuals 350 that are more suitable for transmission over a communication link to remote target device that decodes the data to reproduce an image).

More specifically, in this example embodiment, in order to exploit self-correlation among residuals, the encoder applies a "directional decomposition" transformation to the residuals, producing the four directional components A, H, V and D:

A is the average of the residuals $r_{i,j}$, $r_{i,j+1}$, $r_{i+1,j}$, $r_{i+1,j+1}$;
H is the horizontal/latitudinal tilt of said residuals;
V is the vertical/longitudinal tilt of said residuals;
D is the diagonal/oblique tilt of said residuals.

In general, the values H, V, and D include sufficient decoding information to convert the value A into more specific settings for each of the residual components $r_{i,j}$, $r_{i,j+1}$, $r_{i+1,j}$, $r_{i+1,j+1}$.

From a geometrical point of view, the transformation is equivalent to replacing four samples in space with their representation given by a plane located on the z-axis at the average of the samples and slanting accordingly to reconstruct the 4 samples, as illustrated in FIG. 3A.

As already mentioned, the transformation is aimed at two objectives: exploiting correlation among residuals (e.g., directional correlation of lines and of typical patterns of an image) and reducing the information entropy corresponding to average A, which can be easily predicted at the decoder side based at least in part on predicted values.

At encoder side, the encoder knows that the parent element had been computed according to formula 3.12 in FIG. 3B. The difference δa between y and y1 comes from the errors generated during the quantization/de-quantization processes. According to equation 3.14 in FIG. 3B, by subtracting from y1 the average value of the predictions p for the settings x of controlled pels, it is possible to generate a prediction ("PA", for "predicted average") for the average value of the four residuals 300, such that the difference between A and PA is equal to δa.

In this example embodiment, the encoder thus generates transformed residuals 350 as follows:
Processing residuals 300 with Directional Decomposer 310, producing Directional Components 320. In particular, Directional Components are calculated according to the calculations illustrated in formula 3.11.
Producing Predicted Average 340.
Processing Directional Components 320 and Predicted Average 340 with Transformed Residuals Calculator 330, producing Transformed Residuals 350.

In a non-limiting embodiment, δa is calculated according to the formula δa=A−PA=A−(y'k,h−AvgP), wherein AvgP is the average value of the predictions p for the settings x of controlled pels.

In a non-limiting embodiment, when calculating Directional Components 320 the encoder does not divide by 4 as indicated in formula 3.11 in FIG. 3B, in order to reduce the calculations necessary for the inverse decomposition process necessary at the decoding side.

In a non-limiting embodiment, a decoder receives transformed residuals δa, H, V, D (calculated by the encoder as described above) and calculates residuals ri,j, ri,j+1, ri+1,j, ri+1,j+1 by first producing a predicted average PA and reconstructing components A, H, V, D, and then by solving for ri,j, ri,j+1, ri+1,j, ri+1,j+1 the equation indicated in formula 3.11.

In another non-limiting embodiment, the decoder receives transformed residuals δa, H, V, D and computes A according to the formula A=δa+(y'k,h−AvgP), wherein AvgP is the average value of the predictions p for the settings x of controlled pels. From an information entropy point of view, the benefit of transmitting/receiving δa (i.e., the difference between the actual average of residuals and the predicted average of residuals) rather than the value A (average) is based on the fact that δa is very likely equal to zero (or be nearly zero), so the zero symbol becomes more likely to be found in the sequence of encoded transformed residuals, thus improving encoding efficiency. In other words, transmitting the value δa as opposed to transmitting the value A saves on the amount of data bits that are needed to encode the residuals 300. After having computed A in this example, the decoder calculates residuals ri,j, ri,j+1, ri+1,j, ri+1,j+1 by solving for ri,j, ri,j+1, ri+1,j, ri+1,j+1 using the equation indicated in 3.11.

As indicated above, decomposing the residuals 300 so as to subsequently produce transformed residuals 350 takes advantage of the correlation between the residuals. In a non-limiting embodiment, the decomposition allows to separate the residuals in a constant part and one or more variable parts. Some of the transformed elements might be predictable, making it easier to transmit them. In one embodiment, the transformed residuals 350 are obtained based on a combination of additions and/or differences between of individual components.

Illustrating it with equations, starting from vector r (comprising the four residuals 300 such as rij) the encoder calculates vector 1, wherein vector 1 contains four parameters derived from the average A, the horizontal tilt H, the vertical tilt V and the diagonal tilt D. In particular, vector 1 is calculated by multiplying vector r with matrix M. The decoder receives parameters allowing it to reconstruct vector 1 (in particular, in the non-limiting embodiment described above, instead of receiving parameter A, the decoder receives parameter δa indicating the difference between A and the predicted average of residuals PA). After having reconstructed 1, the decoder reconstructs vector r by multiplying the inverse of matrix M with vector 1. As illustrated by the following equations in FIG. 3B, in a non-limiting embodiment matrix M−1 is identical to matrix M:

$$\underline{l} = \underline{M} \cdot \underline{r}$$

$$\begin{pmatrix} 4a \\ 4v \\ 4h \\ 4d \end{pmatrix} = \begin{pmatrix} 1 & 1 & 1 & 1 \\ -1 & -1 & 1 & -1 \\ 1 & 1 & -1 & -1 \\ 1 & -1 & -1 & 1 \end{pmatrix} \begin{pmatrix} r_{00} \\ r_{01} \\ r_{10} \\ r_{11} \end{pmatrix}$$

$$\underline{r} = \underline{M}^{-1} \cdot \underline{l} = \underline{M} \cdot \underline{l}$$

In another non-limiting embodiment, different residuals in a set of transformed residuals are quantized according to different quantization parameters. This is due to the different relative importance of directional components for perceived quality, which allows to quantize certain transformed residuals differently than others without noticeable differences in quality. In other words, as mentioned, the reconstruction data or residual data at each corresponding level of quality to which the data pertains is responsible for adding details back into a predicted rendition of the signal such that the produced rendition of the signal more accurately reflects the original signal for the corresponding level of quality.

For example, the transformed residuals corresponding to the average or the diagonal components are quantized more aggressively than the others. In one embodiment, the decoder dequantizes different residuals according to different dequantization parameters. In another embodiment, different quantization parameters allow to enhance the precision of the vertical tilt and horizontal tilt of residuals (to which the human eye is particularly sensitive) independently of the precision of diagonal/oblique information, so that, in case of quantization artifacts (e.g., image errors that occur due to filtering to save data bits) introduced by compression, specific components of residuals are privileged in terms of bitrate allocation.

In another non-limiting embodiment, H and V parameters are quantized differently according to an estimate of amounts of horizontal vs. vertical correlation in a signal (e.g., a field in an interlaced video is often characterized by higher horizontal correlation than vertical correlation, so it can be efficiently encoded by quantizing H and V differently).

In another non-limiting embodiment, for the last level of quality the decoder receives only parameters corresponding to H and V, and reconstructs the full set of directional components (and then the residuals) by setting A and D to default values.

Other non-limiting embodiments adopt similar residual transformation methods in order to encode and/or decode residuals for sets of controlled pels featuring more than two dimensions (e.g., by way of non-limiting example, residuals for sets of eight controlling pels obtained by means of a three-dimensional upsampling operation), and/or different scale factors from a lower LOQ to the next higher LOQ.

People skilled in the art can easily deduct the transformation matrix to be used in other embodiments operating on upsampling operations involving more than two dimensions (e.g., by ways of non-limiting example, operations involving two spatial dimensions and a time dimension all with a scale factor of two, reconstructing 8 controlled pels in a higher LOQ for each controlling pel in a lower LOQ). By way of non-limiting example, a volumetric upsampling with scale factor of two in all dimensions requires an 8×8 residual decomposition transform matrix, calculating 8 directional gradients/residual tilts. In a non-limiting embodiment, for each 2×2×2 block of the signal the encoder computes (and the decoder receives and decodes) one parameter corresponding to the average residual value and 7 parameters corresponding to 7 residual tilt values.

In another non-limiting embodiment, both the encoder and the decoder operate separately on the time and space dimensions. Temporal tilt is transmitted and decoded first, and then the remaining 6 values (3 per each spatial plane) are transmitted as oblique spatial values.

In another non-limiting embodiment, encoder and decoder use a full-fledged directional decomposition method on two dimensions (e.g., at the encoder, for each 2×2 block of residuals: calculating average A, horizontal tilt H, vertical tilt V and diagonal tilt D of residuals, and then encoding—instead of the average A—the difference δa between the average A and the predicted average PA; at the decoder: receiving difference δa between average A and predicted average PA, horizontal tilt H, vertical tilt V and diagonal tilt D, and calculating from such parameters the four residuals), and then a partial directional decomposition on the third dimension (e.g., along time, calculating, encoding and decoding only the tilt between the two averages of the 2×2 blocks of residuals).

In another non-limiting embodiment, the encoder can choose the option to avoid transmitting one residual for each set of residuals corresponding to a same controlling pel at a lower LOQ. This is equivalent to quantize δa to zero, regardless of its actual value.

In other non-limiting embodiments, the decoder receives complete sets of residuals, and exploits the redundancy in residual information for error correction or error detection purposes, enhancing transmission robustness.

In other non-limiting embodiments with scale factors among LOQs different from 2 for one or more directions, encoder and decoder calculate the predicted average for a set of residuals based at least in part on the values of a plurality of elements of the rendition of the signal at the lower LOQ.

In other non-limiting embodiments, the encoder applies decomposition transforms to specific sets of residuals, with the goal of maximizing the number of transformed residuals that are assigned a value equal to zero. This is due to the fact that entropy encoding techniques are more efficient when compressing a stream of numbers that include a higher percentage of values equal to zero. In a non-limiting embodiment, parameters corresponding to the applied decomposition transforms are transmitted to the decoder, along with reconstruction data.

In a non-limiting embodiment, the encoder selects sets of residuals of different images at a same LOQ in a sequence of images, said sets of residuals corresponding to a same location (i.e., set of coordinates) along multiple subsequent images (e.g., multiple sampling positions along time). For each given position in the sets of residuals, the encoder selects the residuals of the sets that are in that position (e.g., a temporal sequence of residuals along time) and generates a sequence of transformed residuals starting with a value corresponding to the average of said residuals and then—corresponding to each given residual—values corresponding to the step between the previous residual and the given residual. In this way, the encoder represents very efficiently a sequence of multiple values that are constant for a while, then change to a different value, and remain constant again thereafter: in fact, such a sequence is represented with only two values different from zero (i.e., the value corresponding to the average and the value corresponding to the pel where the step change happens). In such an embodiment, in order to reconstruct the original residuals, the decoder processes transformed residuals and calculates residuals by multiplying transformed residuals by matrixes such as the following (depending on the number of residuals in the sequence):

$$\underline{\underline{M}} = \begin{pmatrix} 1 & 2 & 1 \\ 1 & -1 & 1 \\ 1 & -1 & -2 \end{pmatrix}; \begin{pmatrix} 1 & 3 & 2 & 1 \\ 1 & -1 & 2 & 1 \\ 1 & -1 & -2 & 1 \\ 1 & -1 & -2 & -3 \end{pmatrix};$$

$$\begin{pmatrix} 1 & 4 & 3 & 2 & 1 \\ 1 & -1 & 3 & 2 & 1 \\ 1 & -1 & -2 & 2 & 1 \\ 1 & -1 & -2 & -3 & 1 \\ 1 & -1 & -2 & -3 & -4 \end{pmatrix}; \begin{pmatrix} 1 & 5 & 4 & 3 & 2 & 1 \\ 1 & -1 & 4 & 3 & 2 & 1 \\ 1 & -1 & -2 & 3 & 2 & 1 \\ 1 & -1 & -2 & -3 & 2 & 1 \\ 1 & -1 & -2 & -3 & -4 & 1 \\ 1 & -1 & -2 & -3 & -4 & -5 \end{pmatrix}, \text{etc.}$$

Figure 3C:
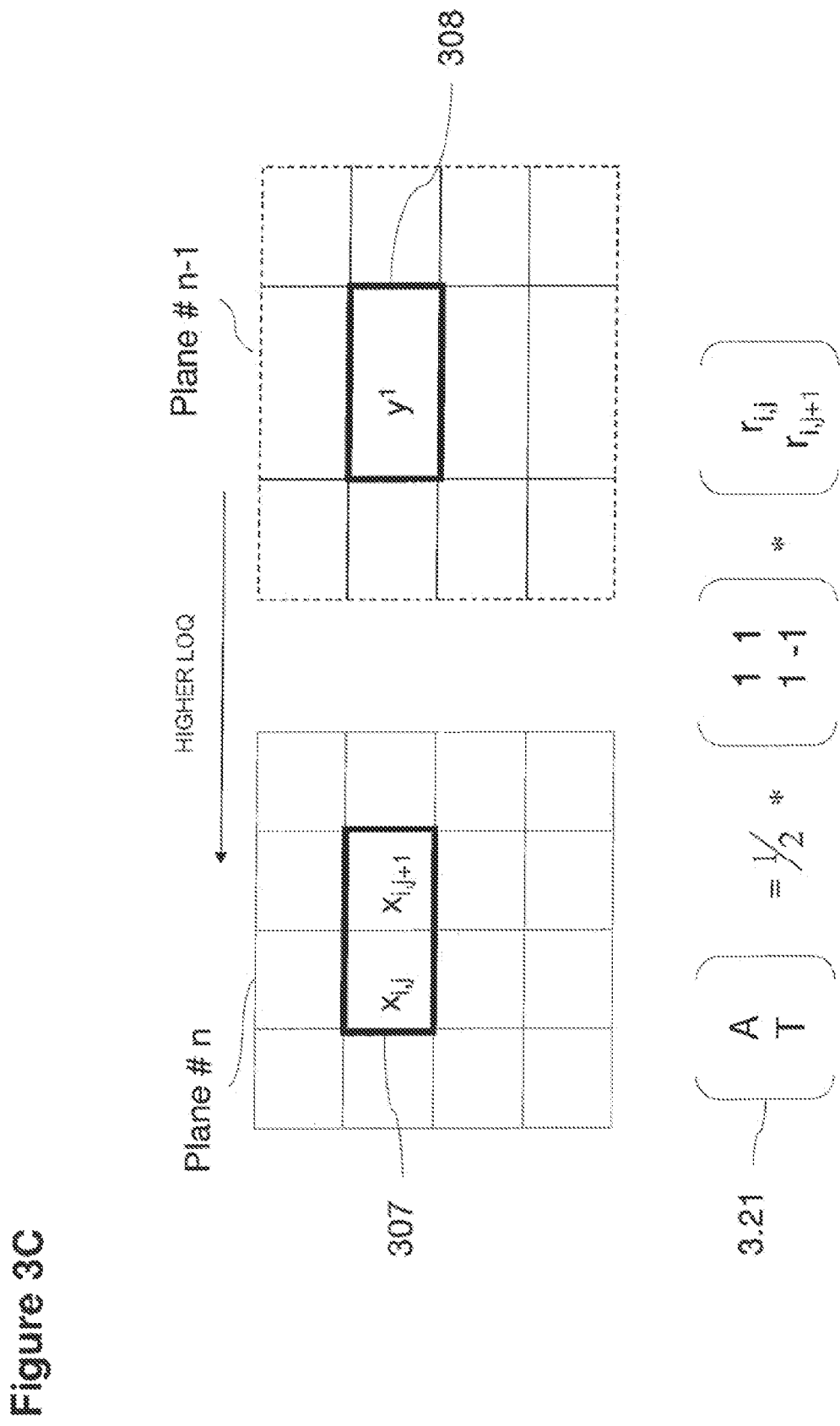
Figure 3D:
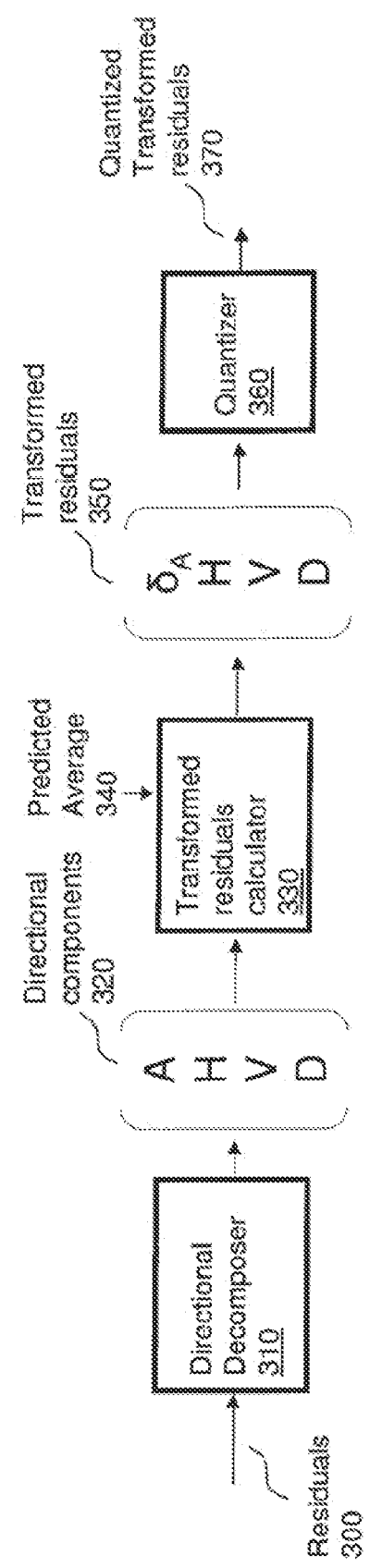
Figure 3E:
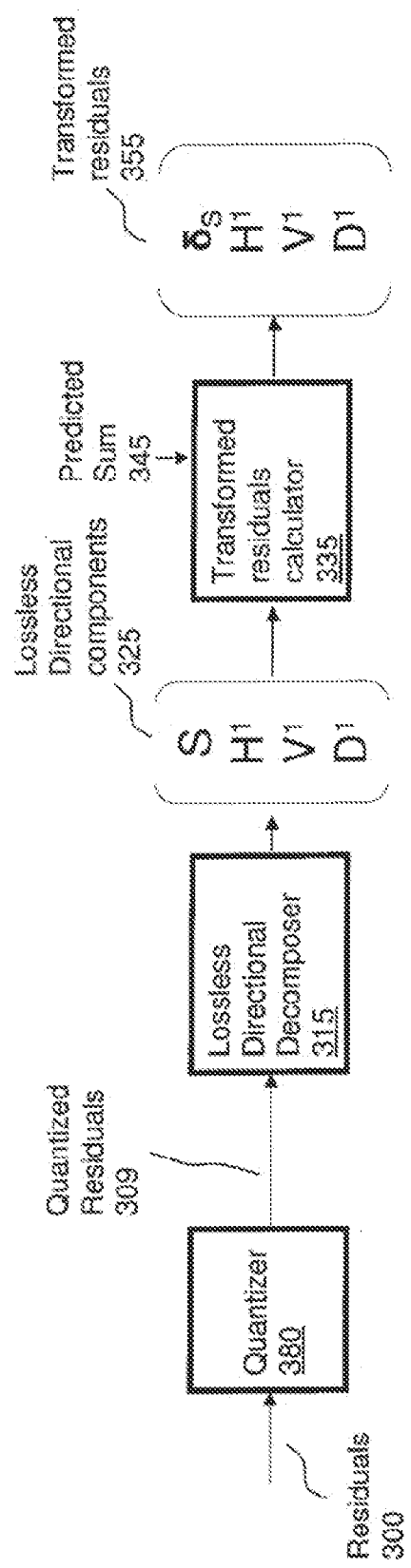
Figure 3F:
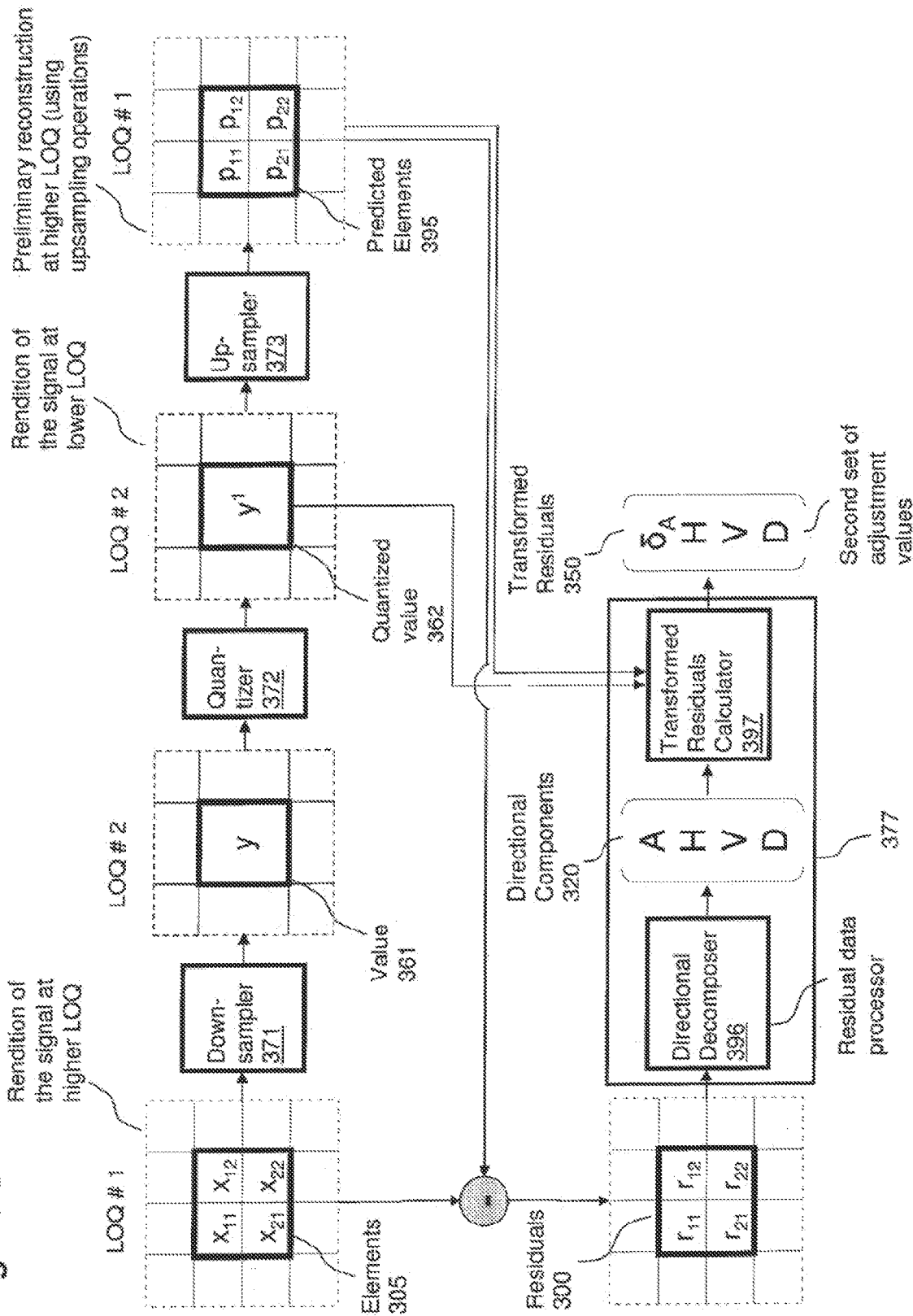

FIG. 3F is an example diagram illustrating generation of reconstruction data according to embodiments herein As shown, computer processing hardware in FIG. 3F is configured to produce reconstruction data according to embodiments herein. As shown, during encoding, the downsample algorithm 371 receives and processes block 305 including X11, X12, X21, X22. Each of these values X11, X12, X21, X22 represents a corresponding setting associated with the respective element.

In one embodiment, the downsample algorithm 371 receives and processes the X-array at the first level of quality and converts the array of x-values (X11, X12, X21, X22) into a single y value (e.g., representative value 361). Quantizer algorithm 371 converts the y-value into y1 (e.g., a quantized representative value 362, also indicated as 306 in FIG. 3B). Upsample algorithm 373 associated with the encoder, by processing the rendition of the signal at the lower LOQ #2, initiates upsampling of the value 362 (e.g., y1) into a predicted rendition (P11, P12, P21, P22) corresponding to the original rendition of the signal (X11, X12, X21, X22). The difference function 376 produces reconstruction data or residual data 300 as a difference between the original signal as specified by X11, X12, X21, X22 and predicted rendition P11, P12, P21, P22 to produce adjustment values R11, R12, R21, R22. In one embodiment, adjustment value R11=X11−P11; adjustment value R12=X12−P12; adjustment value R21=X21−P21; and adjustment value R22=X22−P22.

Processor resource 377 receives the first set of adjustment values (such as residual data 300 or adjustment values R11, R12, R21, R22). The first set of adjustment values specify adjustments to be made to a predicted rendition (P11, P12, P21, P22) of the signal as generated at corresponding level #1 to reconstruct a rendition of the signal (X11, X12, X21, X22) at the first level of quality. The processor resource 377 processes the first set of adjustment values R11, R12, R21, R22. The processor resource 377 derives a second set of adjustment values (or transformed residuals 350 or δa, H, V, D) based on the first set of adjustment values R11, R12, R21, R22 and a rendition of the signal such as y1 at a second level of quality.

In this example, level of quality #2 is lower than the level of quality #1. The signal can be an image including multiple elements. By way of a non-limiting example, the level of quality #1 can be a first image resolution; the level of quality

2 can be a second image resolution. The second image resolution is lower in resolution than the first image resolution.

Note again that the signal being encoded by the encoder hardware in FIG. 3F can be any suitable type of signal. For example, the signal can be a two-dimensional image; the signal can be a video signal; the signal can be a volumetric image; and so on.

In another specific embodiment, the processor resource 377 includes reconstruction data processor 396. Reconstruction data processor 396 converts the residual data 300 into component values A, H, V, and D. As mentioned, the values A, H, V, and D is an encoded representation of residuals 300. Based at least in part on the value y1 and directional components A, H, V, and D, the reconstruction data transformer 397 produces adjustment values δa, H, V, D (transformed residual data 350).

In one non-limiting example embodiment, the processor resource 377 derives the set of adjustment values δa, H, V, D (transformed residual data 350) by processing the set of adjustment values R11, R12, R21, R22 to produce the multiple adjustment components A, H, V, and D, which are representative of the set of adjustment values R11, R12, R21, R22. The reconstruction data transformer 397 produces the set of adjustment data δa, H, V, D (transformed residual data 350) based on a combination of at least one of the multiple adjustment components such as the value A with at least one setting associated with the rendition of the signal such as y1 at level of quality #2.

As mentioned, one or more of the adjustment values δa, H, V, D (transformed residual data 350) can be calculated based on a linear combination of the set of adjustment values R11, R12, R21, R22 with the rendition of the signal (such as y1) at level of quality #2. For example, the value δa can be calculated based on a difference between the average value A (an average of values X11, X12, X21, X22) as generated by quantizer algorithm 372 and a predicted average produced based at least in part on an average of elements (P11, P12, P21, P22) in block 393 (e.g., [P11+P12+P21+P22]/4).

As an example, assume that the data in block 305 (a corresponding portion of elements in an element plane that are being downsampled) includes: X11=10, X12=20, X21=25, X22=30. In this example, the downsample algorithm 371 produces value y=21.25 using an average of elements X11, X12, X21, X22. The single value y=21.25 at level of quality #2 is a representative value of settings associated with elements X11, X12, X21, X22.

Assume that the quantizer algorithm 372 quantizes the value y=21.25 to produce y1=21. In one embodiment, quantizing includes comparing a received value such as y=21.25 to multiple ranges. In this example, assume that any values in range A1 between 21 and 21.999 are assigned a value of 21. The value y=21.25 falls within the range A1 and is thus quantized and assigned a value of 21 as a result of quantizing by quantizer algorithm 372.

As previously discussed, embodiments herein include upsampling the quantized value y1=21 (also based at least in part on its neighboring elements) into a set of predicted values P11, P12, P21, P22. In this example, assume that the application of upsample algorithm 373 produces settings P11=10, P12=15, P21=20, P22=25. These P-values approximate the settings of original X-values (X11, X12, X21, X22) but need some adjustment.

Embodiments herein include applying difference function 376 to produce R-values (R11, R12, R21, R22). For example, the difference function 376 sets R11=X11−P11 (R11=10−10=0); the difference function 376 sets R12=X12−P12 (R12=20−15=5); the difference function 376 sets R21=X21−P21 (R21=25−20=5); the difference function 376 sets R22=X2−P22 (R22=30−25=5).

In accordance with the previous equations, the reconstruction data processor 396 produces settings for A, H, V, and D based on settings R11, R12, R21, R22 at level of quality #1. For example, according to the respective matrix, the reconstruction data processor 396 produces directional components 320 as follows:

$A=[R11+R12+R21+R22]/4=[0+5+5+5]/4=3.75$ $H=[R11-R12+R21-R22]/4=[0-5+5-5]/4=1.25$ $V=[R11+R12-R21-R22]/4=[0+5-5-5]/4=1.25$ $D=[R11-R12-R21+R22]/4=[0-5-5+5]/4=-1.25$

Based on these values for A, H, V, and D, the reconstruction data transformer 397 produces transformed residuals 300 ($\delta_a$, H, V, D) as follows:

$\delta_a$=Average−Predicted Average={3.75−[$y^1$−(P11+P12+P21+P22)/4]}=0.28

$\delta_a$={3.75−[21−(10+15+20+25)/4]}=3.75−(21−17.5) =3.75−3.5=0.25

In this example, the processor resource 377 produces transformed residual data 350 as follows:
$\delta_a$, =0.25
H=1.25
V=1.25
D=−1.25

Accordingly, the encoder hardware as discussed herein receives the rendition of the signal (X11, X12, X21, X22) at level of quality #1. The downsample algorithm 371 of the encoder in FIG. 3F produces the rendition of the signal y at level of quality #2 based on the rendition of the signal (X11, X12, X21, X22) at the level of quality #1. The upsample algorithm 373 produces the predicted rendition of the signal P11, P12, P21, P22 at the level of quality #1 from the rendition of the signal at level of quality #2. For example, quantizer algorithm 372 produces y1 from y. The upsample algorithm 373, by processing the rendition of the signal at level of quality #2, converts y1 to P11, P12, P21, P22. As mentioned, the difference function 376 produces the set of adjustment values R11, R12, R21, R22 as a difference between the rendition of the signal R11, R12, R21, R22 at level of quality #1 and the predicted rendition of the signal P11, P12, P21, P22 at level of quality #1. The reconstruction data processor 396 produces a formatted set of adjustment values (such as directional components 320) from the set of adjustment values R11, R12, R21, R22. As its name suggests, the reconstruction data transformer 397 transforms the formatted set of adjustment values into the set of adjustment values δa, H, V, D.

Embodiments herein can further include additional encoder hardware and software to encode the set of adjustment values δa, H, V, D and the rendition of the signal y1 at level of quality #2 into corresponding encoded information. A transmitter resource transmits the corresponding encoded information over a communication link to decoder processing hardware (see FIG. 5 for a non-limiting example of decoding).

Figure 5:
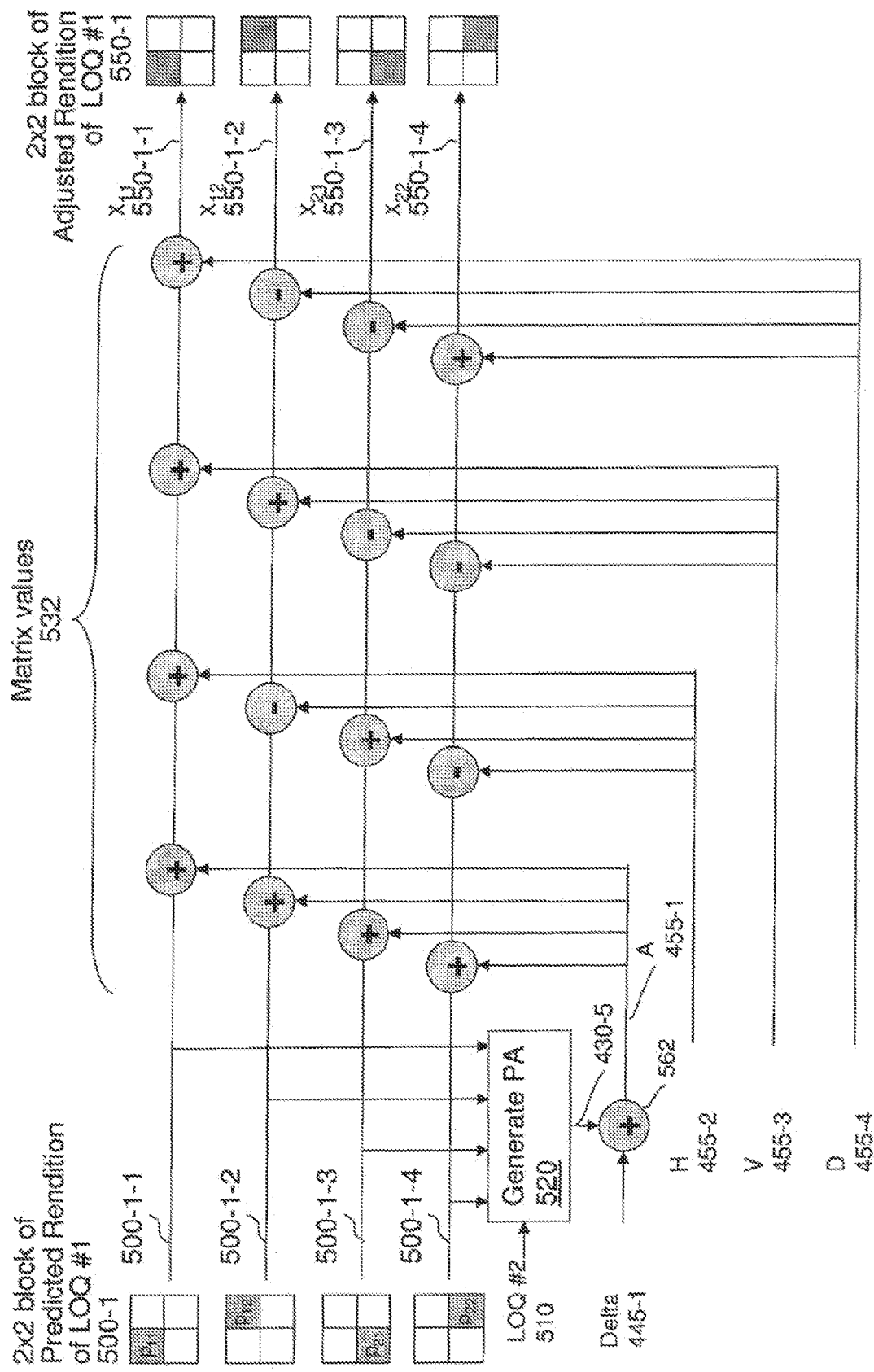
FIG. 5 illustrates operations performed by a decoder according to non-limiting embodiment illustrated herein.

In accordance with FIG. 5, decoder processing hardware receives the encoded information. From the encoded information, the decoder processing hardware obtains (via decoding) reconstruction data such as value y1=21. The value y1 specifies how to reconstruct the rendition of the signal for block 306 (FIG. 3B) at level of quality #2. From the received encoded information, the decoder processing hardware obtains (via decoding) the set of adjustment values δa, H, V, D.

The decoder processing hardware reproduces the predicted rendition of the signal P11=(element 500-1-1), P12 (element 500-1-2), P21 (element 500-1-3), P22 (element 500-1-4) at level of quality #1 based at least in part on value y1 in the obtained reconstruction data. The decoder processing hardware derives an adjustment value ("predicted average", or "PA") such as value 430-5 based on processing of settings associated with the predicted rendition of the signal and the obtained reconstruction data (such as y1=21). In this example embodiment, the block 520 generates adjustment value 430-5 to equal y1 minus the average of the predictions AvgP (such as [(P11+P12+P21+P22)/4]). Recall that the upsample algorithm 373 (as also used by the decoder processing hardware) applied to y1 and its neighboring elements in the decoder processing hardware produces values P11=10, P12=15, P21=20, P22=25. Note that the specific algorithm to be used to upsample value y1 can be specified in data received by the decoder processing hardware. In particular, for a given element of the preliminary rendition of the signal at the higher level of quality, producing settings for said given element can comprise: receiving metadata associated with the upsampling operations to be used to produce, based on the rendition of the signal at the lower level of quality, the preliminary rendition of the signal at the higher level of quality; identifying an upsampling operation (e.g., without limitation, coefficients of an upsampling kernel) as specified by the metadata; and applying the operation to a subset of elements of the rendition of the signal at the lower level of quality to derive the settings for said given element of the preliminary rendition of the signal at the higher level of quality.

The processing block 520 therefore produces y1−AvgP=21−[(10+15+20+25)/4]=21−17.5=3.5.

Function 562 sums delta 445-1 (e.g., δa=0.25) as obtained by decoding as discussed above) and value PA=3.5 to produce signal 430-5 such as value of 3.75 (i.e., average A=3.75). Thus, the decoder processing hardware utilizes the derived adjustment value (e.g., PA=3.5) as a basis to modify the value δa=0.25 into adjustment value A=3.75)

The data obtained by decoding received information also includes obtaining values for H, V and D. In this example, the values are as follows: H=1.25, V=1.25, and D=−1.25.

The decoder processing hardware then applies the modified set of adjustment values (e.g., A, H, V, D) to the reproduced predicted rendition of the signal P11, P12, P21, P22 to produce the rendition of the signal 550-1 at level of quality #1. For example, decoder processing hardware applies a row of summers associated with matrix values 532 to produce:

element 550-1-1=element 500-1-1+(A 455-1+H 455-2+V 455-3+D 455-4)=10+(3.75+(−1.25)+(−1.25)+(−1.25)) =10=X11;

element 550-1-2=element 500-1-2+(A 455-1−H 455-2+V 455-3−D 455-4)=15+(3.75−(−1.25)+(−1.25)−(−1.25)) =20=X12;

element 550-1-3=element 500-1-3+(A 455-1−H 455-2+V 455-3−D 455-4)=20+(3.75+(−1.25)−(−1.25)−(−1.25)) =25=X21; and element 550-1-4=element 500-1-4+(A 455-1−H 455-2−V 455-3+D 455-4)=25+(3.75−(−1.25)−(−1.25)+(−1.25)) =30=X12.

Accordingly, via receipt of residual data such as y1=21 and values δa=0.25, H=−1.25, V=−1.25, and D=−1.25, the decoder processing hardware is able to reproduce original values X11, X12, X21, and X22.

Figure 9:
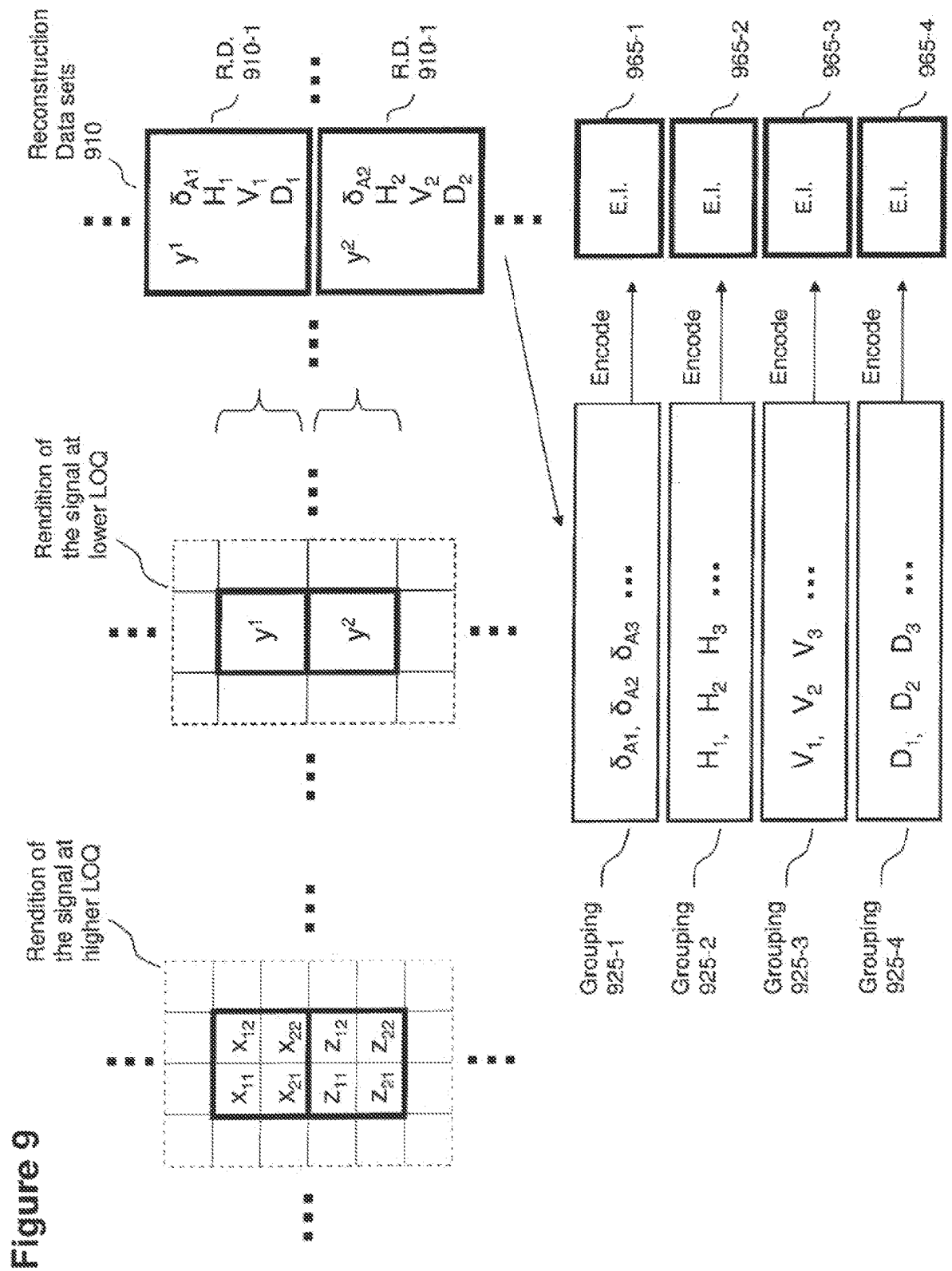
FIG. 9 is an example diagram illustrating of encoding information according to embodiments herein.

In accordance with further embodiments in FIG. 9, the encoder processing hardware as discussed herein can be configured to produce multiple sets of reconstruction data 910. For example, a first portion of a signal such as X-elements can be processed and encoded to produce set of reconstruction data 910-1 as previously discussed. In a similar manner as previously discussed, the encoder can be configured to produce set of reconstruction data 910-2 based on elements Z11, Z12, Z21, and Z22.

As discussed, each set of reconstruction data 910 can include settings for multiple components such as A (a first component), H (a second component), V (a third component), and D (a fourth component) by means of transformed value δa (a first transformed value), H (a second transformed value), V (a third transformed value), and D (a fourth transformed value). The first transformed value such as δa (delta average) in each of the sets corresponds to a first attribute class; the second transformed value in each of the sets corresponds to a second attribute class such as Horizontal (H); the third transformed value in each of the sets corresponds to a third attribute class such as Vertical (V); the fourth transformed value in each of the sets corresponds to a fourth attribute class such as Diagonal (D).

In one embodiment, the encoder processing hardware creates a first grouping 925-1 to include a first component value from each of multiple sets of reconstruction data 910. For example, grouping 925-1 includes component values δa1, δa2, . . . .

The encoder processing hardware creates grouping 925-2 to include a second component value such as H from each of multiple sets of reconstruction data 910. For example, grouping 925-2 includes component values H1, H2, . . . .

The encoder processing hardware creates grouping 925-3 to include a third component value such as V from each of multiple sets of reconstruction data 910. For example, grouping 925-3 includes component values V1, V2, . . . .

The encoder processing hardware creates grouping 925-4 to include a third component value such as D from each of multiple sets of reconstruction data 910. For example, grouping 925-4 includes component values D1, D2, . . . .

In one embodiment, the encoder processing hardware encodes the groupings independently of each other. For example, the encoder processing hardware entropy encodes the first grouping 925-1 into encoded information 965-1 independently of entropy encoding the second grouping 925-2 into encoded information 965-2.

In other non-limiting embodiments, groupings of transformed values are obtained by grouping transformed values corresponding to a same portion of the signal (such as a tile of the signal), and thus by individually encoding transformed residuals corresponding to each tile of the signal. In yet other non-limiting embodiments, transformed values corresponding to a same set of residual data 910 are assigned a given symbol, and the encoder processing hardware encodes a sequence of symbols, wherein each of the symbols corresponds to one of the sets of residual data 910.

FIG. 3C illustrates a non-limiting embodiment of directional decomposition applied to groupings of two residuals, in the case of 2D upsampling with scale factor of two along the horizontal dimension and one along the vertical dimension (i.e., for every parent element at LOQ #(N−1) there are two controlled pels at the next higher LOQ #N, and consequently two residuals must be decoded in order to suitably reconstruct said controlled pels) according to embodiments herein.

The encoder calculates—according to formula 3.21—the two directional components A (for Average) and T (for Tilt), and then produces transformed residuals δa and T, wherein δa is calculated as the difference between A and the predicted average PA, and wherein PA is calculated as the difference between the value y1 of element 308 and the average AvgP of the predicted values corresponding to the two elements 307.

FIG. 3D illustrates a non-limiting embodiment of directional decomposition applied to groupings of 2×2 blocks of residuals, in the case of 2D upsampling with scale factor of two along both dimensions (i.e., for every parent element at LOQ #(N−1) there are four controlled pels at the next higher LOQ #N, and consequently four residuals must be decoded in order to suitably reconstruct said controlled pels) according to embodiments herein.

Block of residuals 300 is a portion of a plane of residual data at a given LOQ #N that is processed by a decoder and combined with a predicted rendition of a signal at the given LOQ #N in order to produce a rendition of the signal at said given LOQ #N. In particular, block of residuals 300 is made of the four residuals ri,j, ri,j+1, ri+1,j and ri+1,j+1.

Residuals 300 are processed by Directional Decomposer 310 according to formula 3.11, producing Directional Components 320. Directional Components 320 and Predicted Average 340 are then processed by Transformed Residuals Calculator 330, producing Transformed Residuals 350. Transformed Residuals 350 are then quantized by Quantizer 360, producing Quantized Transformed Residuals 370.

In a non-limiting embodiment, Quantized Transformed Residuals 370 are then further processed and encoded into encoded reconstruction data. In a non-limiting embodiment, Quantized Transformed Residuals for the whole signal are grouped into separate groupings that are individually entropy encoded into separate sets of encoded reconstruction data. In a non-limiting embodiment, separate groupings correspond to distinct classes of transformed residuals (e.g., without limitation, Quantized Transformed Residuals corresponding to H components for the whole signal vs. Quantized Transformed Residuals corresponding to V components for the whole signal, etc.). In another non-limiting embodiment, separate groupings correspond to distinct portions of the signal (e.g., without limitation, tiles of the signal).

In accordance with FIG. 3D, the directional decomposer 310 produces a formatted set of adjustment values such as directional components 320 from the set of residual 300 (e.g., adjustment values). The calculator 330 transforms the formatted set of adjustment values such as directional components 320 into transformed residuals 350 (e.g., adjustment values). The encoder then applies a quantizer algorithm 360 to the set of adjustment values (transformed residuals 350) to produce a set of quantized adjustment values such as quantized transformed residual 370.

In one embodiment, set of adjustment values δa, H, V, D is a vector including multiple reconstruction data components (e.g., component δa, component H, component V, component D). The quantizer 360 quantizes each of the adjustment components to produce a quantized set of adjustment values such as residuals 370.

The different components in transformed residuals 350 can be quantized according to different rules. For example, a first set of ranges can be used to quantize the δa component in respective residuals 370. Each range can be assigned a respective value. Depending on which of the ranges the value δa component falls, the corresponding value assigned to the range is then assigned to the δa component as the quantized value for the component.

A second set of ranges can be used to quantize the H component in respective residuals 370. Each range in the second set can be assigned a respective quantized value. Depending on which of the ranges in the second set the value H component falls, the corresponding value assigned to the range is then assigned to the H component as the quantized value for the component.

In this manner, a different set of quantization ranges can be used to generate quantized values for each of the different types of components δa, H, V, D. As mentioned, quantization is used to generate similar settings for otherwise different component settings. Quantization reduces the amount of data that is required to capture a signal.

Accordingly, embodiments herein include computer processor hardware to quantize a first adjustment data component in the vector δa, H, V, D based on first quantization rules. The computer processor hardware quantizes a second adjustment data component in the vector based on second quantization rules. The second quantization rules different than the first quantization rules.

FIG. 3E illustrates another non-limiting embodiment of quantization and transform of a 2×2 block of residuals 300, wherein residuals are quantized before being transformed according to embodiments herein. It's worthwhile to underline that quantizing before transforming is an important and additional novel step introduced by this invention, since conventional encoding methods have so far applied quantization after transforming, for reasons that include the possibility of quantizing certain transformed parameters more heavily than others, i.e., broadly speaking, dedicating more bitrate to the "higher priority" parts of the transform.

As illustrated in FIG. 3E, in this non-limiting embodiment residual quantization is performed before entering the transform step, and in particular Quantizer 380 processes Residuals 300, producing Quantized Residuals 309.

Quantized Residuals 309 are processed by Lossless Directional Decomposer 315, which produces Lossless Directional Components 325 ("ldc") by processing the vector of four Quantized Residuals 309 ("qr") according to the following formula:

$$\underline{ldc} = \underline{M} \cdot \underline{qr}$$

$$\begin{pmatrix} S \\ V^1 \\ H^1 \\ D^1 \end{pmatrix} = \begin{pmatrix} 1 & 1 & 1 & 1 \\ -1 & -1 & 1 & -1 \\ 1 & 1 & -1 & -1 \\ 1 & -1 & -1 & 1 \end{pmatrix} \cdot \begin{pmatrix} qr_{00} \\ qr_{01} \\ qr_{10} \\ qr_{11} \end{pmatrix}$$

It is important to underline that the number of bits necessary for Lossless Directional Components 325 is higher than the number of bits used to describe Quantized Residuals 309, since Lossless Directional Components 325 are obtained by performing additions and subtractions of Quantized Residuals 309.

Lossless Directional Components 325 and Predicted Sum 345 are processed by Transformed Residuals Calculator 335, producing Transformed Residuals 355.

In a non-limiting embodiment, quantization of Residuals 300 within Quantizer 380 is based at least in part on parameters produced by processing the entire plane of residuals to which Residuals 300 belong (i.e., looking at the signal in its entirety).

In a non-limiting embodiment, quantization of Residuals 300 is performed by Quantizer 380 via an optimization method that ensures that the difference between a reconstructed element (i.e., the combination of a predicted element and its corresponding residual) and the corresponding element in the original signal is below a given threshold of maximum error, effectively ensuring error control of the rendition of the signal reconstructed at a decoder. In some non-limiting embodiments, quantization of Residuals 300 is performed based on parameters that are produced by processing substantially the whole signal and/or the whole plane of residuals that comprises Residuals 300. In a non-limiting embodiment, this is achieved by processing the whole signal and the whole plane of residuals, generating a priority map that assigns a priority value to each residual in the plane of residuals; quantization of residuals is then performed based at least in part on said priority values.

In a non-limiting embodiment, transformed residuals are symbols chosen in alphabets of symbols that have a different number of bits (i.e., total number of symbols) based on the relative position of each transformed residual in vector of Transformed Residuals 355.

As discussed above, if desired, quantization can be performed directly on the residuals 300 prior to decomposing into respective values. For example, quantizer algorithm 380 receives a first set of adjustment values (residuals 300) and produces a quantized set of adjustment values such as quantized residual 309. In one embodiment, the directional decomposer 315 applies one or more lossless and invertible operations on the received quantized set of adjustment values to produce an intermediate set of adjustment values such as S, V1, H1, D1. Calculator 335 receives a value (such as a predicted sum) derived based at least in part on a rendition of the signal at the second level of quality and a predicted rendition of the signal at a first level of quality. Calculator 335 utilizes the value (e.g., predicted sum 345) to convert the intermediate set of adjustment values S, V1, H1, D1 into transformed residual 355 (such as $\delta S$, H1, V1, D1).

In one embodiment, settings of quantized set of adjustment values (such as quantized residuals 309) are produced so that the differences between settings in the set of quantized set of adjustment values (such as quantized residuals 309) and corresponding settings in the set of adjustment values (such as settings 300) are below an error threshold value.

Additional Embodiments

As discussed above, adjustment values can be quantized at any suitable point in the encoding process. In accordance with yet further embodiments, note that the set of adjustment values pertain to reconstruction of a particular location in a plane of multiple elements that are encoded at the different levels of quality. Each of the different portions of elements in the plane can be quantized by different amounts depending on the particular location in which the corresponding elements reside. For example, in areas of the signal that are relatively homogeneous, the corresponding region can be less quantized in order to retain good signal quality of such regions; areas where there is sharp contrast can be less quantized in order to retain good signal quality of such regions; areas in a signal where a particular object such as a person or text are detected can be less quantized in order to retain good signal quality of such regions; and so on. Accordingly, embodiments herein can include quantizing the adjustment value depending on attributes of the signal to which the set of adjustment values pertain.

In accordance with further embodiments, the set of adjustment values can be a vector including multiple reconstruction data components (such as component $\delta$, component H, component V, component D). During encoding, two or more of these components can be combined and represented by a single encoded symbol.

As mentioned, each of multiple regions of an original signal can be encoded using a respective set of adjustment values (such as $\delta$, H, V, D). For example, a first portion or region of the signal can be encoded via a first set of adjustment values (such as $\delta 1$, H1, V1, D1); a second portion or region of the signal can be encoded via a second set of adjustment values (such as $\delta 2$, H2, V2, D2); a third portion or region of the signal can be encoded via a third set of adjustment values (such as $\delta 3$, H3, V3, D3); and so on. Embodiments herein can include encoding each of at least two of the multiple sets of reconstruction data (such as $\delta$, H, V, D) or portions thereof using a common symbol. Accordingly, a single symbol can be used to represent settings for multiple sets of adjustment values.

FIG. 4A illustrates a non-limiting embodiment of inverse directional decomposition performed by a decoder device according to embodiments herein.

Block 410 Inverse Directional Decomposition receives five planes of elements at resolution X×Y: a Plane of Predicted Averages 400-5 and the four planes of transformed residuals Plane of $\delta$ 400-1, Plane of H 400-2, Plane of V 400-3 and Plane of D 400-4.

Block 410 processes the received planes according to an inverse directional decomposition, producing Plane of Residuals at resolution 2X×2Y 420.

In a non-limiting embodiment, block 410 selects corresponding elements in the five input planes, and for each grouping of corresponding elements performs an inverse directional decomposition, by reconstructing directional components and then by suitably adding and subtracting directional components so as to produce a set of residuals corresponding to the grouping.

Figure 4B:
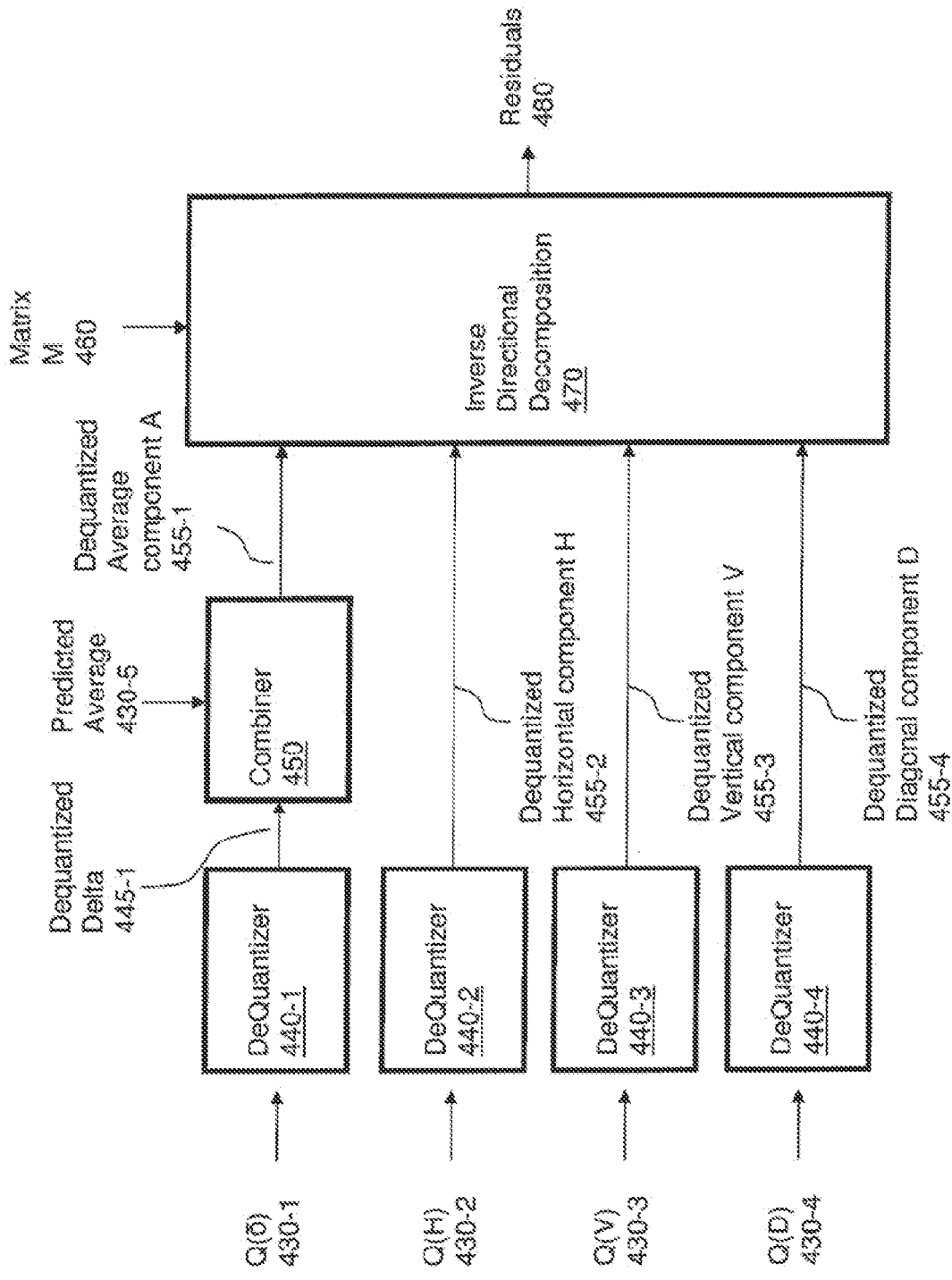

FIG. 4B illustrates another non-limiting embodiment of inverse directional decomposition according to embodiments herein. In particular, the diagram illustrates the operations performed by a signal processor configured as a decoder in order to reconstruct a set of Residuals 480.

The four quantized parameters Q(6A) 430-1, Q(H) 430-2, Q(V) 430-3 and Q(D) 430-4 are processed respectively by DeQuantizer 440-1, DeQuantizer 440-2, DeQuantizer 440-3 and DeQuantizer 440-4. DeQuantizer 440-1 produces parameter Dequantized Delta 445-1, which is processed by Combiner 450 and combined with Predicted Average 430-5, producing Dequantized Average Component 455-1. DeQuantizer 440-2 produces Dequantized Horizontal Component 455-2. DeQuantizer 440-3 produces Dequantized Vertical Component 455-3. DeQuantizer 440-4 produces Dequantized Diagonal Component 455-4.

Parameters 455-1, 455-2, 455-3 and 455-4 are processed by block 470 Inverse Directional Decomposition, according to calculations corresponding to Matrix M 460, producing Residuals 480.

In a non-limiting embodiment, Matrix M 460 corresponds to sixteen coefficients, and Residuals 480 are obtained by additions and subtractions of parameters 455-1, 455-2, 455-3, 455-4, according to said coefficients. In a non-limiting embodiment, Residuals 480 is a set of four residuals, and each of said residuals is obtained by multiplying each of parameters 455-1, 455-2, 455-3, 455-4 times a coefficient of Matrix M 460, and then summing the results of said multiplications. In another non-limiting embodiment, Matrix M 460 is a 4×4 matrix, and the vector of Residuals 480 is obtained by multiplying the vector of parameters 455-1, 455-2, 455-3, 455-4 times Matrix M 460.

In a non-limiting embodiment, DeQuantizers 440-1, 440-2, 440-3 and 440-4 each performs quantization operations according to specific quantization parameters (e.g., the dequantization operations performed on parameter 430-1 are different from the dequantization operations performed on parameter 430-2).

As shown in FIG. 4B, different dequantization operations can be applied to the received quantized data such as $Q(\delta A)$ 430-1, Q(H) 430-2, Q(V) 430-3 and Q(D) 430-4. The dequantizer 440-1 applies a first dequantization operation to reproduce a first adjustment value such as dequantized delta 445-1; the dequantizer 440-2 applies a second dequantization operation to reproduce a second adjustment value 455-2; the dequantizer 440-3 applies a third dequantization operation to reproduce a third adjustment value 455-3; the dequantizer 440-4 applies a fourth dequantization operation to reproduce a fourth adjustment value 455-4. Each of the dequantization operation can be unique with respect to each other.

Figure 4C:
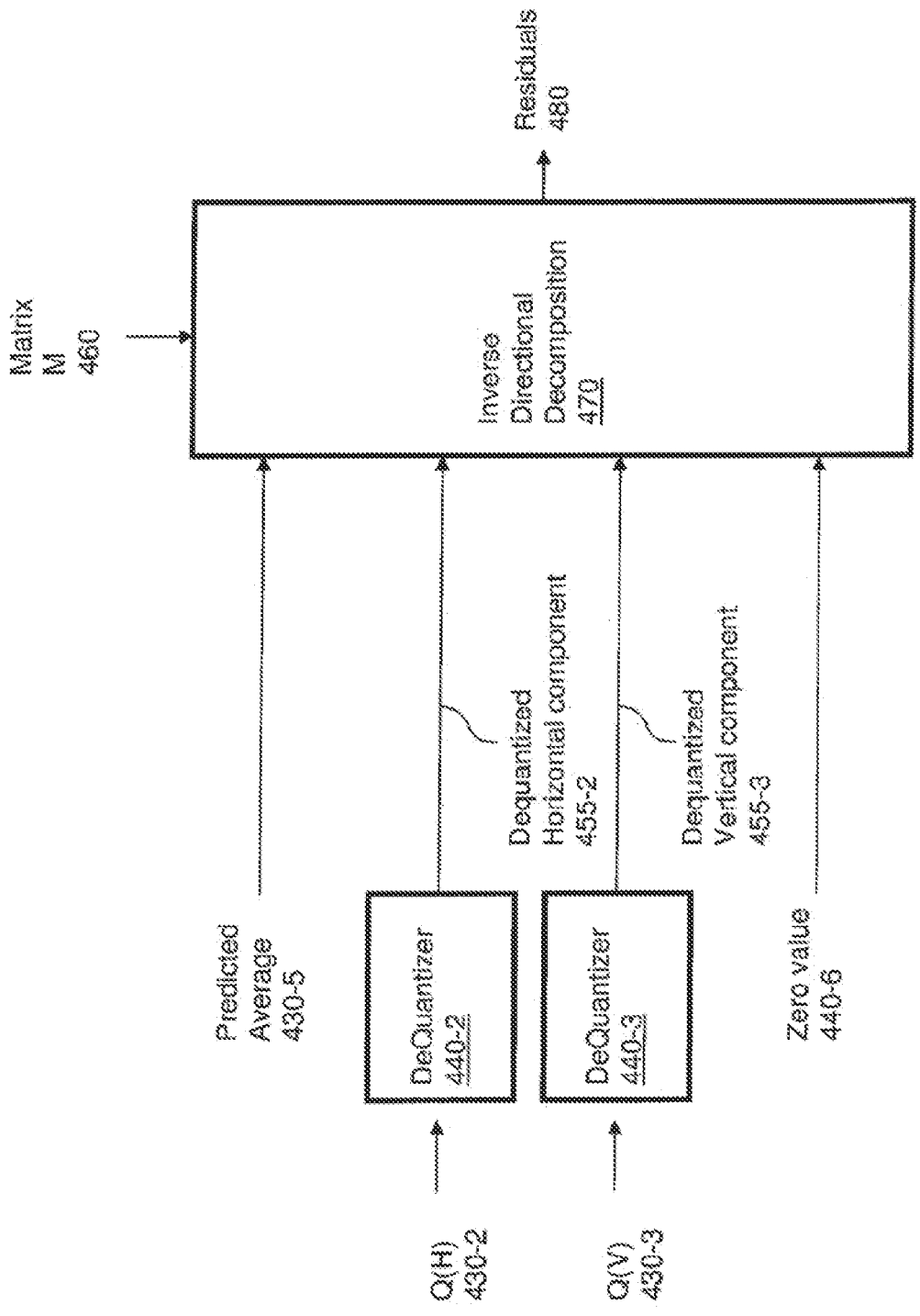

FIG. 4C illustrates another non-limiting embodiment of inverse directional decomposition performed by a signal processor configured as a decoder in order to reconstruct a set of four residuals 480 according to embodiments herein.

The embodiment in FIG. 4C performs operations that are similar to the ones performed by the embodiment illustrated in FIG. 4B, with the exception that in this case the decoder receives only two quantized parameters Q(H) and Q(V) in order to reconstruct a 2×2 block of four residuals 480. This is due to the fact that the information carried by parameters 430-1 and 430-4 in FIG. 4B is broadly speaking less important for quality perception, so in response to bandwidth limitations the decoder in FIG. 4C is enabled to reconstruct Residuals 480 based only on 430-2 and 430-3, substituting 430-1 and 430-4 with a default value (e.g., without limitation, zero).

Parameters 430-2 and 430-3 are processed by DeQuantizers 440-2 and 440-3, producing parameters 455-2 and 455-3. Block 470 receives Predicted Average 430-5, Dequantized Horizontal Component 455-2, Dequantized Vertical Component 455-3 and Zero Value 440-6, producing Residuals 480 according to calculations corresponding to Matrix M 460.

Figure 4D:
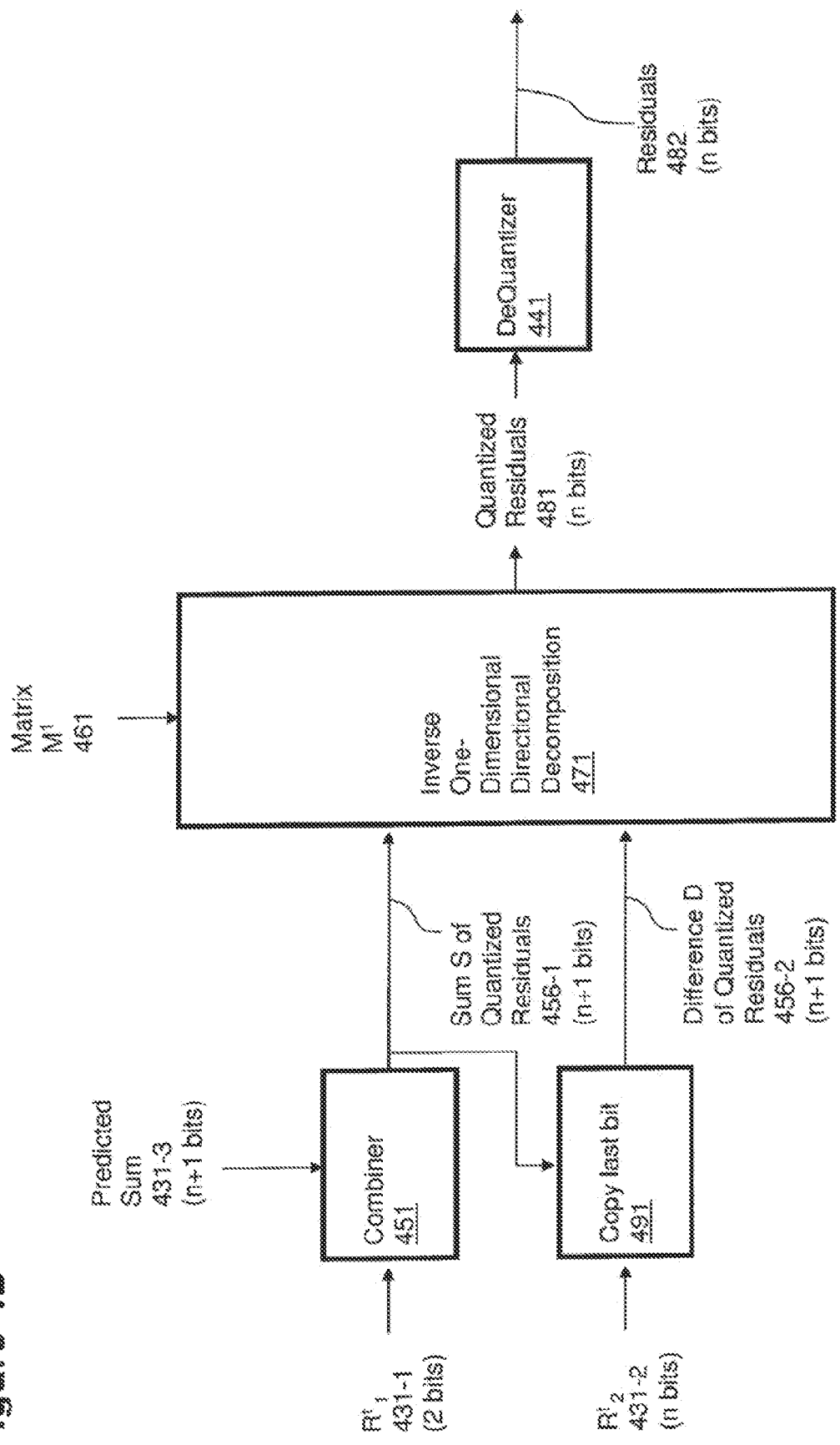

FIG. 4D illustrates a non-limiting embodiment of lossless inverse decomposition performed by a signal processor configured as a decoder in order to reconstruct a set of two Residuals 481 according to embodiments herein. The embodiment illustrates an inverse decomposition of a block of two quantized residuals that were transformed by means of a lossless decomposition transform, i.e., with quantization performed before the transform instead of after the transform. Losslessly transformed quantized residuals have mathematical characteristics that allow to predict some of their bits (e.g., without limitation, the least significant bit) based on other losslessly transformed quantized residuals of a same set. More specifically, parameters obtained with a lossless transform operation have in principle a higher number of bits (e.g., the lossless sum of two parameters of n bits requires n+1 bits; the lossless sum of four parameters of n bits requires n+2 bits, etc.), but—based on the specific coefficients of the transform applied—part of the information in the least significant bits becomes redundant (e.g., identical for at least two of the transformed parameters), so it is sufficient to transmit to a decoder only part of the bits of some transformed parameters, leaving to the decoder the task of leveraging the known redundancies to reconstruct the full-fledged set of transformed parameters.

Transformed Residual Rt1—a parameter made of 2 bits—is received by Combiner 451 and combined with Predicted Sum 431-3—a parameter made of n+1 bits—producing Sum S of Quantized Residuals 456-1—a parameter made of n+1 bits.

Transformed Residual Rt2—a parameter made of n bits—is received by block 491 along with parameter S 456-1, producing Difference D of Quantized Residuals 456-2—a parameter made of n+1 bits. In particular, parameter D 456-2 is obtained by increasing the number of bits of parameter 431-2, and specifically by adding as additional least significant bit of parameter 431-2 the least significant bit of parameter 456-1 (so that parameters 456-1 and 456-2 have a same least significant bit).

Parameters 456-1 and 456-2 are received by block 471 along with Matrix M1 461, producing a set of two Quantized Residuals 481 of n bits. In a non-limiting embodiment, each of the two Quantized Residuals 481 corresponds to either the sum or the difference of parameters 456-1 and 456-2, wherein the least significant bit of the sum or the difference (which is by construction equal to zero) is taken away.

Quantized Residuals 481 are then processed by DeQuantizer 441, producing the two Residuals 482, made of n bits.

In other non-limiting embodiments, all parameters are made of a same number of bits, and block 491 just copies the least significant bit of parameter 456-1 onto the least significant bit of parameter 431-2.

In another non-limiting embodiment, Residuals 482 are parameters made of a number of bits higher than the number of bits of Quantized Residuals 481.

Figure 4E:
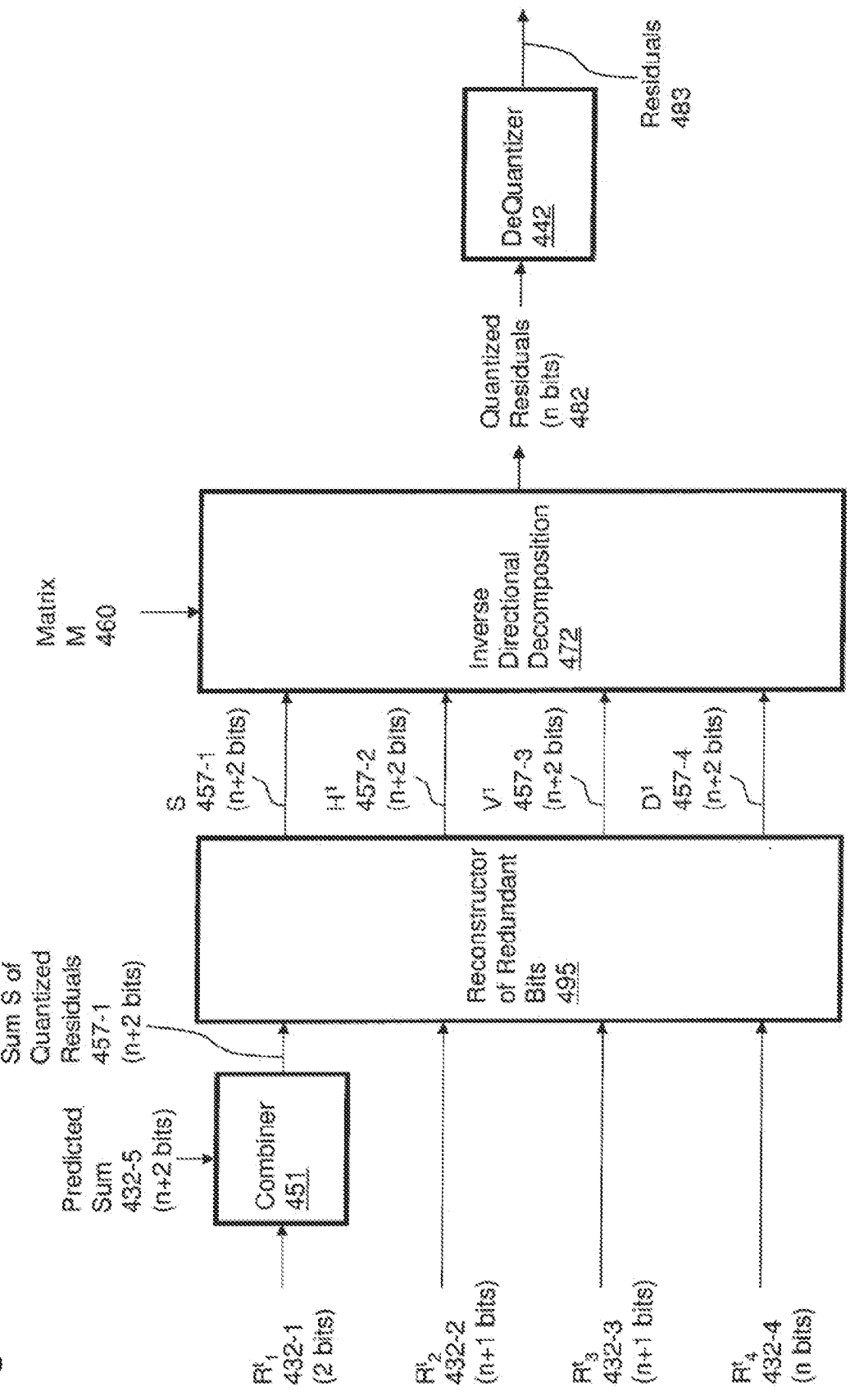

FIG. 4E illustrates a non-limiting embodiment of lossless inverse decomposition performed by a signal processor configured as a decoder in order to reconstruct a set of four Residuals 483 according to embodiments herein. The embodiment illustrates an inverse decomposition producing a block of four quantized residuals 481 that were transformed by means of a lossless decomposition transform, i.e., with quantization operations performed before the transform instead of after the transform.

Transformed Residual Rt1 432-1—a parameter made of 2 bits—is received by Combiner 451 and combined with Predicted Sum 432-5—a parameter made of n+2 bits—producing Sum S of Quantized Residuals 457-1—a parameter made of n+2 bits.

Transformed Residuals Rt2 432-2—a parameter made of n+1 bits —, Rt3 432-3—a parameter made of n+1 bits—and Rt4 432-4—a parameter made of n bits—are received and processed by Reconstructor of Redundant Bits 495 along with Sum S of Quantized Residuals 457-1. Reconstructor of Redundant Bits 495 leverages the known information redundancy generated by the lossless decomposition that was performed at the encoder side, and produces additional bits for 432-2, 432-3 and 432-4 by using as least significant bit the least significant bit of 457-1, and as second least significant bit added to 432-4 the exclusive Or (XOR) of the corresponding bits of 457-1, 432-2 and 432-3. By doing this, Reconstructor of Redundant Bits 495 produces the four parameters S 457-1, H1 457-2, V1 457-3 and D1 457-4, made of n+2 bits and characterized by having all the same least significant bit and second-least significant bits such that the number of 1's in said second-least significant bits is an even number.

Parameters 457-1, 457-2, 457-3 and 457-4 are processed by Inverse Directional Decomposition 472 according to operations corresponding to parameters included in Matrix M 460, producing a set of four Quantized Residuals 482, each of said quantized residuals made of n bits.

Quantized Residuals 482 are then processed by DeQuantizer 442, producing Residuals 483.

The described operations performed by block 495 Reconstructor of Redundant Bits to reconstruct the redundant information in parameters 457-1, 457-2, 457-3 and 457-4 (which is a known consequence of the lossless transform that was performed at the encoder side) are just a non-limiting embodiment. People skilled in the art can easily develop several other ways to extract said redundant information at the encoder side (thus avoiding to encode and transmit redundant information) and to reconstruct it at the decoder side.

As shown, the set of adjustment values can be a vector of multiple adjustment components Rt1, Rt2, Rt3, Rt4. Via application of a matrix 460 and corresponding processing to the vector of multiple adjustment components, the decoder processing hardware derives a set of quantized adjustment values such as residuals 482. Via dequantizer 442, the decoder processing hardware applies a dequantization algorithm to the set of quantized adjustment values such as residuals 482 to produce a set of dequantized adjustment values such as residuals 483 (i.e., reconstruction data). In one embodiment, the decoder processing hardware applies the set of dequantized set of adjustment values such as residual 483 to the preliminary rendition of the signal to produce the secondary rendition of the signal as discussed herein.

In one embodiment, to derive the set of dequantized adjustment values, the decoder processing hardware can be configured to apply combiner 451 to modify a particular adjustment component in the vector to produce a modified vector of multiple adjustment components (such as residual 457-1, residual 432-2, residual 432-3, residual 432-4). One or more of the multiple adjustment components in the modified set can be of different bit lengths. The decoder processing hardware applies a first algorithm to the modified vector (such as residual 457-1, residual 432-2, residual 432-2, residual 432-4) of multiple adjustment components to suitably adjust bit lengths of the components in the modified set to a common length such as n+2 as in this non-limiting example embodiment.

FIG. 5 illustrates a non-limiting embodiment of operations performed by a decoder according to embodiments herein. The decoder reconstructs—based on a set of four predicted elements 500-1 at LOQ #1, on a corresponding element of a rendition of the signal at the lower LOQ #2 and on four parameters 445-1, 455-2, 455-3 and 455-4—four elements 550-1 of a rendition of the signal at LOQ #1.

Block 520 processes the four elements 500-1 and a corresponding element of rendition 510 at LOQ #2, producing a Predicted Average (PA) 430-5.

Predicted Average 430-5 is combined with parameter Delta 445-1, producing parameter A 455-1.

Parameters 455-1, 455-2, 455-3 and 455-4 are combined with elements 500-1-1, 500-1-2, 500-1-3 and 500-1-4 according to the operations (sums and/or differences) specified in FIG. 5, producing elements 550-1-1, 550-1-2, 550-1-3 and 550-1-4. For instance, element 550-1-1 is obtained by adding 455-1, 455-2, 455-3 and 455-4 to 500-1-1; element 550-1-2 is obtained by adding 455-1 and 455-3 and by subtracting 455-2 and 455-4 to 500-1-2; and so forth.

In a non-limiting embodiment, elements 500-1-1, . . . , 500-1-4 have n bits, 455-1, . . . , 455-4 have n+2 bits, and for each element 550-1-*n* sums and differences in FIG. 5 are first executed on parameters 455-1, . . . , 455-4 (producing a result of n+2 bits), then the result is divided by 4 (i.e., the last two bits are eliminated), obtaining a parameter of n bits, and then said parameter of n bit is summed to the corresponding element 500-1-*n*, producing element 550-1-*n*.

Accordingly, the decoder processing hardware as in FIG. 5 receives setting information or value y1 associated with a rendition of a signal 510 at level of quality #2. The decoder processing hardware receives a set of adjustment values (such as delta 445-1, H 455-2, V455-3, and D 455-4). The decoder processing hardware produces a preliminary rendition of the signal (such as signal 500-1) at level of quality #1 based on the setting information of elements of rendition of the signal 510 at level of quality #2. The decoder processing hardware produces a second rendition of the signal such as rendition 550-1 at the level of quality #2 based on the set of adjustment values (such as delta 445-1, H 455-2, V 455-3, and D 455-4) and the preliminary rendition of the signal 510 at level of quality #2.

As shown, producing the second rendition of the signal such as signal 550-1 can include: modifying the set of adjustment values delta 445-1, H 455-2, V 455-3, and D 455-4 based at least in part on the preliminary rendition of the signal 550-1 at level of quality #1. The decoder processing hardware applies the modified set of adjustment values A 455-1, H 455-2, V455-3, and D 455-4 to the preliminary rendition of the signal 500-1 to produce a second rendition of the signal 550-1.

In accordance with further embodiments, the setting information such as y1 can be considered first setting information. Modification of the set of adjustment values such as delta 445-1, H 455-2, V455-3, and D 455-4 can include: at processing block 520, receiving the first setting information y1. The first setting information y1 is associated with the preliminary rendition of signal 500-1. The processing block 520 receives second setting information such as settings of element 500-1-1 (P11), element 500-1-2 (P12), element 500-1-3 (P21), and element 500-1-4 (P22). The second setting information is associated with the rendition of the signal at level of quality #1. The preliminary rendition of the signal 500-1 is derived based at least in part on the first setting information y1. The processing block 520 applies a mathematical algorithm to a combination of the first setting information y1 and second setting information to produce a modification value such as value 430-5. The function 562 applies the modification value 430-5 to the set of adjustment values (such as delta 445-1) to produce the modified set of adjustment values, which includes value A 455-1.

In one embodiment, the function 562 receives a data component such as delta 445-1 from the set of adjustment values including delta 445-1, H 455-2, V455-3, and D 455-4. In one embodiment, one or more of multiple components in the set of adjustment values includes directional tilt information.

The function 562 sums the modification value 430-5 and the retrieved component delta 445-1 to modify the delta component back into the average 455-1. Via application of matrix values 532 (i.e., via executing of additions and subtractions according to matrix values 532), the decoder processing hardware modifies settings of each of multiple elements in the preliminary rendition of the signal at the second level of quality using the modified delta component 455-1. In other words, the decoder processing hardware in FIG. 5 uses the value 430-5 to modify each of the preliminary rendition of the signal 500-1 to produce second rendition of the signal 550-1.

As discussed, the decoding can be performed at each of multiple levels up a hierarchy of multiple levels. Note that the second rendition of the signal 550-1 subsequently can be used as a basis to produce a preliminary rendition of the signal at a next higher level of quality.

Also, as previously discussed, the rendition of the signal 510 at level of quality #2 can be a first level of quality and represent a first image resolution. The level of quality #1 can be a second image resolution lower than the first image resolution. Thus, the rendition of the signal 510 at one level of quality includes a first set of image elements (e.g., without limitation, one element y1). The rendition of the signal such as signal 500-1 and 550-1 includes a second set of image elements (e.g., without limitation, four elements x11, x12, x21 and x22).

As previously mentioned, the reconstruction data including reconstruction data 510 such as y1 and adjustment values 6A 445-1, H 455-2, V455-3, and D 455-4 can further include metadata. The decoder processing hardware in FIG. 5 can be configured to receive the metadata associated with the set of adjustment values. Via processing of the metadata, the decoder processing hardware identifies one or more operations to be applied to the reconstruction data to reproduce a rendition of the signal 550-1 using the metadata. For example, in one embodiment, the decoder processing hardware applies an identified one or more operations to the set of adjustment values and/or the value y1 to derive the second rendition of the signal 550-1 from the preliminary rendition of the signal 500-1.

Further embodiments herein can include receiving metadata associated with the set of adjustment values. The decoder processing hardware can be configured to identify one or more operations as specified by the metadata. The decoder processing hardware applies the one or more identified operations to the set of adjustment values to derive the second rendition of the signal 550-1 from the preliminary rendition of the signal 500-1.

One embodiment herein includes linear application of the modified set of adjustment values to the preliminary rendition of the signal. For example, application of the matrix values 532 can include producing the second rendition of the signal 550-1 via a linear application (e.g., via sum and difference functions as shown) of the modified set of adjustment values such as average A 455-1, H 455-2, V 455-3, and D 455-4 to the preliminary rendition of the signal 500-1.

Thus, as shown, via matrix values 532, the decoder processing hardware produces the second rendition of the signal 550-1 via application of the modified set of adjustment values average A 455-1, H 455-2, V455-3, and D 455-4 to the preliminary rendition of the signal 500-1. The modified set of adjustment values includes a vector of weighted values (as indicated by addition functions and subtraction functions) applied to the preliminary rendition of the signal 500-1 in accordance with the matrix values 532.

In accordance with yet another example embodiment, the vector corresponding to average A 455-1, H 455-2, V455-3, and D 455-4 represents a modified set of adjustment values. The decoder processing hardware can be configured to produce the secondary rendition of the signal 550-1 via application of the modified set of adjustment values to the preliminary rendition of the signal 500-1. The vector of adjustment values can be applied by the decoder processing hardware to the preliminary rendition to produce the secondary rendition of the signal 550-1 in accordance with weightings as specified by matrix values 532.

The matrix values can vary and be selected from a group of possible matrices comprising:

$$\underline{M} = \begin{pmatrix} 1 & 1 \\ 1 & -1 \end{pmatrix}; \begin{pmatrix} 1 & 2 & 1 \\ 1 & -1 & 1 \\ 1 & -1 & -2 \end{pmatrix};$$

$$\begin{pmatrix} 1 & 1 & 1 & 1 \\ -1 & -1 & 1 & -1 \\ 1 & 1 & -1 & -1 \\ 1 & -1 & -1 & 1 \end{pmatrix}; \begin{pmatrix} 1 & 3 & 2 & 1 \\ 1 & -1 & 2 & 1 \\ 1 & -1 & -2 & 1 \\ 1 & -1 & -2 & -3 \end{pmatrix};$$

$$\begin{pmatrix} 1 & 4 & 3 & 2 & 1 \\ 1 & -1 & 3 & 2 & 1 \\ 1 & -1 & -2 & 2 & 1 \\ 1 & -1 & -2 & -3 & 1 \\ 1 & -1 & -2 & -3 & -4 \end{pmatrix}; \begin{pmatrix} 1 & 5 & 4 & 3 & 2 & 1 \\ 1 & -1 & 4 & 3 & 2 & 1 \\ 1 & -1 & -2 & 3 & 2 & 1 \\ 1 & -1 & -2 & -3 & 2 & 1 \\ 1 & -1 & -2 & -3 & -4 & 1 \\ 1 & -1 & -2 & -3 & -4 & -5 \end{pmatrix}.$$

In a manner as previously discussed, the reconstruction data including reconstruction data 510 such as y1 and adjustment values delta 445-1, H 455-2, V455-3, and D 455-4 can be received as encoded information. The decoder processing hardware receiving such data can be configured to decoding the encoded information into multiple symbols. The decoder processing hardware can be configured to retrieve a symbol from the multiple symbols and, depending on the encoding, produce any of one or more components in the set of adjustment values delta 445-1, H 455-2, V455-3, and D 455-4 from the retrieved symbol.

Figure 6:
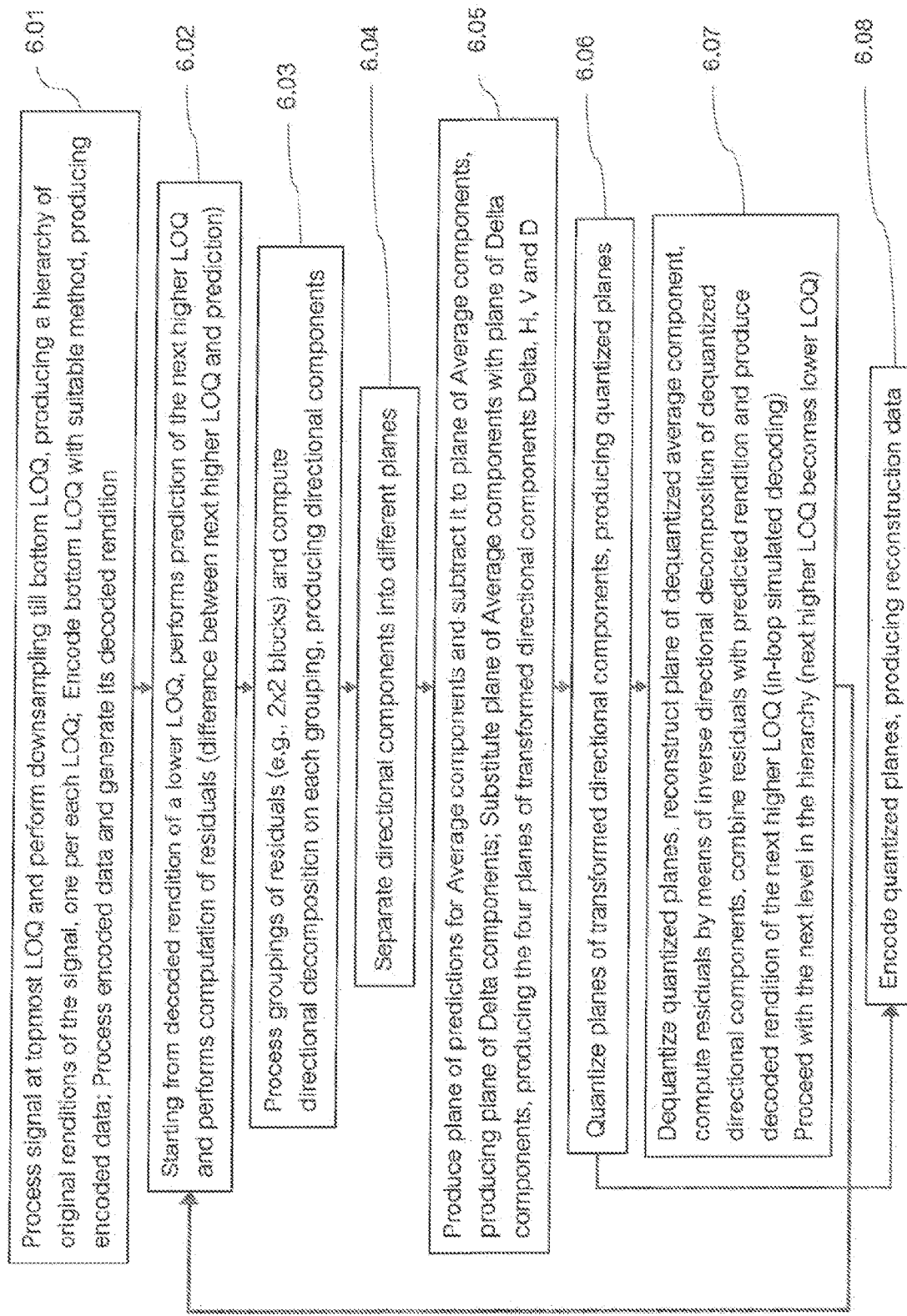
FIG. 6 illustrates a flow chart of an encoder performing directional decomposition according to non-limiting embodiments illustrated herein.

FIG. 6 is a flow diagram illustrating a non-limiting embodiment implementing directional decomposition within a tiered-based hierarchical encoding loop according to embodiments herein.

A signal processor configured as an encoder receives a signal at a given level of quality ("topmost LOQ"), performs downsampling operations till producing a rendition of the signal at a bottom LOQ (said bottom LOQ being lower than the topmost LOQ), encodes the rendition of the signal at the bottom LOQ with a suitable encoding method—producing encoded reconstruction data—and then processes said encoded reconstruction data to simulate the operations performed at a decoding side, producing a decoded rendition of the signal at the bottom LOQ (step 6.01 of FIG. 6).

Once produced the decoded rendition of the signal at the bottom LOQ, the encoder enters a processing loop that is repeated for each subsequently higher LOQ, processing the hierarchy of LOQs level by level up to the topmost LOQ.

In particular, the encoder processes the decoded rendition of the signal at a given LOQ ("lower LOQ") and produces a predicted rendition of the signal at the next higher LOQ. The encoder then produces residual data, said residual data corresponding to a difference between the original rendition of the signal at the next higher LOQ and the predicted rendition of the signal at the next higher LOQ (step 6.02).

The encoder then separates residual data into groupings of residuals (e.g., without limitation, contiguous 2×2 groupings of residuals) and for each grouping performs a directional decomposition transform, producing directional components (step 6.03).

The encoder then produces four separate planes of directional components (Average, Horizontal, Vertical, Diagonal), wherein corresponding elements of said four planes correspond to a same grouping of residuals (step 6.04).

The encoder then produces a plane of predicted average components, wherein each of the elements of said plane is the predicted average for a corresponding grouping of residuals, calculated based on the difference between the average of the corresponding predicted elements at the next higher LOQ and the corresponding element at the lower LOQ. The encoder produces the plane of Delta components, wherein each element of the plane is calculated as the difference between a corresponding Average component and its corresponding Predicted Average component. The plane of Delta is substituted to the plane of Averages, forming the set of four transformed directional components Delta, H, V and D. (step 6.05)

The encoder then quantizes the planes of transformed directional components, producing planes of quantized transformed directional components. (step 6.06)

Quantized transformed directional components are then encoded, producing encoded reconstruction data. (step 6.08)

In order to proceed with the next level in the hierarchy, the encoder then simulates the decoding operations that will be performed at a decoding side, producing a decoded rendition of the signal at the next higher LOQ. In order to do that, the encoder dequantizes the planes of quantized transformed directional components; combines the plane of dequantized Deltas with the plane of Predicted Averages, reconstructing a plane of dequantized Average components; computes residual data by performing for each grouping of four residuals an inverse directional decomposition of the corresponding directional components A, H, V and D; combines residual data with the predicted rendition of the signal at the next higher LOQ, producing the decoded rendition of the signal at the next higher LOQ. (step 6.07)

At that point, if the next higher LOQ is not the topmost LOQ, the encoder proceeds with the next level in the hierarchy, going back to step 6.02 wherein—for the next level in the hierarchy—the rendition of the signal at the next higher LOQ that was just decoded becomes the decoded rendition of the signal at the lower LOQ.

In other non-limiting embodiments, quantization operations applied to each plane of transformed directional components are based on parameters that are specific to each class of transformed directional components (e.g., without limitation, the level of quantization applied to Diagonal components is stronger than the level of quantization applied to Horizontal and/or Vertical components).

In other non-limiting embodiments, the encoder—instead of producing and encoding four separate planes of transformed components—produces and encodes groupings of four transformed components, each of said groupings corresponding to a grouping of four residuals in the plane of residuals.

In other non-limiting embodiments, the encoder performs quantization operations during step 6.02, producing quantized residuals. In such embodiments, decomposition and inverse decomposition operations are lossless operations, i.e., no further quantization is applied to directional components and/or transformed directional components.

In other non-limiting embodiments, the rendition of the signal at the bottom LOQ is encoded by means of an MPEG-based method; in this way, legacy decoders that are not configured to process and reconstruct higher LOQs in the hierarchy are at least able to decode a rendition of the signal at the bottom LOQ.

Figure 7:
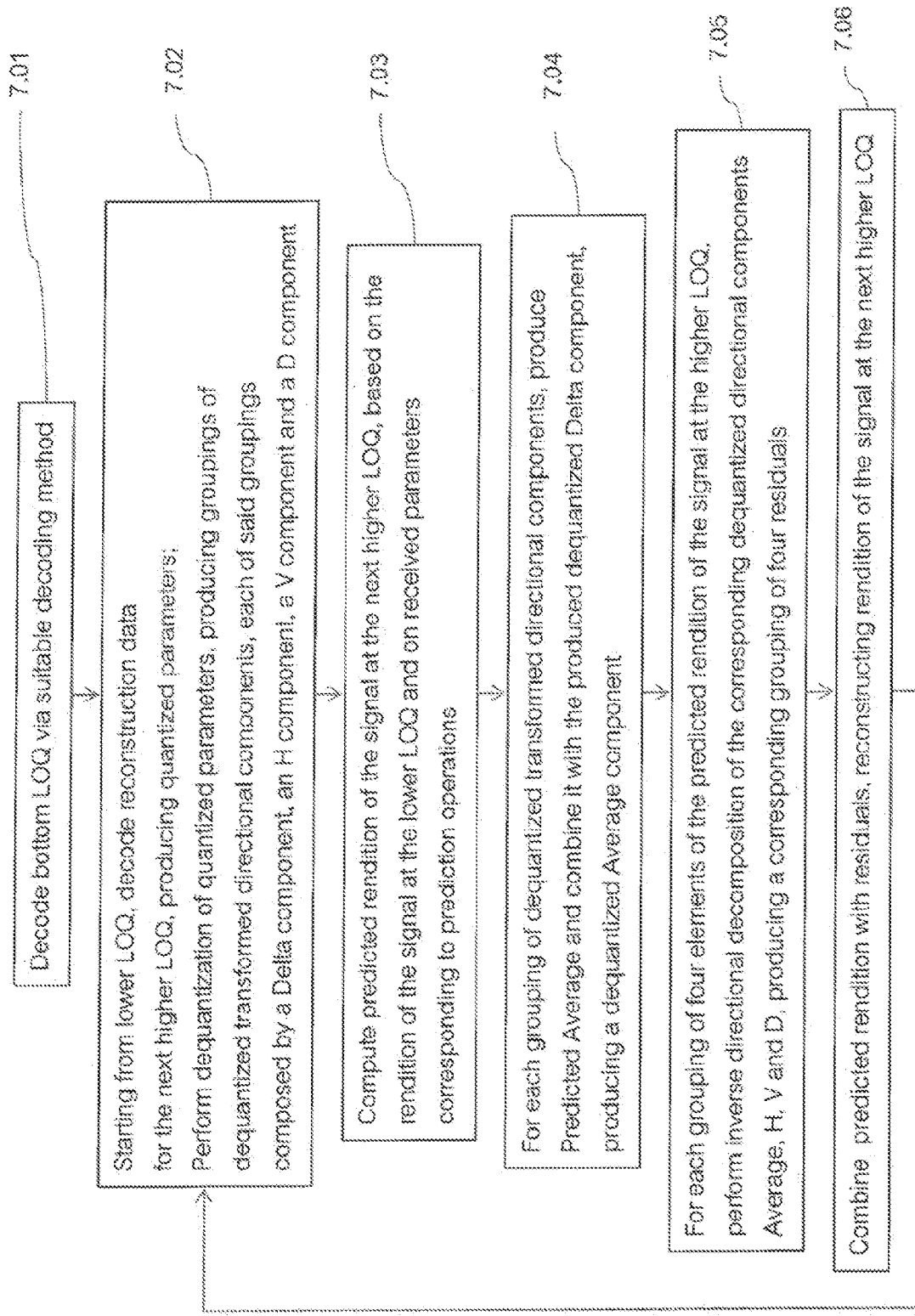
FIG. 7 illustrates a flow chart of a decoder performing inverse directional decomposition according to non-limiting embodiments illustrated herein.

FIG. 7 is a flow diagram illustrating a non-limiting embodiment implementing inverse directional decomposition within a tiered-based hierarchical decoding loop according to embodiments herein.

A signal processor configured as a decoder receives and decodes encoded data corresponding to a bottom level of quality, producing a decoded rendition of the signal at said bottom LOQ. (step 7.01)

Once produced the decoded rendition of the signal at the bottom LOQ, the decoder enters a decoding loop that is repeated for each subsequently higher LOQ, reconstructing the hierarchy of LOQs level by level up to the topmost LOQ.

In particular, the decoder processes the decoded rendition of the signal at a given LOQ ("lower LOQ"), decodes reconstruction data corresponding to the next higher LOQ and produces four planes of quantized parameters. The decoder then performs suitable dequantization operations on said planes of quantized parameters, producing dequantized transformed parameters. (step 7.02)

The decoder then produces a predicted rendition of the signal at the next higher LOQ, by leveraging upsampling operations and/or other signal processing operations as specified by received parameters. (step 7.03)

For each grouping of four dequantized transformed parameters (Delta, H, V, D) corresponding to a grouping of four residuals, the decoder produces a Predicted Average parameter, calculated based on the difference between a corresponding element of the signal at the lower LOQ and the average of the four corresponding elements of the predicted rendition of the signal at the next higher LOQ. For each grouping, the Predicted Average is combined with the dequantized Delta component, producing a dequantized Average component. (step 7.04)

For each grouping, the decoder then performs an inverse decomposition of dequantized components Average, H, V and D, producing four residuals. In particular, each of the residuals is obtained by performing a linear combination (i.e., sums and/or differences, with suitable coefficients) of dequantized components Average, H, V and D. In this way, the decoder produces a plane of residuals at the next higher LOQ. (step 7.05)

The decoder then combines the predicted rendition of the signal at the next higher LOQ with the produced residuals, reconstructing a decoded rendition of the signal at the next higher LOQ. (step 7.06)

At that point, if the next higher LOQ is not the topmost LOQ, the decoder proceeds with decoding the next level in the hierarchy, going back to step 7.02 wherein—for the next LOQ in the hierarchy—the rendition of the signal at the next higher LOQ that was just decoded becomes the decoded rendition of the signal at the lower LOQ.

In other non-limiting embodiments, dequantization operations are performed after the inverse decomposition transform, dequantizing residuals instead of dequantizing transformed parameters.

Figure 8:
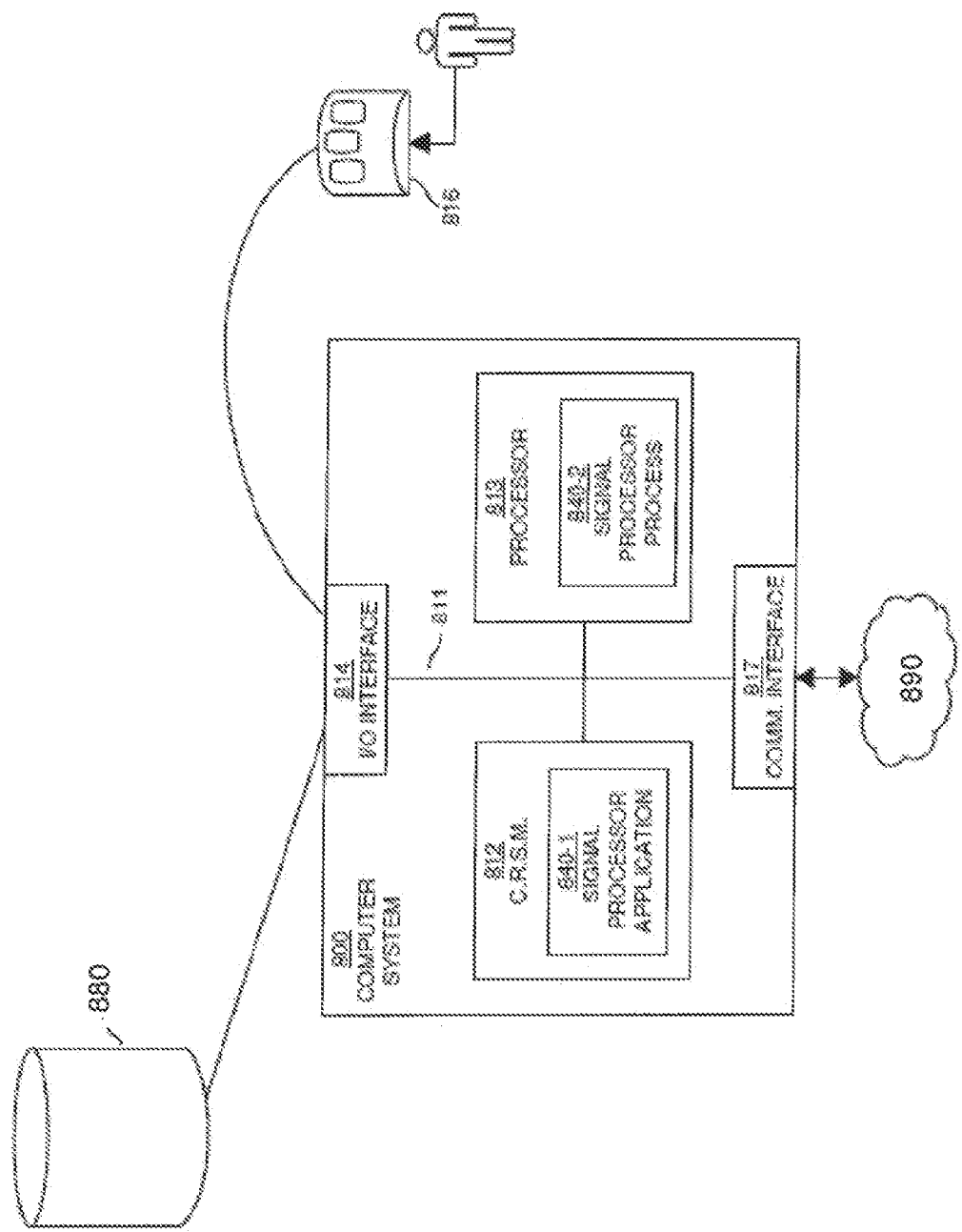
FIG. 8 is an example diagram illustrating of a computer system that provides data processing according to embodiments described herein.

FIG. 8 is a block diagram of a computer system 800 that provides computer processing according to embodiments herein.

Computer system 800 can be or at least include a computerized device such as a personal computer, processing circuitry, television, playback device, encoding device, workstation, portable computing device, mobile phone, tablet, console, set top box, network terminal, processing device, network device, operating as a switch, router, server, client, etc.

Note that the following discussion provides a basic embodiment indicating how to carry out functionality associated with a signal processor as previously discussed. However, it should be noted that the actual configuration for carrying out the operations as described herein can vary depending on a respective application.

As shown, computer system 800 of the present example comprises a communication bus 811, which provides communication with a computer readable storage media 812 such as a non-transitory computer-readable storage medium, etc., in which digital information can be stored and retrieved.

Computer system 800 can further comprise a processor 813, an I/O interface 814, and a communications interface 817.

In one embodiment, I/O interface 814 provides connectivity to repository 880, and if present, to a screen display, audio speakers, peripheral devices 816 such as a keyboard, a computer mouse, etc.

As briefly mentioned above, the computer readable storage media 812 can be any suitable device and/or hardware such as memory, optical storage, solid state storage, hard drive, floppy disk, etc. In one embodiment, the storage media 812 is a non-transitory storage media (i.e., non-carrier wave media) configured to store instructions associated with a signal processor application 840-1. The instructions are executed by a respective resource such as the processor 813 in order to perform any of the operations as discussed herein.

The communications interface 817 enables computer system 800 to communicate over a network 890 in order to retrieve information from remote sources and communicate with other computers, switches, clients, servers, etc. The I/O interface 814 also enables processor 813 to retrieve or attempt retrieval of stored information from repository 880.

As shown, the computer readable storage media 812 can be encoded with signal processor application 840-1 executed by processor 813 as a process 840-2.

Note that the computer system 800 can be embodied to include a computer readable storage media 812 for storing data and/or logic instructions.

The code associated with the signal processor application 840-1 can implement the functionalities of the signal processors illustrated herein and/or other resources necessary to implement the invention discussed herein.

During operation of one embodiment, processor 813 accesses computer readable storage media 812 via the communication bus 811 in order to launch, run, execute, interpret or otherwise perform the instructions of signal processor application 840-1 stored in computer readable storage media 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system or other software that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

Functionality supported by the different resources will now be discussed via flowcharts in FIGS. 10-11. Note that the steps in the flowcharts below can be executed in any suitable order.

Figure 10:
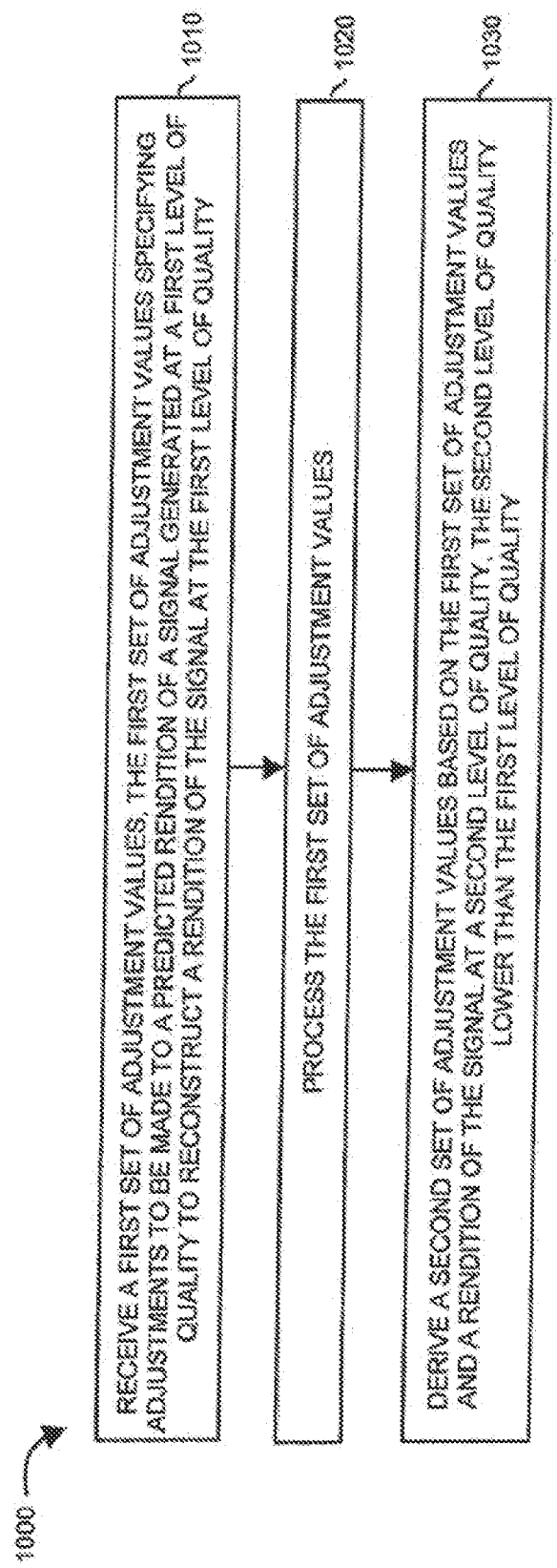

FIG. 10 is a flowchart 1000 illustrating an example method according to non-limiting embodiments described herein. Note that there will be some overlap with respect to concepts as discussed above.

In processing block 1010, computer processor hardware receives a first set of adjustment values, the first set of adjustment values specifying adjustments to be made to a predicted rendition of a signal generated at a first level of quality to reconstruct a rendition of the signal at the first level of quality.

In processing block 1020, the computer processor hardware processes the first set of adjustment values.

In processing block 1030, the computer processor hardware derives a second set of adjustment values based on the first set of adjustment values and on a rendition of the signal at a second level of quality. The second level of quality lower than the first level of quality.

FIG. 11 is a flowchart 1100 illustrating an example method according to non-limiting embodiments described herein. Note that there will be some overlap with respect to concepts as discussed above.

In processing block 1110, computer processor hardware receives setting information associated with a rendition of a signal at a first level of quality.

In processing block 1120, computer processor hardware receives a set of adjustment values.

In processing block 1130, computer processor hardware produces a preliminary rendition of the signal at a second level of quality based on the setting information. The second level of quality is higher than the first level of quality.

In processing block 1140, computer processor hardware produces a secondary rendition of the signal at the second level of quality based on the set of adjustment values and the preliminary rendition of the signal at the second level of quality.

Note again that techniques herein are well suited for encoding and decoding in hierarchical systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, settings, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "producing", "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   via computer processing hardware:
   decoding encoded data for a bottom level of quality to produce a decoded rendition of a signal at the bottom level of quality;
   decoding reconstruction data for a first level of quality and producing four planes of quantized parameters;
   dequantizing the four planes of quantized parameters to produce four sets of dequantized transformed parameters;
   performing an inverse directional decomposition of the four sets of dequantized transformed parameters to produce a plane of residuals;
   upscaling data generated using the decoded rendition of the signal at the bottom level of quality to produce a predicted rendition of the signal at the first level of quality; and
   combining the predicted rendition of the signal at the first level of quality with the plane of residuals on an element-by-element basis to generate a decoded rendition of the signal at the first level of quality,
   wherein at least one of the four planes of quantized parameters does not carry directional information for the production of the plane of residuals and wherein performing an inverse directional decomposition comprises substituting a default value for dequantized values for said at least one of the four planes that does not carry directional information.

2. The method of claim 1, comprising:
   receiving parameters for generating the predicted rendition of the signal at the first level of quality; and
   generating the predicted rendition of the signal at the first level of quality according to the received parameters.

3. The method of claim 1, wherein decoding encoded signal data for a bottom level of quality uses a first decoding method that is different from the decoding method used for decoding reconstruction data for the first level of quality.

4. The method of claim 3, wherein the first decoding method is a H.264 decoding method.

5. The method of claim 1, wherein the predicted rendition of the signal at the first level of quality is generated using a corresponding element of a rendition of the signal at the bottom level of quality.

6. The method of claim 5, wherein the method is performed in relation to 2 by 2 blocks of elements at the first level of quality and the corresponding element is a single element at the bottom level of quality for each 2 by 2 block.

7. The method of claim 1, wherein a plane of residuals is generated for a plurality of levels of quality.

8. The method of claim 1, wherein at least a first plane of quantized parameters is dequantized with a first set of dequantization operations and at least a second plane of quantized parameters is dequantized with a second set of dequantization operations, the first and second set of dequantization operations being different.

9. The method of claim 1, wherein performing an inverse directional decomposition comprises applying a matrix multiplication to dequantized values for the four sets of dequantized transformed parameters.

10. The method of claim 1, comprising:
    adding a predicted average modifier,
    wherein an average component generated by a directional decomposition is replaced within the four planes of quantized parameters with an average delta component representing a difference between a predicted average and an actual average for a block of residual elements.

11. The method of claim 1, wherein the method is performed as part of a tiered-based hierarchical decoding loop.

12. The method of claim 1, wherein the method is performed for a plurality of 2 by 2 blocks within a frame of video, wherein, for each 2 by 2 block, generation of an adjusted rendition at the first level of quality only utilizes four directional decomposition components for that block resulting from the inverse directional decomposition and data from the bottom level of quality for that block.

13. A decoder comprising:
    a first decoder to decode encoded data for a bottom level of quality to produce a decoded rendition of a signal at the bottom level of quality;
    a second decoder to decode reconstruction data for a first level of quality to produce four planes of quantized parameters;
    at least one dequantizer to dequantize the four planes of quantized parameters to produce four sets of dequantized transformed parameters;
    an inverse directional decomposition component to perform an inverse directional decomposition of the four sets of dequantized transformed parameters to produce a plane of residuals;
    an upscaler to upscale data generated using the decoded rendition of the signal at the bottom level of quality to produce a predicted rendition of the signal at the first level of quality; and
    a combiner to combine the predicted rendition of the signal at the first level of quality with the plane of residuals on an element-by-element basis to generate a decoded rendition of the signal at the first level of quality,
    wherein at least one of the four planes of quantized parameters does not carry directional information for the production of the plane of residuals and wherein performing an inverse directional decomposition comprises substituting a default value for dequantized values for said at least one of the four planes that does not carry directional information.

14. The decoder of claim 13, wherein the first decoder is different from the second decoder.

15. The decoder of claim 13, wherein the decoder performs decoding in relation to 2 by 2 blocks of elements at the first level of quality and the corresponding element is a single element at the bottom level of quality for each 2 by 2 block.

16. The decoder of claim 13, wherein at least a first plane of quantized parameters is dequantized with a first set of dequantization operations and at least a second plane of quantized parameters is dequantized with a second set of dequantization operations, the first and second set of dequantization operations being different.

17. The decoder of claim 13, comprising:
a predicted average combiner,
wherein an average component generated by a directional decomposition is replaced within the four planes of quantized parameters with an average delta component representing a difference between a predicted average and an actual average for a block of residual elements.

18. The decoder of claim 13, wherein the decoder is applied for a plurality of 2 by 2 blocks within a frame of video, wherein, for each 2 by 2 block, generation of an adjusted rendition at the first level of quality only utilizes four directional decomposition components for that block resulting from the inverse directional decomposition and data from the bottom level of quality for that block.

* * * * *